US012775202B2

(12) United States Patent
Jackson et al.

(10) Patent No.: US 12,775,202 B2
(45) Date of Patent: Oct. 27, 2026

(54) LIGHT PROJECTION SYSTEM USING WHITE LIGHT ILLUMINATION

(71) Applicant: Dolby Laboratories Licensing Corporation, San Francisco, CA (US)

(72) Inventors: John David Jackson, Allen, TX (US); Nathan Shawn Wainwright, Melissa, TX (US); Frank Joseph Poradish, Allen, TX (US); Darren Hennigan, Prosper, TX (US); Duane Scott Dewald, Dallas, TX (US); Juan Pablo Pertierra, Fishers, IN (US); Martin J. Richards, Gig Harbor, WA (US); Barret Lippey, Foster City, CA (US); Jon Scott Miller, Harleysville, PA (US); Trevor Davies, Walnut Creek, CA (US); Peter Francis Van Kessel, San Mateo, CA (US); Douglas Reid Boyd Campbell, Vancouver (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 192 days.

(21) Appl. No.: 18/701,193

(22) PCT Filed: Oct. 14, 2022

(86) PCT No.: PCT/US2022/046709

§ 371 (c)(1),
(2) Date: Apr. 12, 2024

(87) PCT Pub. No.: WO2023/064556

PCT Pub. Date: Apr. 20, 2023

(65) Prior Publication Data

US 2025/0004357 A1 Jan. 2, 2025

Related U.S. Application Data

(60) Provisional application No. 63/322,669, filed on Mar. 23, 2022, provisional application No. 63/255,694, filed on Oct. 14, 2021.

(30) Foreign Application Priority Data

Mar. 23, 2022 (EP) .................................... 22163730

(51) Int. Cl.
*G03B 21/00* (2006.01)
*G03B 21/20* (2006.01)
*H04N 9/31* (2006.01)

(52) U.S. Cl.
CPC ....... *G03B 21/2006* (2013.01); *G03B 21/208* (2013.01)

(58) Field of Classification Search
CPC ................ G03B 21/008; G03B 21/006; G03B 21/208; H04N 9/3105; H04N 9/3108; H04N 9/317
See application file for complete search history.

(56) References Cited

U.S. PATENT DOCUMENTS 5,644,432 A 7/1997 Doany
6,481,852 B2 11/2002 Osaka
(Continued)

FOREIGN PATENT DOCUMENTS

CN 213810092 U 7/2021
JP 3347121 B2 11/2002
(Continued)

OTHER PUBLICATIONS

Jinyoung Roh et al: "Full-color holographic projection display system featuring an achromatic Fourier filter", Optics Express, Jun. 19, 2017 (Jun. 19, 2017), pp. 14774-14782, XP055533147, OSA publishing DOI: 10.1364/OE.25.014774 Retrieved from the Internet: URL:https://www.osapublishing.org/oe/fulltext.cfm?uri=oe-25-13-14774&id=368165 [retrieved on Dec. 11, 2018].
(Continued)

*Primary Examiner* — Ryan D Howard

(57) ABSTRACT

Light projection systems using white light illumination. One embodiment provides a projection system using white light
(Continued)

illumination. The projection system includes an illumination assembly configured to receive a white light input. A prism is configured to separate the white light input into color light inputs, redirect the color light inputs to respective modulators, and combine modulated color light inputs from the respective modulators into a white light output. An optical filter is configured to spatially Fourier transform the white light output to generate a filtered white light output. A projection lens assembly is configured to project the filtered white light output.

19 Claims, 39 Drawing Sheets

(56) References Cited

U.S. PATENT DOCUMENTS

| | | | |
|---|---|---|---|
| 6,577,429 | B1 | 6/2003 | Kurtz |
| 6,897,992 | B2 | 5/2005 | Kikuchi |
| 7,072,096 | B2 | 7/2006 | Holman |
| 7,180,554 | B2 | 2/2007 | Divelbiss |
| 7,222,974 | B2 | 5/2007 | Tomita |
| 7,433,126 | B2 | 10/2008 | Hashimoto |
| 8,860,640 | B2 | 10/2014 | Perkins |
| 9,664,989 | B2 | 5/2017 | Bommerbach |
| 9,723,278 | B2 | 8/2017 | Davis |
| 9,915,820 | B2 | 3/2018 | Kurtz |
| 10,197,902 | B2 | 2/2019 | Dewald |
| 11,632,527 | B2 | 4/2023 | Richards |
| 12,072,614 | B2 | 8/2024 | Richards |
| 12,225,329 | B2 | 2/2025 | Pertierra |
| 2006/0044525 | A1 | 3/2006 | Lee |
| 2013/0114819 | A1 | 5/2013 | Melchior |
| 2017/0285453 | A1 * | 10/2017 | Morant .............. G03B 21/2066 |
| 2021/0141238 | A1 | 5/2021 | Pertierra |
| 2021/0294094 | A1 * | 9/2021 | Wakabayashi ....... G02B 27/141 |
| 2022/0005111 | A1 | 1/2022 | Trimble |
| 2023/0008842 | A1 | 1/2023 | Dewald |
| 2023/0384656 | A1 | 11/2023 | Jackson |
| 2023/0393452 | A1 | 12/2023 | Jackson |
| 2024/0171716 | A1 | 5/2024 | Pertierra |

FOREIGN PATENT DOCUMENTS

| | | | | |
|---|---|---|---|---|
| JP | 2021060584 | A | 4/2021 | |
| JP | 2021517660 | A | 7/2021 | |
| WO | 2015098120 | A1 | 7/2015 | |
| WO | WO-2015184549 | A1 * | 12/2015 | ........... H04N 9/3155 |
| WO | WO-2019195182 | A1 * | 10/2019 | ........... H04N 9/3102 |
| WO | 2020089523 | A1 | 5/2020 | |
| WO | 2021113553 | A1 | 6/2021 | |
| WO | 2021214380 | A1 | 10/2021 | |

OTHER PUBLICATIONS

Martin J Morrell et al: “Audio Engineering Society Convention Paper 7931 Dynamic Panner: An Adaptive Digital Audio Effect for Spatial Audio”, Oct. 1, 2009 (Oct. 1, 2009), XP055668267, Retrieved from the Internet: URL:http://www.aes.org/e-lib/inst/download.cfm/15126.pdf?ID=15126 [retrieved on Feb. 13, 2020] paragraphs [002.], [003.], [06. 3]; figure 8.

* cited by examiner

LIGHT PROJECTION SYSTEM USING WHITE LIGHT ILLUMINATION

CROSS-REFERENCE TO RELATED APPLICATIONS

This application is a U.S. National Stage application under U.S.C. 371 of International Application No. PCT/US2022/046709, filed on Oct. 14, 2022, which claims priority of the following priority application: European Patent Application No. 22163730.9, filed Mar. 23, 2022, U.S. Provisional Patent Application No. 63/322,669, filed Mar. 23, 2022, and U.S. Provisional Patent Application No. 63/255,694, filed Oct. 14, 2021, the entire contents of each of which are hereby incorporated by reference.

FIELD

This application relates generally to projection systems and in particular, to a projection system including a single illumination assembly delivering white light in conjunction with a color-splitting reflection prism and an optical filter to increase contrast of an image provided by the prism.

BACKGROUND

Contrast of a projector indicates the brightest output of the projector relative to the darkest output of the projector. Contrast ratio is a quantifiable measure of contrast, defined as a ratio of the luminance of the projector's brightest output to the luminance of the projector's darkest output. This definition of contrast ratio is also referred to as "static" or "native" contrast ratio.

Due to visual adaptation of the human visual system, the range of luminances detectable by a viewer corresponds to a contrast ratio of approximately 1,000,000,000:1, even though at any instant the detectable range of luminances corresponds to a contrast ratio less than this value. For example, in scotopic vision, mediated exclusively by rod cells in the human eye, the detectable contrast ratio at any instant may be as high as 1,000,000:1 for some viewers, depending on the observed scene, the user's state of adaptation, and biological factors.

Viewers in a cinema environment may be in different adaptation states at any moment, and therefore may view the same scene with different contrast ratios. Changes in adaptation states between viewers may be due to different seating positions relative to the screen, where on the screen each viewer focuses, and when and how often each viewer closes their eyes. As a cinema is used by several viewers, an ideal projector has a contrast ratio high enough to accurately reproduce images for all viewers.

Some projectors that are compliant with the Digital Cinema Initiatives (DCI) specification have contrast ratios of 2,000:1 or less. For these digital projectors, dark and/or black regions of images may be projected with a luminance high enough that the regions appear brighter than intended.

Additionally, many Digital Light Processing (DLP) projectors use a three-channel prism assembly having a common light path bi-directionally through the color prism. The color prism receives light of each color channel (red, green, and blue), transmits each color channel to a modulator, and combines the modulator channels into a white light output. Such projectors may comprise dual and/or multi-modulator projector display systems.

SUMMARY

Projector display systems that receive and separately modulate multiple color channels are capable of achieving high contrast, such as, for example, 70K:1. However, less contrast may also be acceptable in some projector display systems, such as 30K:1. When less contrast is acceptable, each color channel does not need independent illumination angle adjustment. Accordingly, embodiments described herein provide a single illumination assembly delivering white light to a white light prism. Following splitting of the white light with the white light prism, each color channel is provided to a modulator which modulates the color channel. As each color channel was separated from the same white light input, each color channel has the same illumination angle. The modulated color channels are then recombined within the white light prism as a white light output. The white light output is provided to an optical filter configured to spatially Fourier transform the white light output from the white light prism.

Various aspects of the present disclosure relate to devices, systems, and methods for white light illumination in a projector system. One embodiment provides a projection system using white light illumination. The projection system includes an illumination assembly configured to receive a white light input. A prism is configured to separate the white light input into separate color light inputs, redirect the color light inputs to respective modulators, and combine modulated color light inputs from the respective modulators into a white light output. An optical filter is configured to spatially Fourier transform the white light output to generate a filtered white light output. A projection lens assembly is configured to project the filtered white light output.

Another embodiment provides a method for modulating white light in a projector system. The method includes receiving, with a prism assembly, a white light input, and separating, with the prism assembly, the white light into a plurality of separate color light inputs, each color light input provided to a separate prism path at an illumination angle. The method includes modulating each color light input with a color light modulator in each separate prism path, and combining, within the prism assembly, each modulated color light input to a white light output. The method includes providing the white light output to a projection lens assembly, filtering the white light output within the projection lens assembly, and projecting the filtered white light output.

Another embodiment provides a projection system using white light illumination. The projection system includes a prism configured to separate white light into a plurality of color channels, redirect the color channels to respective modulators, and combine modulated color channels from the respective modulators into a white light output. The projection system includes a projection lens assembly configured to project the white light output, the projection lens assembly including an optical filter configured to spatially Fourier transform the white light output.

In this manner, various aspects of the present disclosure provide for the display of images having a high dynamic range and high resolution, and effect improvements in at least the technical fields of image projection, holography, signal processing, and the like.

DESCRIPTION OF THE DRAWINGS

These and other more detailed and specific features of various embodiments are more fully disclosed in the following description, reference being had to the accompanying drawings, in which.

DETAILED DESCRIPTION

This disclosure and aspects thereof can be embodied in various forms, including hardware, devices, or circuits controlled by computer-implemented methods, computer program products, computer systems and networks, user interfaces, and application programming interfaces; as well as hardware-implemented methods, signal processing circuits, memory arrays, application specific integrated circuits (ASICs), field programmable gate arrays (FPGAs), and the like. The foregoing summary is intended solely to give a general idea of various aspects of the present disclosure, and does not limit the scope of the disclosure in any way.

In the following description, numerous details are set forth, such as optical device configurations, timings, operations, and the like, in order to provide an understanding of one or more aspects of the present disclosure. It will be readily apparent to one skilled in the art that these specific details are merely examples and not intended to limit the scope of this application.

Optical Filter

Figure 1:
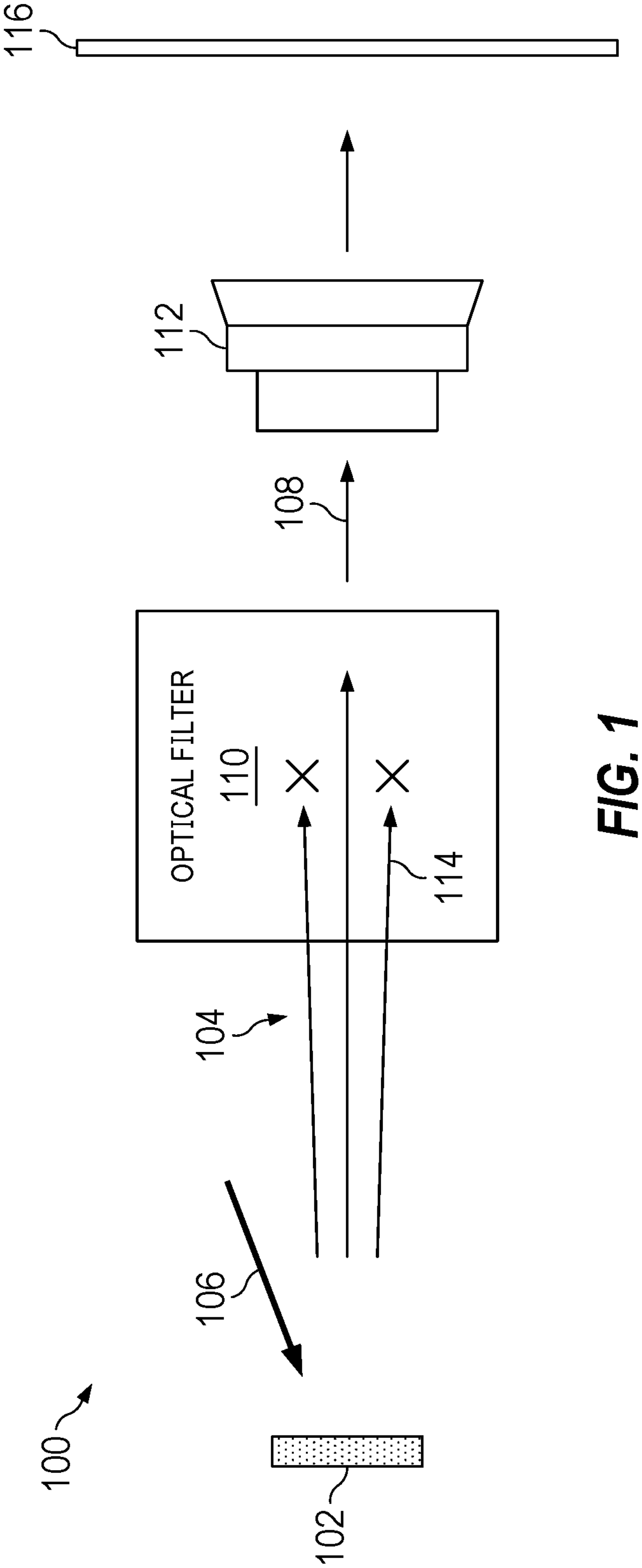
FIG. 1 illustrates an optical filter configured to improve contrast of an image generated with a spatial light modulator, according to an embodiment.

FIG. 1 is a functional diagram showing one optical filter 110 configured to improve contrast of an image generated with a spatial light modulator. FIG. 1 shows optical filter 110 in one use scenario, wherein optical filter 110 is implemented in a digital projector 100 to increase a contrast of an image projected by digital projector 100. Digital projector 100 includes a spatial light modulator (SLM) 102 that modulates input light 106 into modulated light 104 according to inputted data representative of an image to be projected by digital projector 100.

Optical filter 110 filters modulated light 104 by blocking a portion 114 of modulated light 104. Blocked portion 114 includes light that digital projector 100, in the absence of optical filter 110, would project onto screen 116 even when SLM 102 is controlled to output no light toward screen 116. Optical filter 110 outputs, as filtered light 108, a transmitted portion of modulated light 104. Digital projector 100 includes a projection lens 112 that projects filtered light 108 onto screen 116. In the absence of optical filter 110, blocked portion 114 of modulated light 104 corresponds to a lower bound of a luminous intensity of digital projector 100, and therefore determines how dark the projected image is. By blocking blocked portion 114 of modulated light 104, optical filter 110 reduces the lower bound, thereby increasing contrast of digital projector 100.

As described in more detail below, blocked portion 114 of modulated light 104 corresponds to one or more diffraction orders of modulated light 104 produced by input light 106 diffracting off of SLM 102. SLM 102 may be any type of spatial light modulator that (1) has a periodic structure acting as a diffraction grating, and (2) modulates the optical phase of input light 106 so as to steer light between two states (e.g., ON and OFF states). In one example, SLM 102 of FIG. 1 is a digital micromirror device (DMD) that steers light by tilting a plurality of micromirrors, thereby modulating the optical phase of input light 106. In other examples, SLM 102 is a reflective liquid crystal on silicon (LCOS) phase modulator, or a transmissive liquid crystal (LC) phase modulator, each of which steers light by modulating the refractive index of the liquid crystal.

Figure 2:
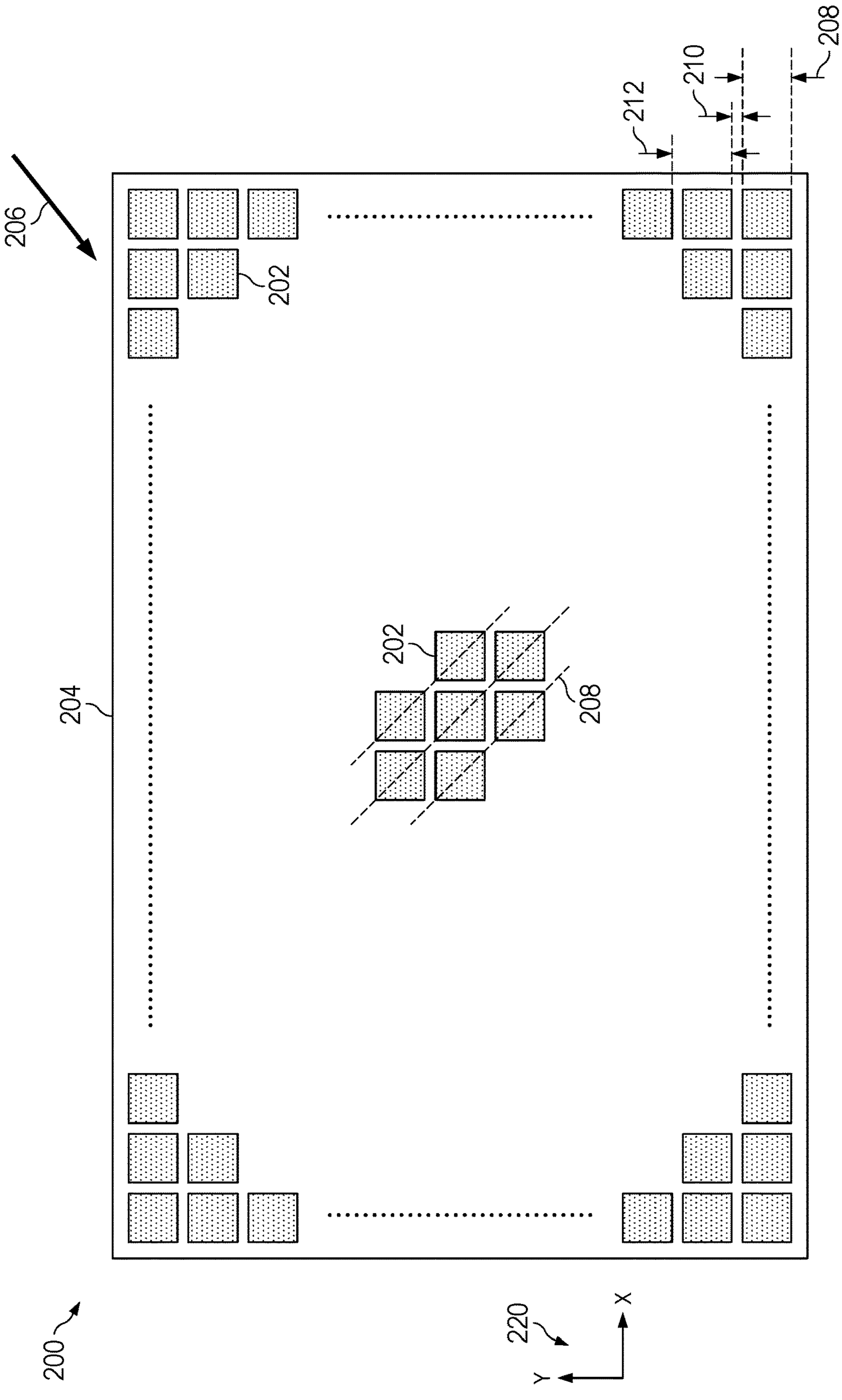
FIG. 2 (PRIOR ART)
FIGS. 2 and 3 are front and side views, respectively, of one example prior-art digital micromirror device (DMD) 200 used to generate an image as part of a digital projector.
Figure 3:
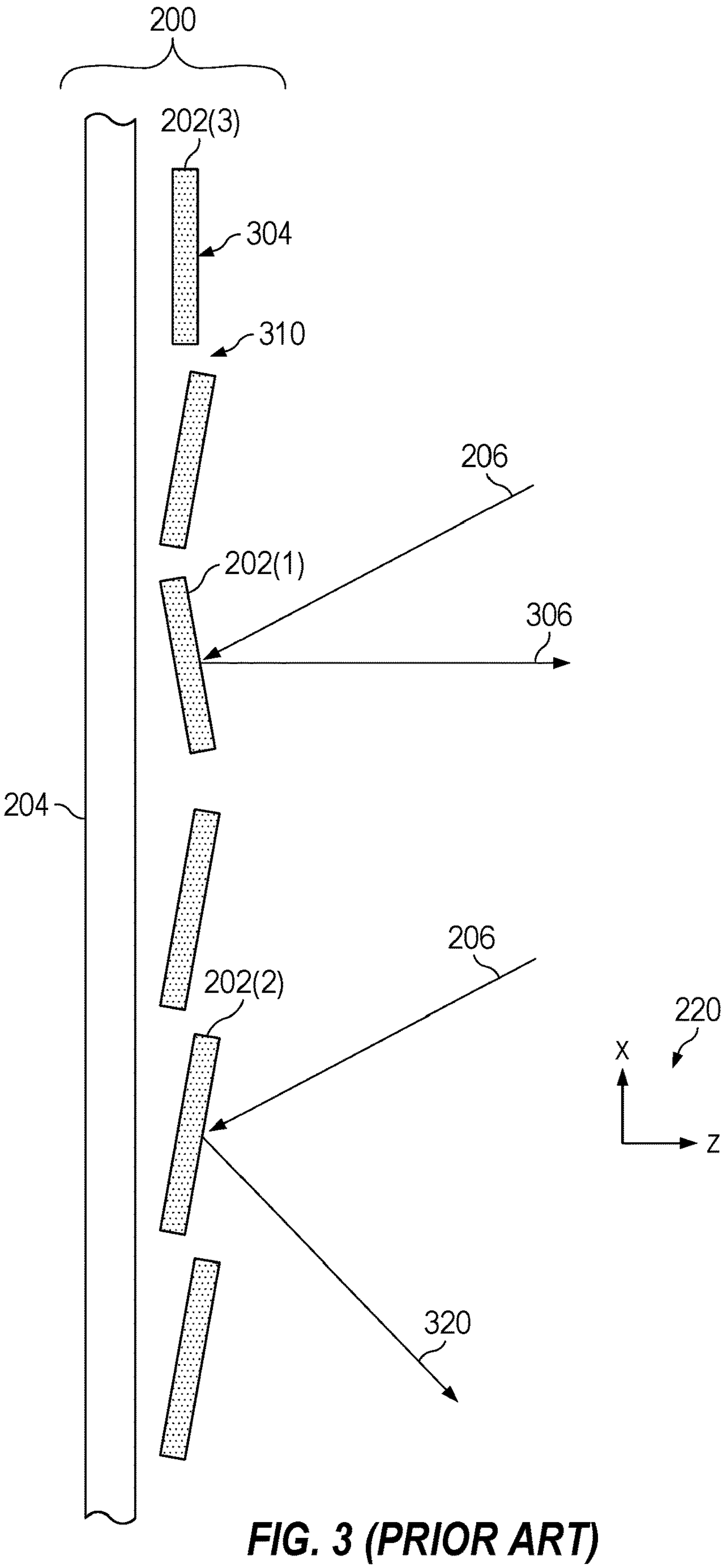
FIG. 3 (PRIOR ART)

FIGS. 2 and 3 are front and side views, respectively, of one prior-art DMD 200 used to generate an image as part of a digital projector (e.g. digital projector 100). DMD 200 is an example of SLM 102. FIGS. 2 and 3 are best viewed together in the following description.

DMD 200 is a micro-opto-electromechanical system (MOEMS) SLM having a plurality of square micromirrors 202 arranged in a two-dimensional rectangular array on a substrate 204 lying in the x-y plane (see right-handed coordinate system 220). In certain embodiments, DMD 200 is a digital light processor (DLP) from Texas Instruments. Each micromirror 202 may correspond to one pixel of the image, and may be tilted about a rotation axis 208, oriented at −45 degrees to the x-axis, by electrostatic actuation to steer input light 206. For clarity, FIG. 2 only shows representative micromirrors 202 at the corners and center of DMD 200, and not all micromirrors 202 are labeled in FIG. 3.

FIG. 3 shows micromirrors 202 tilted to steer input light 206. Micromirror 202(1) is actuated in an ON position to specularly reflect input light 206 into ON-reflected light 306 parallel to the z-axis (see coordinate system 120). Micromirror 202(2) is actuated in an OFF position to specularly reflect input light 206 into OFF-reflected light 320 directed toward a beam dump (not shown) that absorbs OFF-reflected light 320. Micromirror 202(3) is unactuated, lying parallel to substrate 204 (e.g., the x-y plane) in a flat-state. A front face 304 of each of micromirrors 202 may be coated with a layer of deposited metal (e.g., aluminum) that acts as a reflective surface for reflecting input light 206. Gap 310 may be absorptive, i.e., input light 206 that enters gap 310 is absorbed by substrate 204. For clarity, mechanical structures physically coupling micromirrors 202 to substrate 204 are not shown. Without departing from the scope hereof, DMD 200 may be implemented to direct ON-reflected light 306 and OFF-reflected light 320 in respective directions different from those shown in FIG. 3. In addition, DMD 200 may be configured such that micromirrors 202 are at an angle to substrate 204 when unactuated.

A digital projector having DMD 200 may be designed by only considering specular reflections of input light 206 off of micromirrors 202. However, micromirrors 202 and gaps 310 separating micromirrors 202 cooperate to form a two-dimensional grating that diffracts input light 206. Therefore, modulated light propagating away from DMD 200 may form a plurality of diffraction orders observable as a Fraunhofer diffraction pattern (see diffraction patterns 700 and 800 of FIGS. 7 and 8, respectively) in a far-field region of DMD 200 or at a focal plane of a lens. Each diffraction order corresponds to one light beam propagating away from DMD 200 in a unique respective direction. By design, most of the optical power of modulated light from DMD 200 is in the zeroth diffraction order, corresponding to specularly reflected ON- and OFF-reflected lights 306 and 320.

Diffraction of input light 206 by DMD 200 may reduce a projector contrast ratio (PCR) of a digital projector using DMD 200 (e.g., digital projector 100 of FIG. 1 in the absence of optical filter 110). PCR of a projector is defined herein as a ratio of ON and OFF luminous intensities (or, equivalently, first and second photometric luminances) measured at a projection screen illuminated by the projector. ON and OFF luminous intensities are generated when the projector is controlled to output its brightest output (e.g., white) and its darkest output (e.g., black), respectively. When the digital projector uses DMD 200, ON and OFF luminous intensities are generated when all micromirrors 202 are in ON and OFF positions, respectively.

How DMD 200 diffracts input light 206 may be determined by a variety of parameters, such as (1) the wavelength of input light 206, (2) the direction of input light 206, (3) the pitch 212 of DMD 200, (4) a width 210 of gaps 310 of DMD 200, and (5) the ON and OFF tilt angles of micromirrors 202. In both x and y directions of DMD 200, pitch 212 equals a sum of width 210 and a micromirror edge length 208, as shown in FIG. 2. Pitch 212 may be between 5 and 15 microns. Width 210 may be less than 1 micron. In one example, pitch 212 is between 7 and 8 microns and width 210 is between 0.7 and 0.9 microns.

Figure 4:
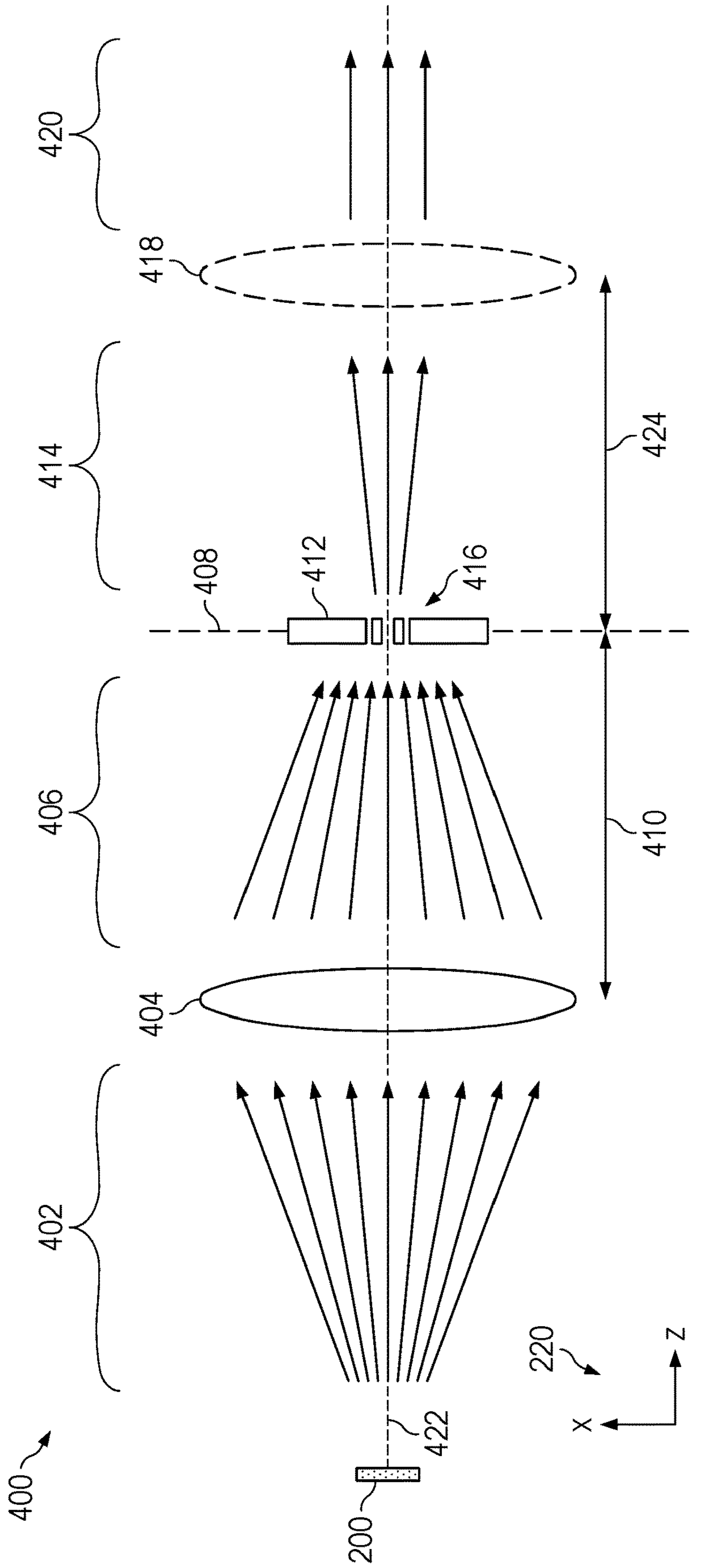
FIG. 4 is a side view of an optical filter configured to filter modulated light from a DMD, according to an embodiment.

FIG. 4 is a side view of one optical filter 400 configured to spatially filter modulated light 402 from DMD 200, so as to increase PCR of digital projector 100. Optical filter 400 is an embodiment of optical filter 110. DMD 200 is an embodiment of SLM 102. In optical filter 400, DMD 200 may be replaced by another embodiment of SLM 102 (e.g., reflective LCOS or transmissive LC phase modulator) without departing from the scope hereof Optical filter 400 includes a lens 404 that spatially Fourier transforms modulated light 402 by focusing modulated light 402 onto a Fourier plane 408. Modulated light 402 is depicted in FIG. 4 as a plurality of arrows that each corresponds to a respective diffraction order and points in a unique direction along which the diffraction order propagates. Lens 404 defines an optical axis 422. In one embodiment, DMD 200 is centered on optical axis 422, as shown in FIG. 4. In another embodiment, DMD 200 is off-centered from optical axis 422. Lens 404 has focal length 410, and Fourier plane 408 coincides with a focal plane of lens 404. An optical filter mask 412 located at Fourier plane 408 spatially filters modulated light 402, as Fourier transformed by lens 404. The spatial Fourier transformation imposed by lens 404 converts the propagation angle of each diffraction order of modulated light 402 to a respective spatial position on Fourier plane 408. Lens 404 thereby enables selection of desired diffraction orders, and rejection of undesired diffraction orders, by spatial filtering at Fourier plane 408. The spatial Fourier transform of modulated light 402 at Fourier plane 408 is equivalent to a Fraunhofer diffraction pattern of modulated light 402.

Optical filter mask 412 has at least one transmissive region 416 configured to fully or partly transmit at least one diffraction order of modulated light 402 through optical filter mask 412 as filtered light 414. In certain embodiments, optical filter mask 412 is substantially opaque where undesired diffraction orders of modulated light 402 are incident. In some embodiments, optical filter mask 412 is substantially opaque where optical filter mask 412 does not have a transmissive region 416. In other embodiments, optical filter mask 412 is configured to reflect, as opposed to transmit, desired diffraction orders so as to spatially separate desired diffraction orders from undesired diffraction orders.

In an embodiment, optical filter 400 is configured with a collimating lens 418 that collimates filtered light 414 into collimated light 420. Collimation lens 418 may ease integration of optical filter 400 with other optical elements or optical systems. For example, lens 418 may optically couple filtered light 414 to additional optics located after optical filter 400 (e.g., projector lens 112, or beam combiner 1504 discussed below in reference to FIG. 15). Collimating lens 418 has a focal length 424, and is positioned such that a focal plane of collimating lens 418 coincides with Fourier plane 408. While focal lengths 410 and 424 are shown in FIG. 4 as being equal, focal lengths 410 and 424 may differ from each other in certain embodiments. In another embodiment, optical filter 400 is configured with a lens similar to collimating lens 418 that optically couples filtered 414 to additional optics located after optical filter 400 (e.g., projector lens 112).

For clarity, FIG. 4 only shows diffracted beams diffracting in one dimension (e.g., the x-direction). However, DMD 200 diffracts in two dimensions, such that modulated light 402 also includes diffracted beams that have been diffracted, by DMD 200, in a second dimension perpendicular to optical axis 422 (e.g., the y-direction). Each diffracted beam in a two-dimensional diffraction pattern may be labeled by a pair of integers identifying the diffraction order of the diffracted beam for each of the two dimensions. Herein, "zeroth order" refers to the one diffracted beam that has order zero in both of the two dimensions. Also without departing from the scope hereof, each arrow depicted in FIG. 4 as part of modulated light 402 may indicate a group of neighboring diffraction orders, such as a zeroth diffraction order and a plurality of first diffraction orders.

Figure 5:
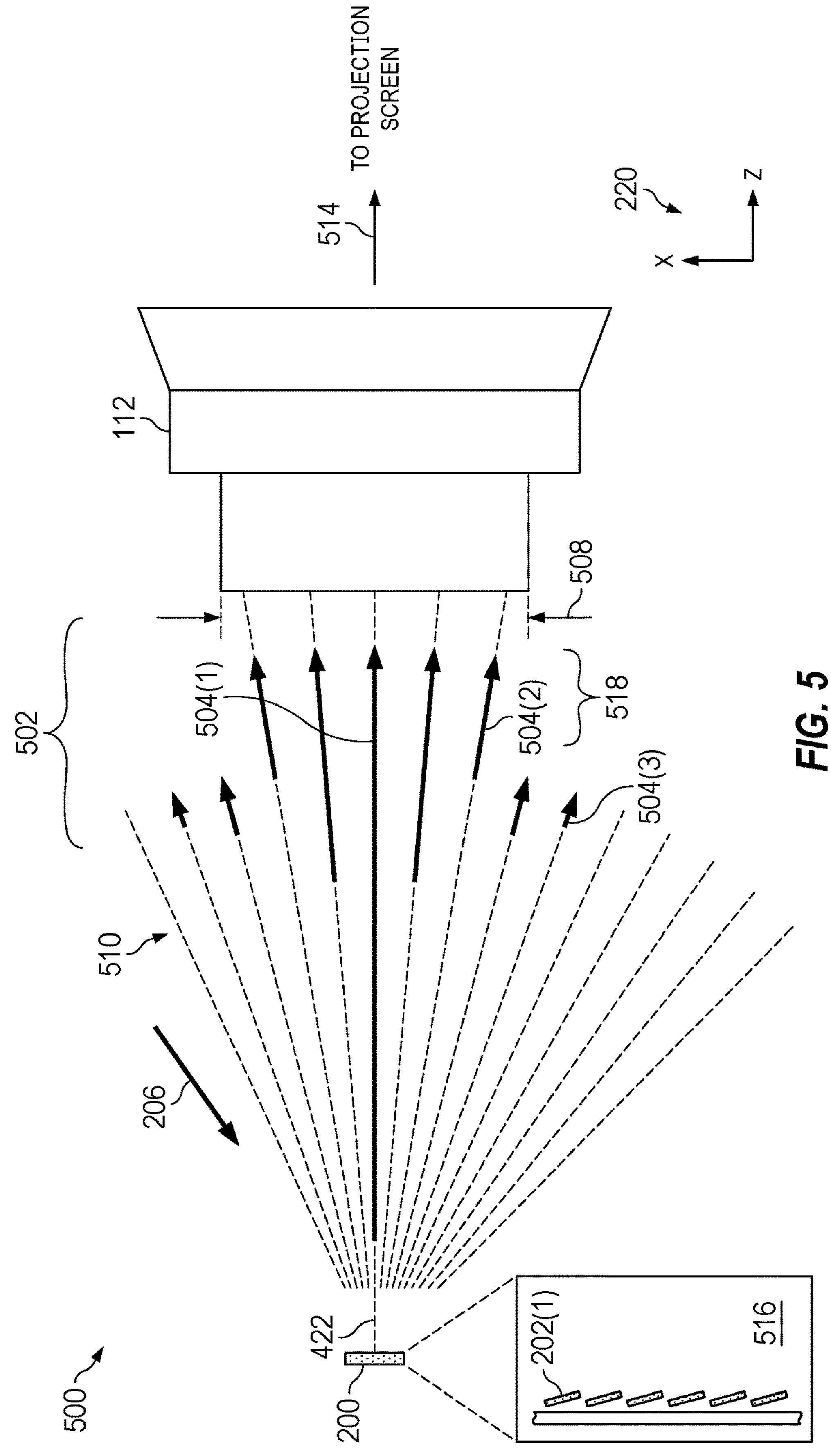
FIGS. 5 and 6 are side views of one example digital projector having a DMD and a projector lens.
Figure 6:
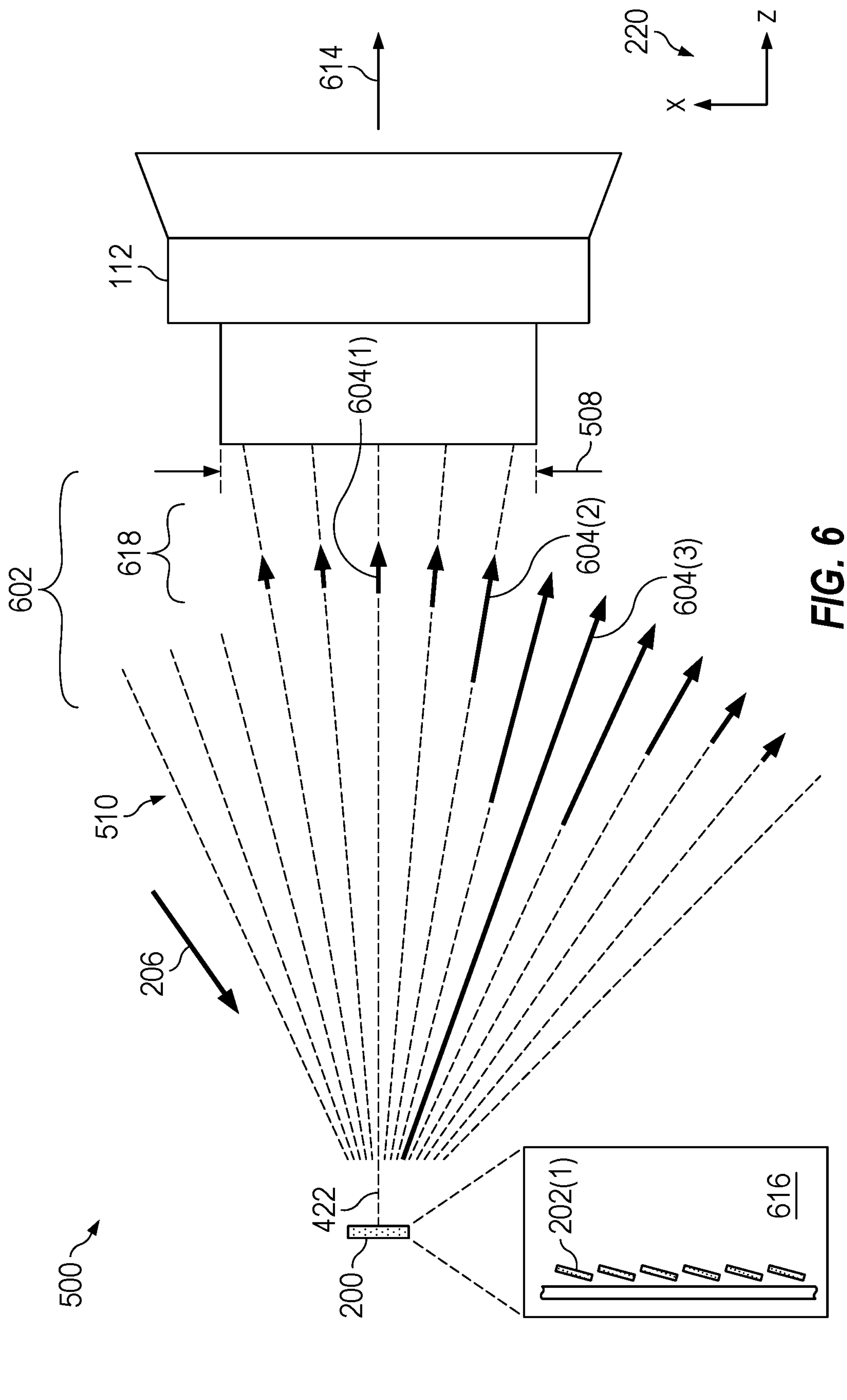

FIGS. 5 and 6 are side views of one digital projector 500 that includes DMD 200 and projector lens 112, but does not include optical filter 110. FIGS. 5 and 6 illustrate how diffraction orders of modulated light 402 from DMD 200 reduce PCR of digital projector 500. DMD 200 is an embodiment of SLM 102. In digital projector 500, DMD 200 may be replaced by another embodiment of SLM 102 (e.g., reflective LCOS or transmissive LC phase modulator) without departing from the scope hereof. In FIG. 5, digital projector 500 generates ON luminous intensity by actuating all micromirrors 202 of DMD 200 in the ON position (see micromirror 202(1) in magnified view 516). In FIG. 6, digital projector 500 generates OFF luminous intensity by actuating all micromirrors 202 of DMD 200 in the OFF position (see micromirror 202(2) in magnified view 616). In FIGS. 5 and 6, DMD 200 and projector lens 112 are centered in x and y directions (see coordinate system 220) on optical axis 422. FIGS. 5 and 6 are best viewed together in the following description.

In FIG. 5, DMD 200 diffracts input light 206 into ON-modulated light 502 having a plurality of ON-diffraction beams 504. In FIG. 6, DMD 200 diffracts input light 206 into OFF-modulated light 602 having a plurality of OFF-diffraction beams 604. In a far-field region of DMD 200, each of ON-diffracted beams 504 corresponds to one diffraction order or peak of a Fraunhofer diffraction pattern formed by ON-modulated light 502, and each of OFF diffracted beams 604 corresponds to one diffraction order or peak of a Fraunhofer diffraction pattern formed by OFF-modulated light 602. In the far-field region of DMD 200, each of ON and OFF diffracted beams 504, 604 corresponds to a k-vector having one of a plurality of propagation directions 510. In the example of FIGS. 5 and 6, propagation directions 510 are represented as dashed lines; each of ON- and OFF-diffracted beams 504, 604 is aligned with one of propagation directions 510 and is represented by a solid arrow having a length corresponding to a power or intensity of the diffracted beam.

One aspect of the present embodiments is the realization that, for a fixed direction of input light 206, the power/intensity of ON- and OFF-diffracted beams 504, 604 changes when micromirrors 202 of DMD 200 are switched between ON and OFF positions, whereas propagation directions 510 of ON- and OFF-diffracted beams 504, 604 remain the same when micromirrors 202 of DMD 200 are switched between ON and OFF positions.

In the example of FIG. 5, input light 206 is a monochromatic plane wave illuminating DMD 200 and propagating toward DMD 200 such that an ON-diffracted beam 504(1) propagates along optical axis 422. ON-diffracted beam 504 (1) contains most of the power of ON-modulated light 502. ON-diffracted beam 504(1) may represent a zeroth diffraction order, or a plurality of neighboring diffraction orders (e.g., a zeroth diffraction order and several first diffraction orders), of ON-modulated light 502.

FIG. 5 also shows an ON-diffracted beam 504(2) propagating along a different direction than ON-diffracted beam 504(1), but still passing through a clear aperture 508 of projector lens 112. The power in ON-diffracted beam 504(2) is less than the power in ON-diffracted beam 504(1). A plurality of ON-diffracted beams 518, including ON-diffracted beams 504(1) and 504(2), pass through clear aperture 508 of projector lens 112, which projects this plurality of ON-diffracted beams 518 onto a projection screen as ON-projected light 514.

FIG. 5 also shows an ON-diffracted beam 504(3) propagating along a direction missing clear aperture 508. Projector lens 112 does not project ON-diffracted beam 504(3) onto the projection screen. The power in ON-diffracted beam 504(3) is a small fraction of the power of ON-modulated light 502. Therefore, the exclusion of ON-diffracted beam 504(3) from ON-projected light 514 minimally impacts the optical power efficiency of digital projector 500.

FIG. 6 shows OFF-diffracted beams 604(1), 604(2), 604 (3) corresponding to respective ON-diffracted beams 504(1), 504(2), 504(3) of FIG. 5. OFF-diffracted beam 604(3) propagates away from optical axis 422, missing clear aperture 508. Most of the power of OFF-modulated light 602 is in OFF-diffracted beam 604(3) and therefore will not be projected onto the projection screen.

In FIG. 6, OFF-diffracted beams 604(1) and 604(2) pass through clear aperture 508 to be projected as part of OFF-projected light 614. The power in OFF-diffracted beams 604(1) and 604(2) is small compared to the power in OFF-diffracted beam 604(3). However, the power in OFF-diffracted beams 604(1) and 604(2) increase the OFF luminous intensity of digital projector 500, thereby decreasing PCR of digital projector 500.

With most of the optical power of ON-modulated light 502 being in ON-diffracted beam 504(1), other ON-diffraction beams 504 in the plurality of ON-diffracted beams 518 passing through clear aperture 508 to form ON-projected light 514 contain relatively little power, and therefore contribute negligibly to the power in ON-projected light 514. However, corresponding OFF-diffracted beams 604 passing through clear aperture 508 may significantly increase the power in OFF-projected light 614, decreasing PCR of digital projector 500.

Another aspect of the present embodiments is the realization that diffraction orders corresponding to ON-diffracted beams with low optical powers, like ON-diffracted beam 504(2) described above, may be filtered so as to increase PCR with minimal decrease in optical power output and efficiency of digital projector 500. To identify diffraction orders to filter, diffraction order contrast ratio (DOCR) may be used. For each of propagation directions 510 passing through clear aperture 508, DOCR may be defined as a ratio of the optical powers of a pair of corresponding ON- and OFF-diffracted beams of the same diffraction order and propagation direction. For example, the diffraction order corresponding to ON- and OFF-diffracted beams 504(1) and 604(1) of FIGS. 5 and 6 has a high DOCR. Diffraction orders with high DOCR are beneficial to increasing PCR, and may be advantageously selected for projection to the projection screen. On the other hand, ON- and OFF-diffracted beams 504(2) and 604(2) correspond to a diffraction order with a low DOCR. Diffraction orders with low DOCR decrease PCR, and may be advantageously filtered out to increase PCR of digital projector 500.

For clarity, FIGS. 5 and 6 only show diffracted beams 504, 604 diffracting in one dimension (e.g., the x-direction). However, DMD 200 diffracts input light 206 in two dimensions, such that modulated lights 502 and 602 also include diffracted beams that have been diffracted, by DMD 200, in a second dimension perpendicular to optical axis 512 (e.g., the y-direction). Each diffracted beam in a two-dimensional diffraction pattern may be labeled by a pair of integers identifying the diffraction order of the diffracted beam for each of the two dimensions. Herein, "zeroth order" refers to the one diffracted beam that has order zero in both of the two dimensions.

Figure 7:
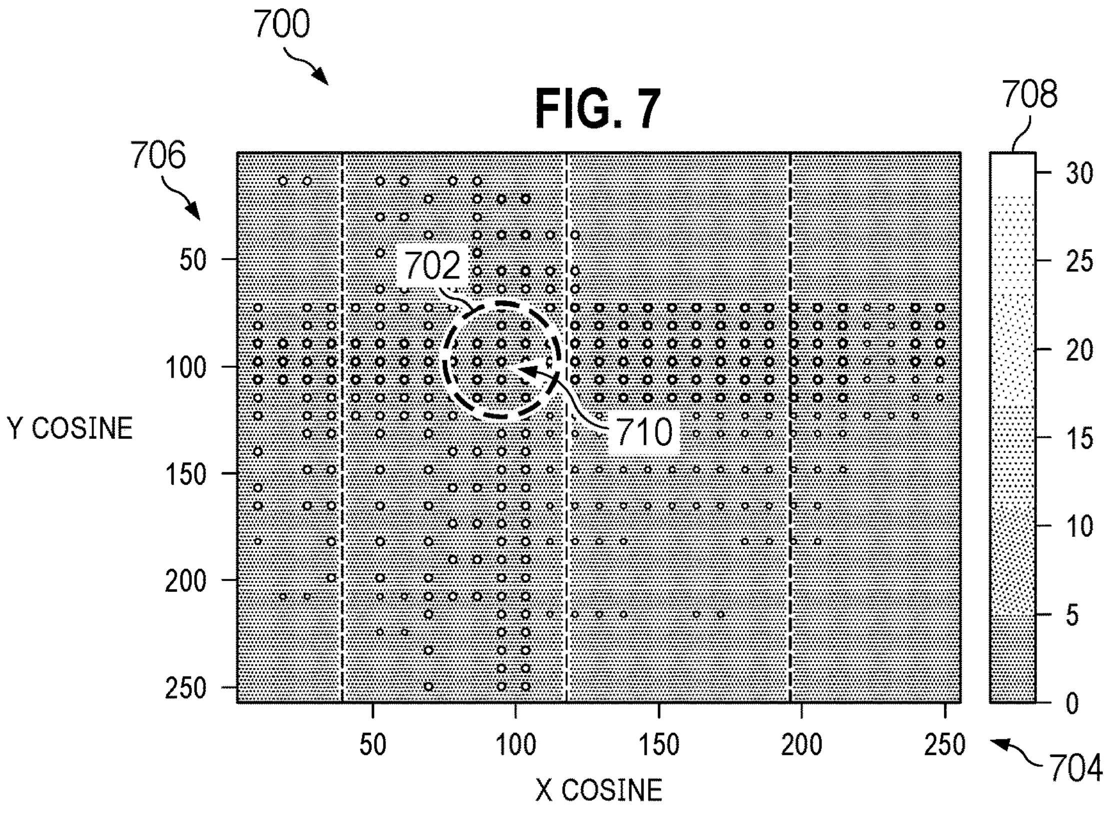
FIGS. 7 and 8 are intensity plots of example Fraunhofer diffraction patterns of ON- and OFF-modulated lights, respectively.
Figure 8:
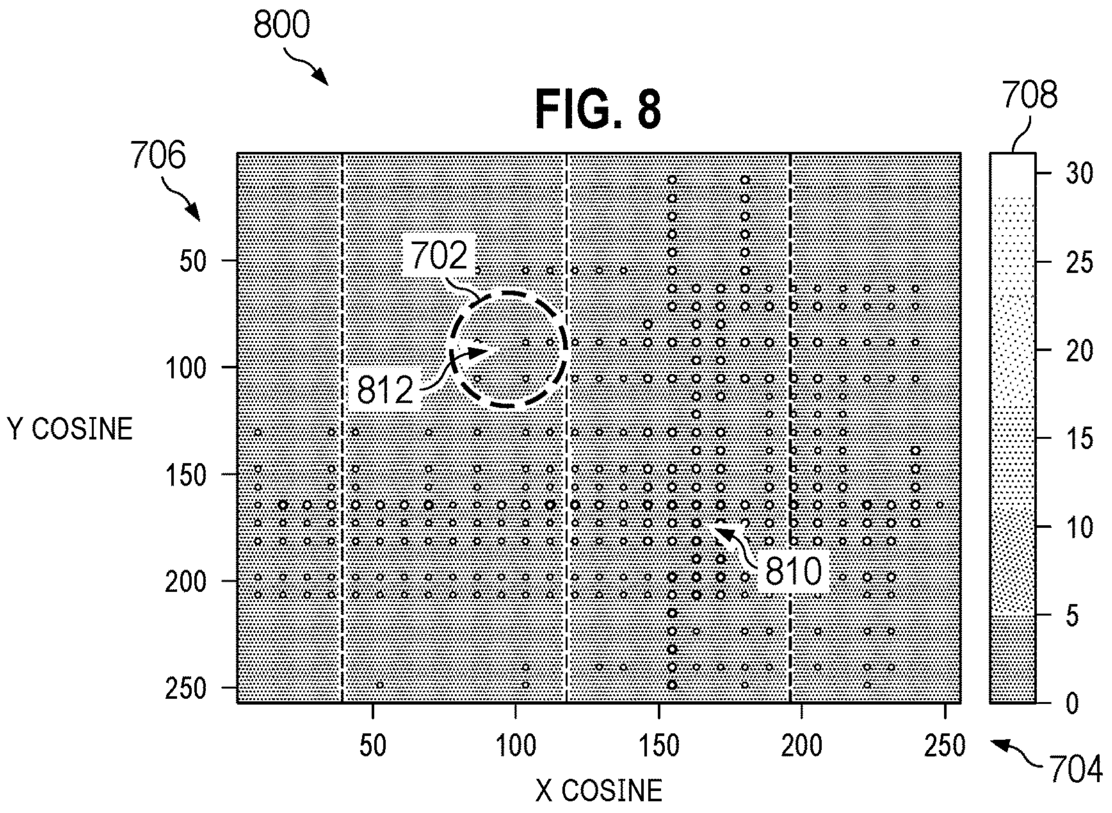

FIGS. 7 and 8 are intensity plots of example Fraunhofer diffraction patterns 700 and 800 of ON- and OFF-modulated lights 502 and 602, respectively. Diffraction patterns 700 and 800 correspond to Fourier transforms produced by one example of lens 404 at Fourier plane 408 in one embodiment of optical filter 400 implemented in an embodiment of digital projector 100 that is configured with DMD 200. Diffraction patterns 700 and 800 were generated numerically according to a procedure described in more detail below in the section "Numerical Analyses". Each diffraction pattern includes a plurality of equally-spaced diffraction peaks that each corresponds to a respective one of diffracted beams 504 or 604 of FIGS. 5 and 6, respectively. A horizontal axis 704 and a vertical axis 706 of FIGS. 7 and 8 indicate direction cosines of diffracted peaks relative to x and y axes, respectively, of coordinate system 220. FIGS. 7 and 8 indicate intensities of diffraction patterns 700 and 800 according to an intensity scale 708.

Circle 702 of FIGS. 7 and 8 represents clear aperture 508 of FIGS. 5 and 6. Diffraction peaks lying within circle 702 represent diffraction beams 518, 618 that are projected by projector lens 112 as ON- and OFF-projected lights 514, 614, respectively. In FIG. 7, a brightest (e.g., highest intensity) diffraction peak 710 at a center of circle 702 corresponds to ON-diffraction beam 504(1) of FIG. 5 and/or a zeroth order of ON-modulated light 502. Diffraction peaks lying outside of circle 702 will not be projected onto the projection screen.

In FIG. 8, a brightest diffraction peak 810, corresponding to OFF-diffraction beam 604(3), is at higher values of directional cosines outside circle 702, and therefore will not be projected onto the projection screen. However, a plurality of low-power diffraction peaks 812 in circle 702 will be projected onto projection screen as OFF projected light 614, increasing OFF luminous intensity and decreasing PCR.

To increase PCR, optical filter 400 may be implemented to reduce OFF-luminous intensity by blocking diffraction orders lying within circle 702 that contribute relatively more to OFF luminous intensity than ON luminous intensity. Fraunhofer diffraction patterns 700 and 800 are representative of Fourier transforms of modulated light 402, and illustrate how transmissive regions 416 may be configured so that optical filter mask 412 transmits desired diffraction orders for projection, and blocks all other undesired diffraction orders that otherwise would be projected. Specifically, using parameters of lens 404, the direction cosines associated with each desired diffraction peak may be converted to a spatial position on optical filter mask 412 at which a transmissive region 416 may be positioned so as to transmit the desired diffraction peak through optical filter mask 412. Similarly, the direction cosines associated with each undesired diffraction peak may be converted to a spatial position on optical filter mask 412 at which optical filter mask 412 is opaque, so as to block (e.g., filter) the undesired diffraction peak.

In one embodiment, optical filter mask 412 includes one transmissive region 416 having size, geometry, location, and orientation selected to optimize PCR and/or optical power efficiency of a digital projector. In another embodiment, optical filter mask 412 has a plurality of transmissive regions 416, and size, geometry, location, and orientation are selected for each transmissive region 416 to optimize PCR and/or optical power efficiency of a digital projector.

FIGS. 9-14 are front views of examples of optical filter mask 412 of FIG. 4, showing example configurations of transmissive region(s) 416. In each of FIGS. 9-14, a plurality of locations 902 of diffraction orders, such as diffraction orders associated with different pairs of corresponding ON- and OFF-diffracted beams 504 and 604, are indicated by X's forming a two-dimensional grid. For example, in FIG. 9, location 902(2) indicates one diffraction order blocked by an optical filter mask 900, while location 902(1) indicates one diffraction order transmitted by optical filter mask 900.

Figure 9:
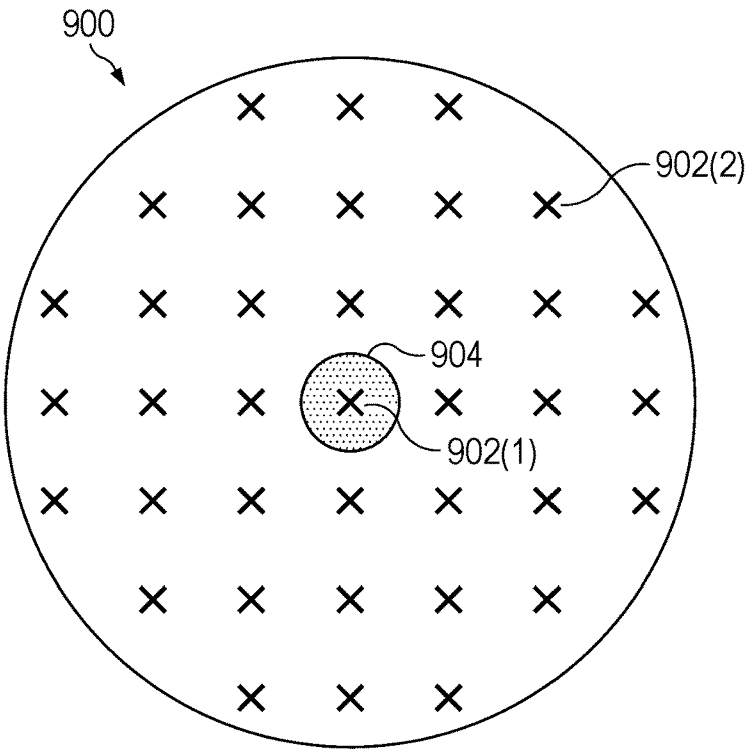
FIGS. 9-14 are front views of examples of the optical filter mask of FIG. 4, showing example configurations of transmissive region(s) of the optical filter mask.
Figure 10:
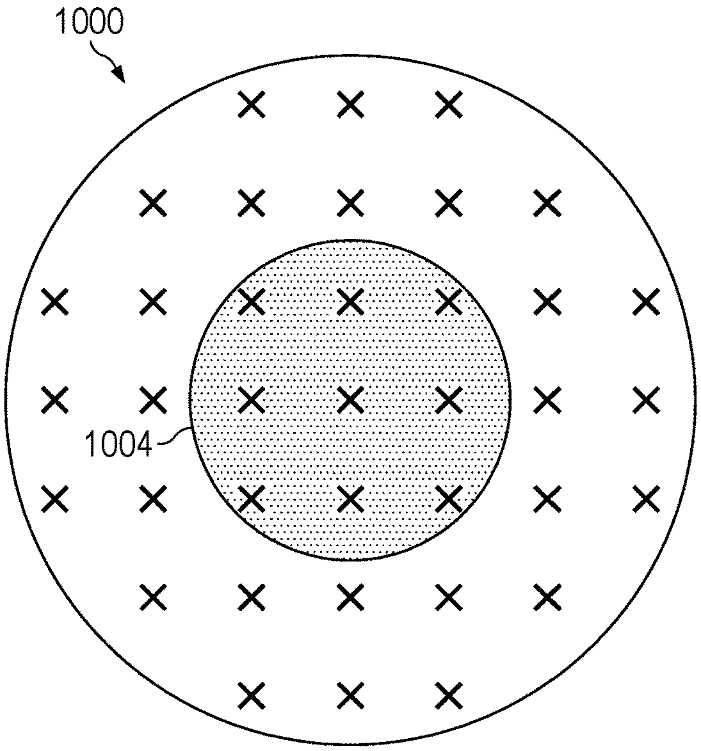

FIGS. 9 and 10 show example optical filter masks 900 and 1000 having circular transmissive regions 904 and 1004, respectively. Each of circular transmission regions 904 and 1004 may be a hole or a material that is at least partly transmissive to light. Circular transmissive regions 904 and 1004 are examples of transmissive region 416. Circular transmissive region 904 is sized to transmit one diffraction order through optical filter mask 900. Circular transmissive region 1004 is sized to transmit a plurality of diffraction orders through optical filter mask, for example nine diffraction orders forming a 3×3 grid, as shown in FIG. 9. Although FIGS. 9 and 10 show circular transmissive regions 904 and 1004 as being centered on optical filter masks 900 and 1000, respectively, so as be centered on optical axis 422, circular transmissive regions 904 and 1004 may be off-centered without departing from the scope hereof.

Figure 11:
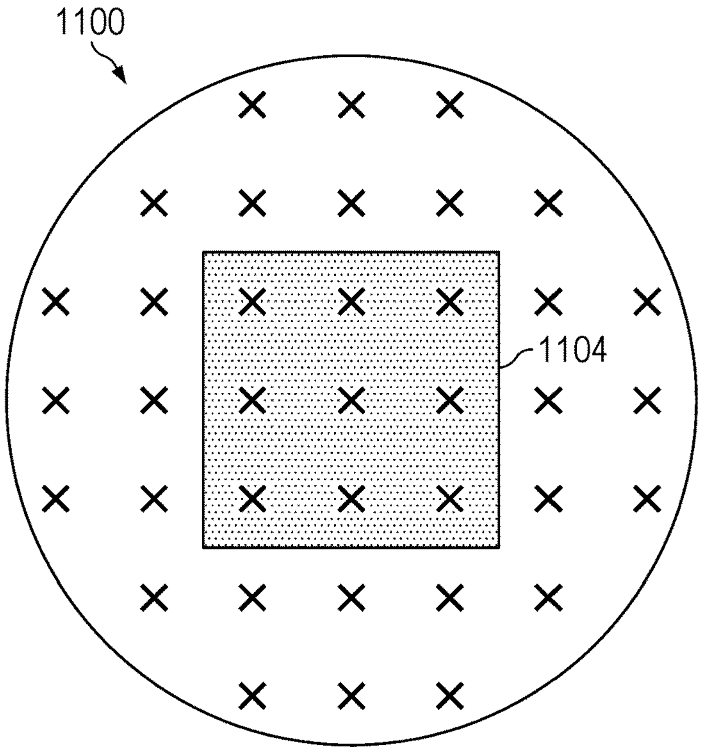
Figure 12:
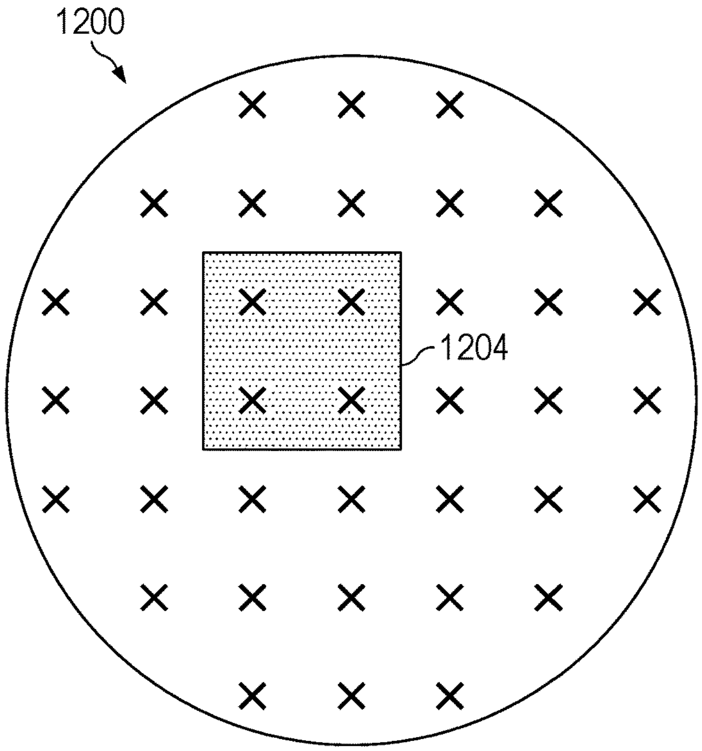

FIGS. 11 and 12 show example optical filter masks 1100 and 1200 having square transmissive regions 1104 and 1204, respectively. Each of square transmission regions 1104 and 1204 may be a hole or a material that is at least partly transmissive to light. Square transmissive regions 1104 and 1204 are examples of transmissive region 416. Square transmissive region 1104 is centered on optical filter mask 1100 and is sized to transmit a plurality of diffraction orders through optical filter mask 1100, such as nine diffractions orders forming a 3×3 grid, as shown in FIG. 11. Square transmissive region 1204 is off-centered on optical filter mask 1200 and is sized to transmit a plurality of diffraction orders through optical filter mask 1200, such as four diffraction orders forming a 2×2 grid.

Figure 13:
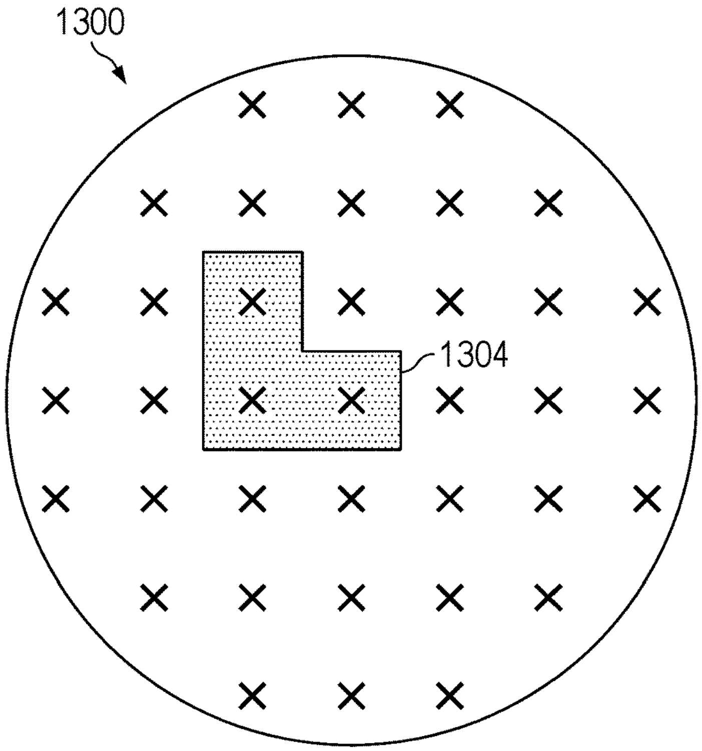

FIG. 13 shows an example optical filter mask 1300 having an irregular polygonal transmissive region 1304 configured to transmit three neighboring diffraction orders through optical filter mask 1300. Irregular polygonal transmissive region 1304 is an example of transmissive region 416 and may be a hole or a material that is at least partly transmissive to light.

Figure 14:
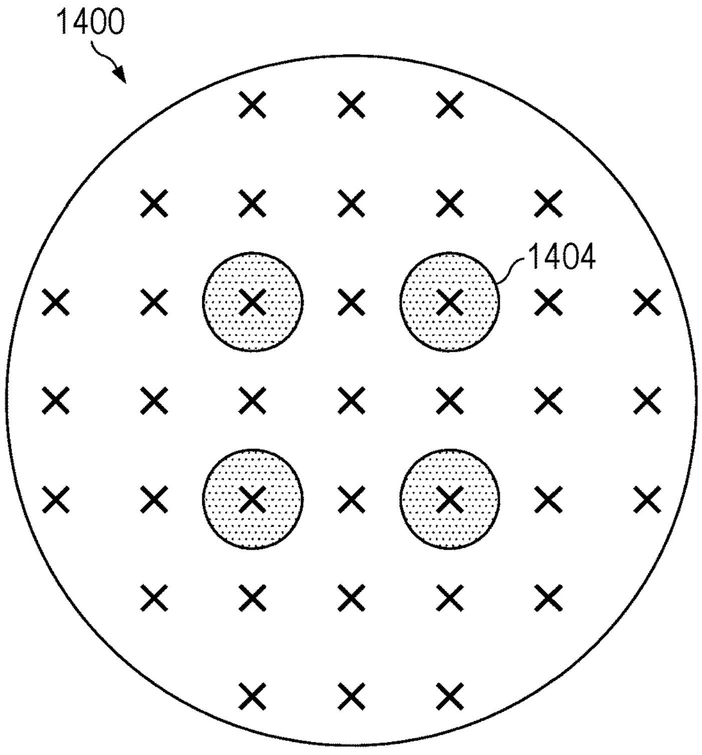

FIG. 14 shows an example optical filter mask 1400 having a plurality of circular transmissive regions 1404, each positioned and sized to transmit one diffraction order through optical filter mask 1400, such as four transmissive regions 1404. Circular transmissive regions 1404 are an example of a plurality of transmissive regions 416.

Transmissive region 416 may have another shape, size, and location than shown in the examples of FIGS. 9-14 without departing from the scope hereof. In one class of implementations, each of the examples of transmissive regions 416 shown in FIGS. 9-14 is a hole formed in optical filter mask 412 (e.g., by drilling, milling, or etching). In another class of implementations, each of the examples of transmissive regions 416 shown in FIGS. 9-14 is an optically transparent window, an optically semi-transparent window, or a color filter (e.g., dichroic filter or thin-film filter) physically coupled to optical filter mask 412 or embedded within optical filter mask 412. In the examples of FIGS. 9-14, optical filter masks (e.g., optical filter mask 900) are circularly shaped; each of these optical filter masks may instead have another shape (e.g. square or rectangular) without departing from the scope hereof. In some of the examples of FIGS. 9-14 (e.g., optical filter masks 900 and 1000), optical filter masks are configured to be centered on optical axis 422; each of these optical filter masks may instead be configured to be off-centered from optical axis 422 without departing from the scope hereof.

Optical filter mask 412 may be formed from metal, such as aluminum or stainless steel. The metal may be anodized or blackened to enhance absorption of light blocked by optical filter mask 412. Alternatively, optical filter mask 412 may be formed from a semiconductor substrate, such as silicon, into which transmissive region 416 is etched or grinded. In another embodiment, optical filter mask 412 is formed from an optically transparent substrate (e.g., glass) that is coated with an optically absorbing material (e.g., black paint) to block light in areas not coinciding with transmissive region(s) 416. In another embodiment, optical filter mask 412 is an active optical filter mask having dynamically configurable transmission regions 416, such as an array of electronically controlled mirrors.

Figure 15:
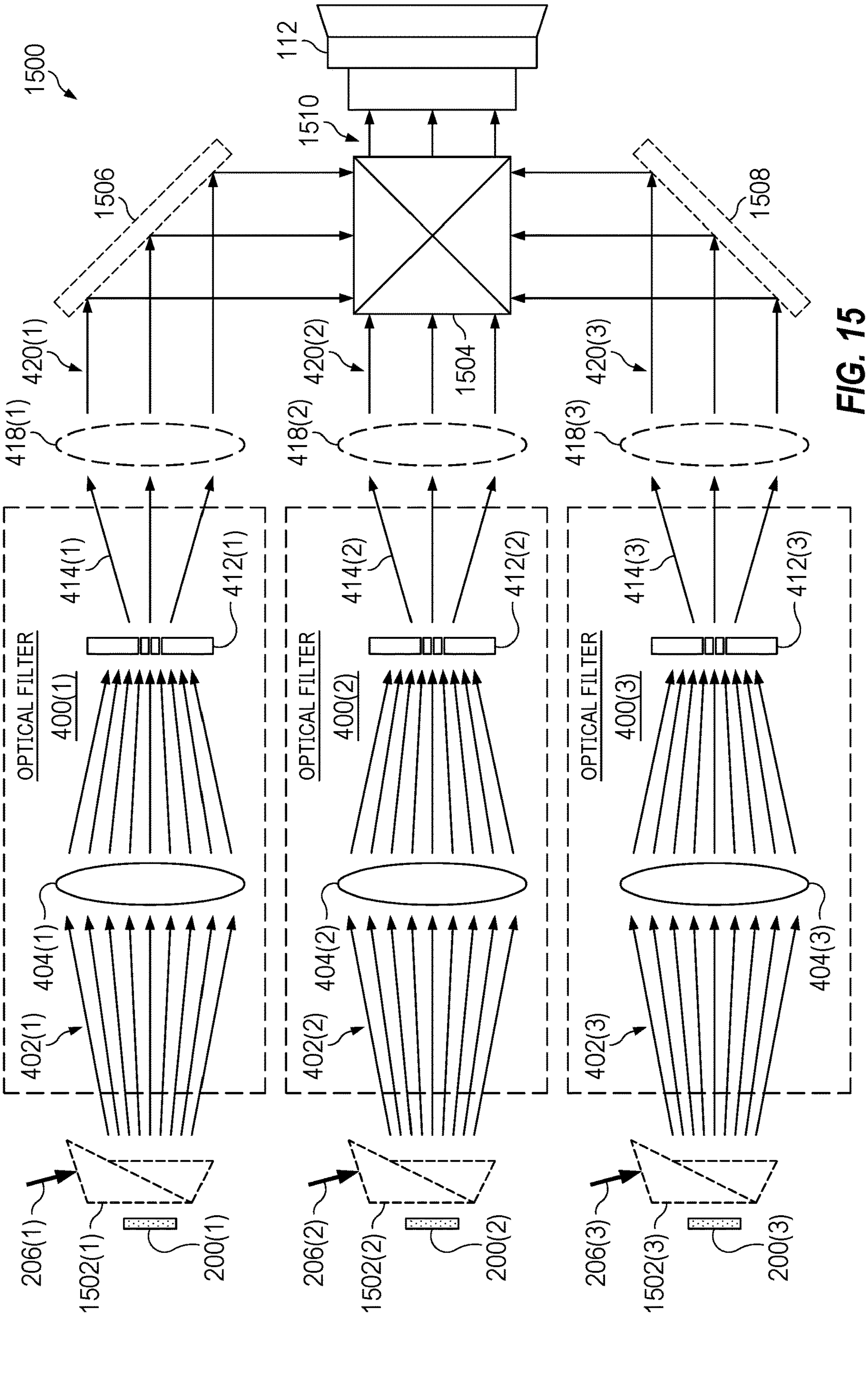
FIG. 15 illustrates a multi-color digital projector that achieves increased contrast ratio through optical filtering of each color channel in a spatially multiplexed fashion, according to an embodiment.

FIG. 15 shows one multi-color digital projector 1500 that achieves increased PCR through optical filtering of each color channel in a spatially multiplexed fashion. Digital projector 1500 has a plurality of optical filters 400 and a matching number of DMDs 200. Each optical filter 400 is paired with a respective DMD 200 to work with a different respective primary color. Each DMD 200 is an embodiment of SLM 102. In digital projector 1500, each DMD 200 may be replaced by another embodiment of SLM 102 (e.g., reflective LCOS or transmissive LC phase modulator) without departing from the scope hereof FIG. 15 depicts digital projector 1500 as having three color channels, and the following discussion is concerned with these three color channels. However, it is understood that digital projector 1500 may instead be configured with only two color channels or with more than three color channels.

DMDs 200(1), 200(2), and 200(3) modulate respective input lights 206(1), 206(2), and 206(3) into respective modulated lights 402(1), 402(2), and 403(3) that are optically filtered by respective optical filters 400(1), 400(2), and 400(3) into respective filtered lights 414(1), 414(2), and 414(3). Digital projector 1500 further includes a beam combiner 1504 that combines filtered lights 414(1), 414(2), and 414(3) into polychromatic light 1510. Projector lens 112 is configured to project polychromatic light 1510 to a projection screen. Digital projector 1500 is an embodiment of digital projector 100 extended to handling of three separate chromatic inputs, so as to output polychromatic light.

In one embodiment, digital projector 1500 includes collimating lenses 418(1), 418(2), and 418(3) that collimate respective filtered lights 414(1), 414(2), and 414(3) into respective collimated lights 420(1), 420(2), and 420(3). In this embodiment, beam combiner 1504 combines collimated lights 420(1), 420(2), and 420(3), as shown in FIG. 15. In embodiments of digital projector 1500 that do not include collimating lenses 418, beam combiner 1504 combines filtered lights 414(1), 414(2), and 414(3) that are not collimated.

In one embodiment, digital projector 1500 includes total internal reflection (TIR) prisms 1502(1), 1502(2), and 1503 (3) that reflect input lights 206(1), 206(2), and 206(3) to respective DMDs 200(1), 200(2), and 200(3), and transmit respective modulated lights 402(1), 402(2), and 402(3) to respective optical filters 400(1), 400(2), and 400(3). Digital projector 1500 may be configured with mirrors 1506 and 1508 that steer collimated lights 420(1) and 420(3) to beam combiner 1504, as shown in FIG. 15. While shown in FIG. 15 as a cross dichroic, or x-cube, prism, beam combiner 1504 may be another type of beam combiner known in the art.

In one implementation of digital projector 1500, first, second, and third primary colors are red, green, and blue, respectively. When input lights 206(1), 206(2), and 206(3) are monochromatic, the wavelength of each input light 206(1), 206(2), and 206(3) may be chosen such that input lights 206(1), 206(2), and 206(3) represent red, green, and blue primary colors, respectively, that are spectrally pure. In one such example, the wavelength of input light 206(1) representing the red primary color is one of 615 nm, 640 nm, and 655 nm, the wavelength of input light 206(2) representing the green primary color is one of 525 nm, 530 nm, and 545 nm, and the wavelength of input light 206(3) representing the blue primary color is one of 445 nm, 450 nm, and 465 nm. Alternatively, input lights 206(1), 206(2), and 206(3) may be polychromatic such that red, green, and blue primary colors are not spectrally pure colors. Without departing from the scope hereof, the three primary colors may be a different set of colors than red, green, and blue.

Digital projector 1500 increases PCR by increasing PCR of each primary color (e.g., red, green, and blue). Several optical processes used by digital projector 1500 depend on wavelength, including diffraction of input light 206 by DMD 200, refraction of modulated light 402 by TIR prism 1502, and focusing of modulated light 402 by lens 404. Therefore, the Fraunhofer diffraction pattern of each of modulated lights 402(1), 402(2), and 402(3) depends on wavelength. In one embodiment, optical filter masks 412(1), 412(2), and 412(3) are individually configured based on the wavelength of each of respective input lights 206(1), 206(2), and 206(3) so as to increase PCR of first, second, and third primary colors, respectively.

Figure 16:
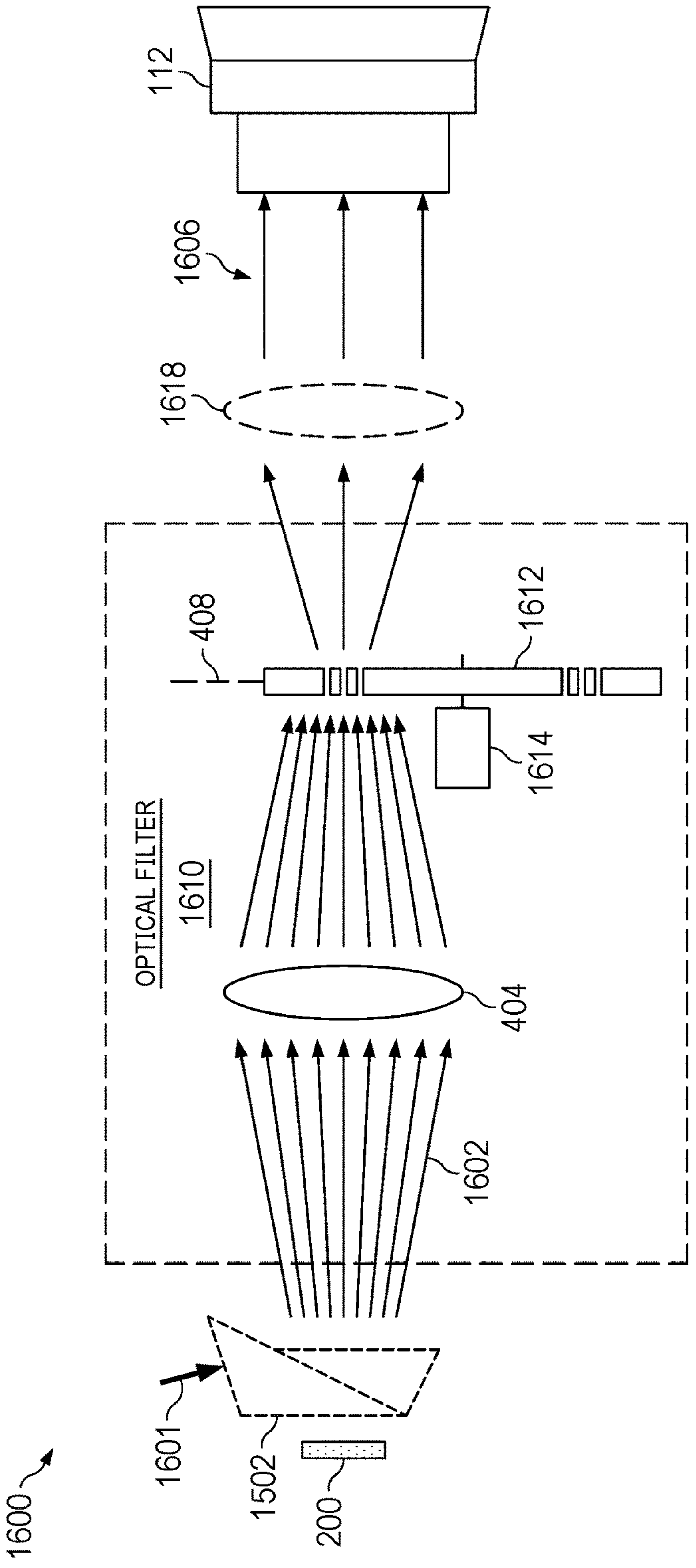
FIG. 16 illustrates a multi-color digital projector that achieves increased contrast ratio through time-multiplexed optical filtering of different color channels, according to an embodiment.
Figure 17:
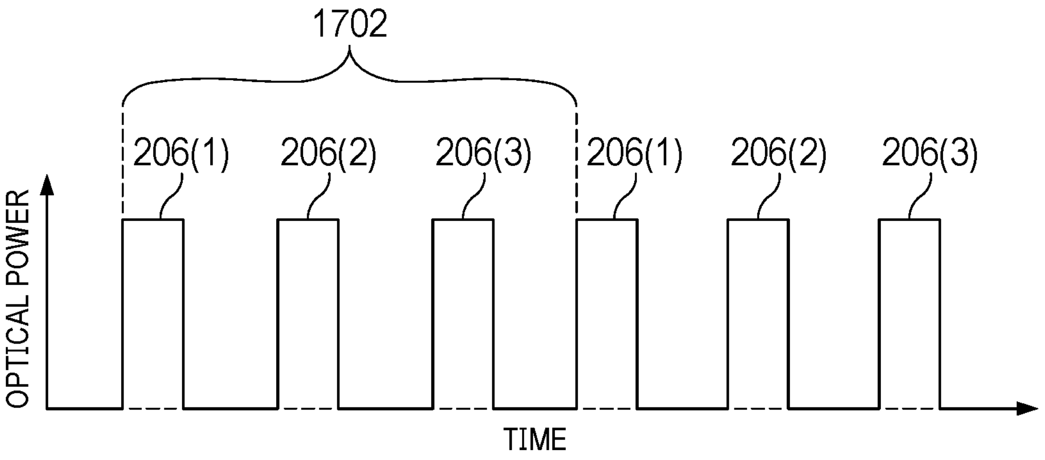
FIG. 17 is a plot of optical power versus time for time-multiplexed light used as input light to the digital projector of FIG. 16, according to an embodiment.
Figure 18:
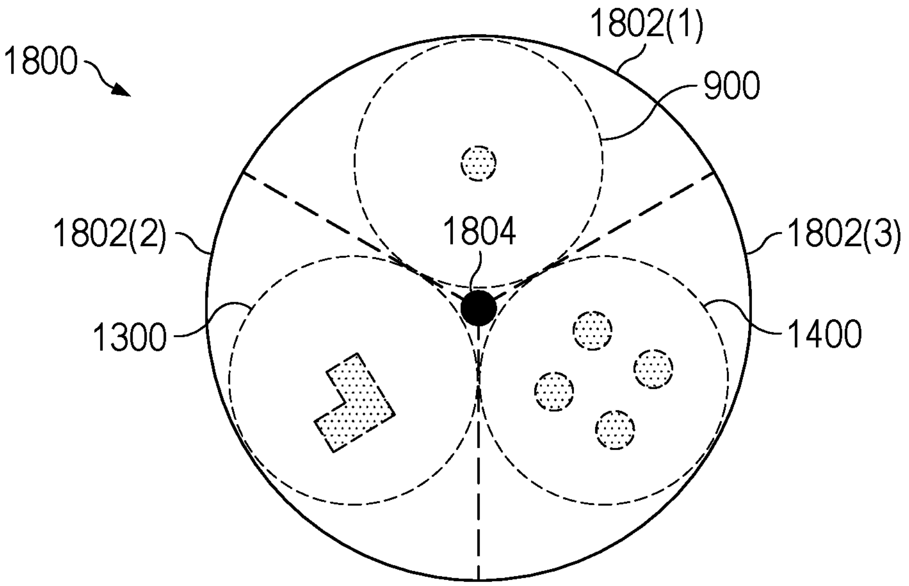
FIG. 18 is a front view of an example filter wheel having three sectors, each of the sectors containing one optical filter mask.
Figure 19:
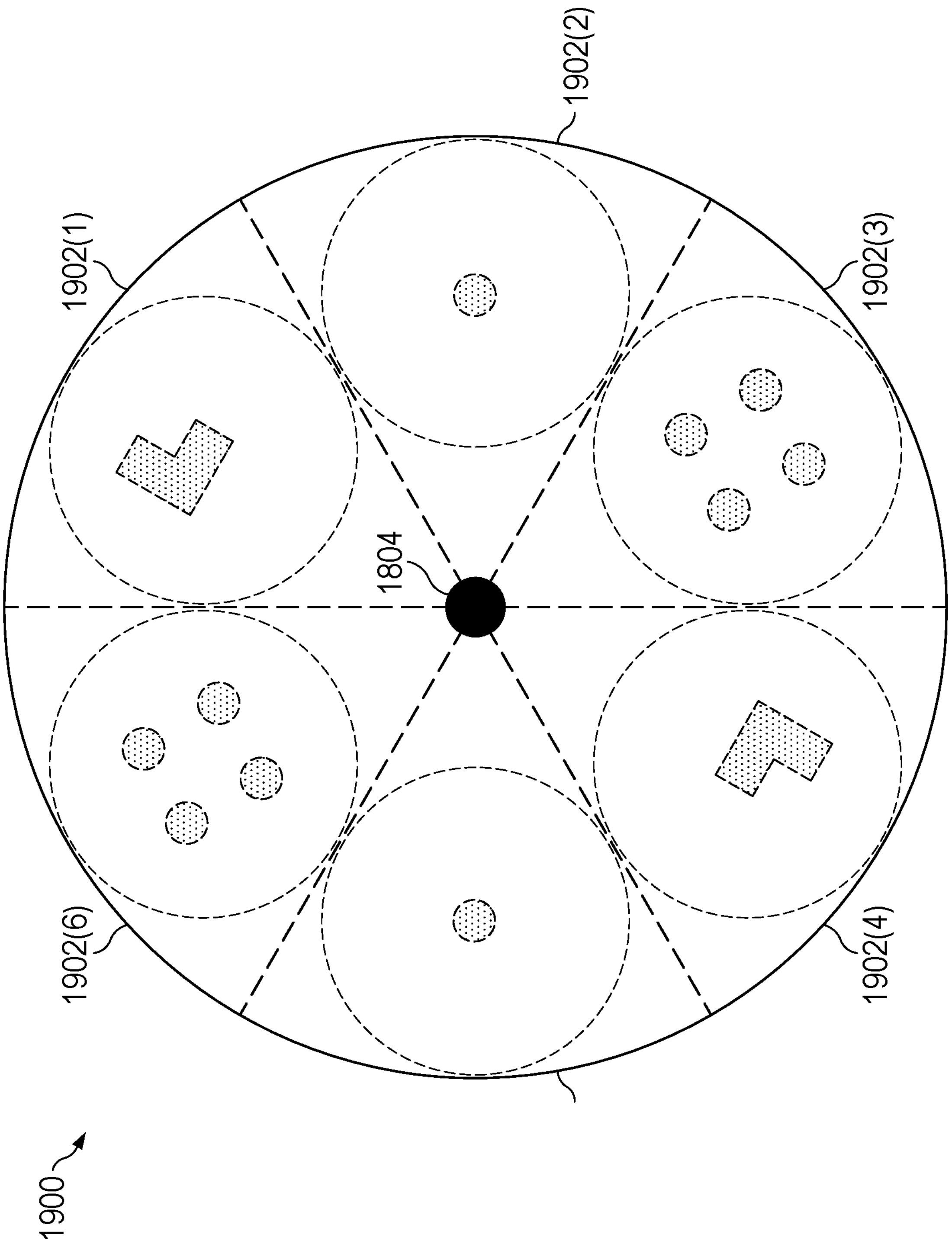
FIG. 19 is a front view of an example filter wheel having six sectors, each of the sectors containing one optical filter mask.

FIG. 16 shows one example of a multi-color digital projector 1600 that achieves increased PCR through time-multiplexed optical filtering of different color channels. Digital projector 1600 includes one DMD 200 and one optical filter 1610 having a filter wheel 1612. FIG. 17 is a plot of optical power versus time for time-multiplexed light 1601 used as input light to digital projector 1600. FIGS. 18 and 19 show examples of filter wheel 1612. FIGS. 16-19 are best viewed together in the following description.

Time-multiplexed light 1601 includes a repeating sequence 1702 of a plurality of temporally-separated input lights 206. Although digital projector 1600 may be configured to accept and output input lights of three different colors, FIGS. 17-19 and the following discussion are concerned with a three-color embodiment of digital projector 1600. In this embodiment, time-multiplexed light 1601 includes temporally-separated input lights 206(1), 206(2), and 206(3). FIG. 17 shows one example of time-multiplexed light 1601, where sequence 1702 includes a first pulse of input light 206(1), a second pulse of input light 206(2), and a third pulse of input light 206(3). Input lights 206(1), 206(2), and 206(3) may represent red, green, and blue primary colors, respectively. Pulses of input lights 206(1), 206(2), and 206(3) are spatially overlapped so as to use the same DMD 200, optical filter 1610, and projector lens 112. In the example of FIG. 17, pulses of input lights 206(1), 206(2), and 206(3) are depicted as having a similar power (e.g., pulse height), duration (e.g., pulse width), and "off" time between pulses (e.g., pulse spacing). Digital projector 1600 may accept input lights 206 characterized by other configurations of power, duration, and "off" time without departing from the scope hereof. For example, a selected one of first, second, and third pulses of input lights 206(1), 206(2), and 206(3) may have a higher power to compensate for a lower diffraction efficiency of DMD 200 at a wavelength of input light corresponding to the selected pulse.

DMD 200 is configured to synchronously modulate, according to an image, input lights 206(1), 206(2), and 206(3) of time-multiplexed light 1601 into time-multiplexed modulated light 1602. In other words, micromirrors 202 of DMD 200 are manipulated to have a first configuration when time-multiplexed modulated light 1602 is first input light 206(1), a second configuration when time-multiplexed modulated light 1602 is second input light 206(2), and a third configuration when time-multiplexed modulated light 1602 is third input light 206(3). The first, second, and third configurations may be different. DMD 200 is an embodiment of SLM 102. In digital projector 1600, DMD 200 may be replaced by another embodiment of SLM 102 (e.g., reflective LCOS or transmissive LC phase modulator) without departing from the scope hereof.

Optical filter 1610 is similar to optical filter 400 of FIG. 4, except that filter wheel 1612 replaces optical filter mask 412. Filter wheel 1612 contains a plurality of optical filter masks 412 configured to synchronously filter input lights 206(1), 206(2), and 206(3) of time-multiplexed modulated light 1602. For example, in the embodiment where filter wheel 1612 contains first, second, and third optical filter masks corresponding to first, second, and third input lights 206(1), 206(2), and 206(3), motor 1614 rotates filter wheel 1612 such that a first optical filter mask 412 intercepts and filters time-multiplexed modulated light 1602 at Fourier plane 408 when time-multiplexed modulated light 1602 is first input light 206(1), a second optical filter mask 412 intercepts and filters time-multiplexed modulated light 1602 at Fourier plane 408 when time-multiplexed modulated light 1602 is second input light 206(2), and a third optical filter mask 412 intercepts and filters time-multiplexed modulated light 1602 at Fourier plane 408 when time-multiplexed modulated light 1602 is third input light 206(3).

In one embodiment of digital projector 1600, motor 1614 rotates filter wheel 1612 in a stepwise manner to switch between different optical filter masks 412 synchronously with the sequence of pulses of input lights 206(1), 206(2), and 206(3), while maintaining a stationary position of filter wheel 1612 during the propagation of each of these pulses through Fourier plane 408. In this embodiment, motor 1614 operates as follows: Prior to a pulse of input lights 206(1), 206(2), and 206(3) reaching Fourier plane 408, motor 1614 rotates filter wheel 1612 to position a corresponding optical filter mask 412 in the path of time-multiplexed modulated light 1602 at Fourier plane 408. After the corresponding pulse of filtered light has finished propagating through optical filter mask 412, motor 1614 then rotates filter wheel 1612 to position the next optical filter mask 412 in the path of time-multiplexed modulated light 1602 at Fourier plane 408.

In certain embodiments, lens 404, as implemented in optical filter 1610 to focus time-multiplexed modulated light 1602, may be configured to reduce chromatic aberrations that cause the focal length of lens 404 to change with wavelength. In one such embodiment, lens 404 is an achromatic lens designed to focus similarly at the wavelengths of input lights 206(1), 206(2), 206(3) so that Fourier planes corresponding to each of the three wavelengths are similarly positioned. In another such embodiment, lens 404 is an apochromatic lens, superachromatic lens, objective lens, compound lens with multiple lens elements, an assembly of several lenses and/or other optical elements, or another type of lens known in the art. Lens 404 may have one or more anti-reflection coatings that enhance transmission of time-multiplexed modulated light 1602 through lens 404 at the wavelengths of input lights 206(1), 206(2), 206(3).

In one embodiment, digital projector 1600 is configured with a collimating lens 1618 that collimates filtered time-multiplexed light, as transmitted by filter wheel 1612, into collimated time-multiplexed light 1606 that is projected onto a screen by projector lens 112. In another embodiment, projector lens 112 is configured to accept time-multiplexed light that is not collimated, wherein collimating lens 1618 is not included with digital projector 1600.

FIG. 18 is a front view of one filter wheel 1800 having three sectors 1802, each containing one optical filter mask. Filter wheel 1800 is an example of filter wheel 1612. Motor 1614 rotates filter wheel 1800 about an axle 1804, with each rotation of filter wheel 1800 corresponding to one sequence 1702 of time-multiplexed light 1602. In some embodiments, motor 1614 rotates filter wheel 1800 in a stepwise manner, as described previously. In the example of FIG. 18, a first optical filter mask of first sector 1802(1) is shown as example optical filter mask 900 of FIG. 9, a second optical filter mask of second sector 1802(2) is shown as example optical filter mask 1300 of FIG. 13, and a third optical filter mask of third sector 1802(3) is shown as example optical filter mask 1400 of FIG. 14. However, the optical filter masks of sectors 1802 may be configured with transmissive regions (e.g., transmissive region 416) having other shapes, sizes, and locations than shown in FIG. 18 without departing from the scope hereof.

In one embodiment, digital projector 1600 is configured to display images without certain temporal artifacts, and the duration of sequence 1702 is, for this purpose, shorter than a response time of the human visual system. For example, the multiplexing frequency of time-multiplexed light 1601, equal to an inverse of the duration of sequence 1702, may be higher than a flicker fusion rate so as to utilize persistence of vision. The multiplexing frequency may be 1 kilohertz or higher, corresponding to pulse width less than 1 millisecond for each of input lights 206(1), 206(2), and 206(3).

FIG. 19 is a front view of another filter wheel 1900 that has six sectors 1902, each containing one optical filter mask. Motor 1614 rotates filter wheel 1900 about axle 1804 such that each full rotation of filter wheel 1900 corresponds to two consecutive iterations of sequence 1702. One advantage of filter wheel 1900 over filter wheel 1800 is that filter wheel 1900 rotates at half the multiplexing frequency of time-multiplexed light 1601, thereby reducing power consumption and speed requirements of motor 1614. In another embodiment, filter wheel 1612 has 3×n sectors, wherein n is a positive integer. Each set of three sectors contains three optical filter masks, and each full rotation of filter wheel 1900 corresponds to n consecutive iterations of sequence 1702, thereby allowing motor 1614 and filter wheel 1612 to rotate at 1/n times the multiplexing frequency of time-multiplexed light 1601. In one use scenario, motor 1614 rotates filter wheel 1900 in a stepwise manner, such that each optical filter mask of filter wheel 1900 is stationary while filtering a corresponding pulse of input light 206.

Figure 20:
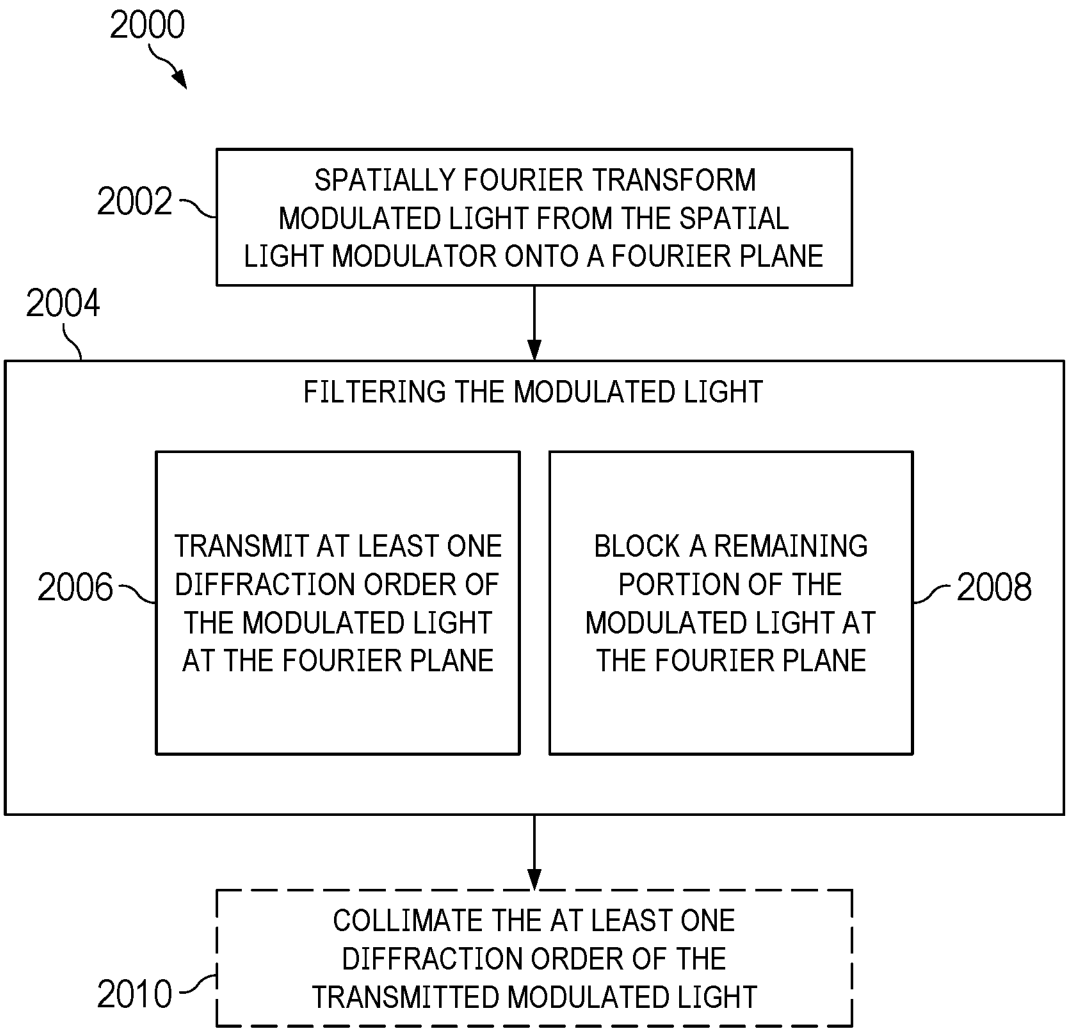
FIG. 20 shows a method for improving contrast of an image generated with a spatial light modulator, according to an embodiment.

FIG. 20 shows a method 2000 for improving contrast of an image generated with a spatial light modulator. Method 2000 may be performed by optical filter 400. Method 2000 includes a step 2002 that spatially Fourier transforms modulated light from the spatial light modulator onto a Fourier plane. The modulated light includes a plurality of diffraction orders. In one example of step 2002, lens 404 spatially Fourier transforms modulated light 402 onto Fourier plane 408. Method 2000 also includes a step 2004 that filters the modulated light as Fourier transformed by step 2002. Step 2004 includes two steps 2006 and 2008 that may occur simultaneously. Step 2006 transmits at least one diffraction order of the modulated light at the Fourier plane. Step 2008 blocks a remaining portion of the modulated light at the Fourier plane. In one example of steps 2006 and 2008, optical filter mask 412 transmits at least one diffraction order of modulated light 402 through transmissive region(s) 416 at Fourier plane 408, and blocks a remaining portion of modulated light 402 at Fourier plane 408. In another example of steps 2006 and 2008, optical filter mask 412 transmits the zeroth diffraction order of modulated light 402 through transmissive region(s) 416 at Fourier plane 408, and blocks a remaining portion of modulated light 402 at Fourier plane 408. In another example of method 2000, modulated light 402 is monochromatic light. In another example of method 2000, modulated light 402 is one of red light, green light, and blue light. In another example of method 2000, modulated light 402 is polychromatic light formed by combining red light, green light, and blue light. In this example, modulated light 402 may be white light. In an embodiment, method 2000 further includes a step 2010 that collimates, after step 2006, the at least one diffraction order of the transmitted modulated light. In one example of step 2010, collimating lens 418 collimates filtered light 414.

Figure 21:
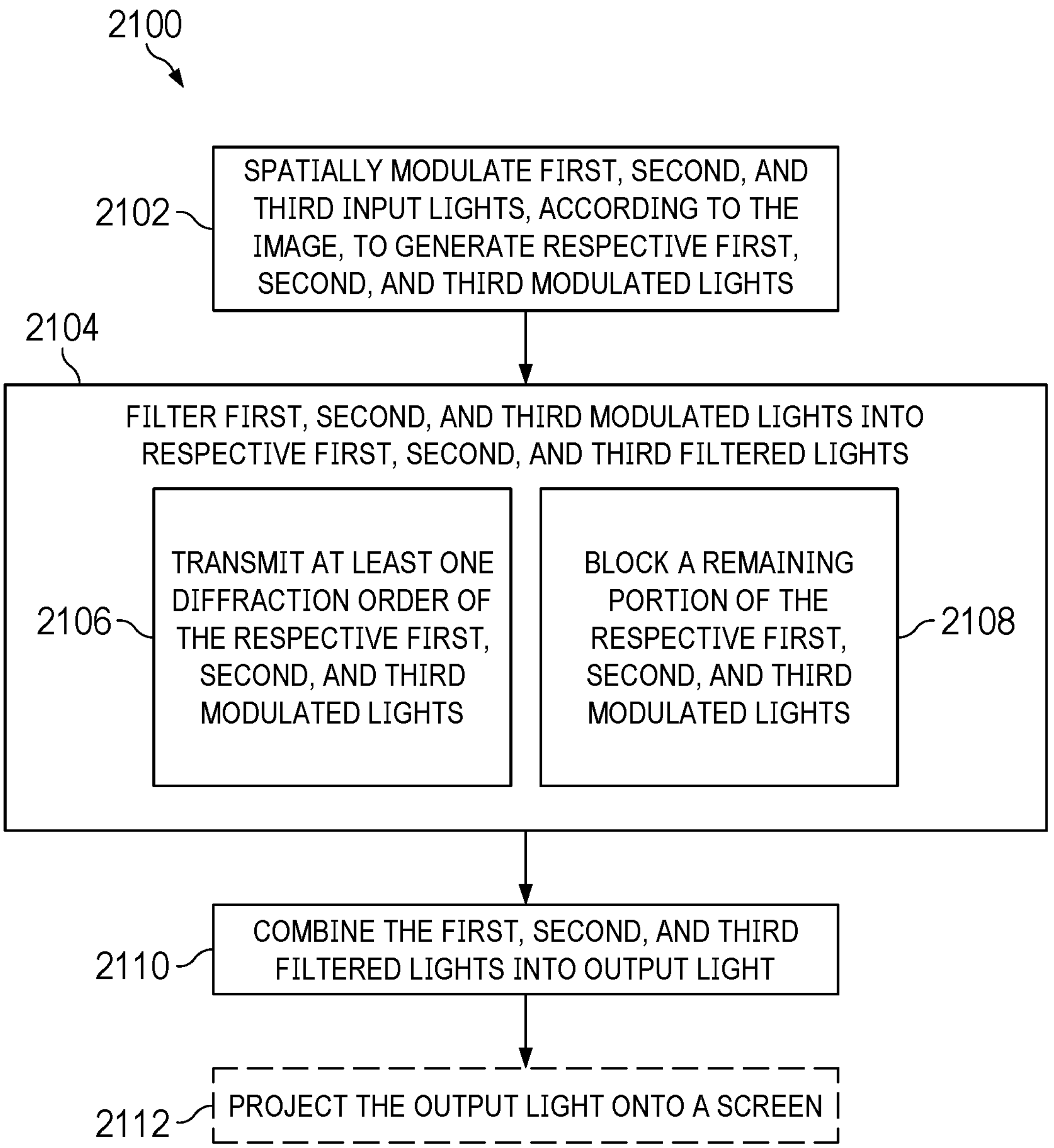
FIG. 21 shows a method for projecting a color image with increased contrast through optical filtering of each color channel in a spatially multiplexed fashion, according to an embodiment.

FIG. 21 shows a method 2100 for projecting a color image with increased contrast through optical filtering of each color channel in a spatially multiplexed fashion. Method 2100 may be performed by digital projector 1500. Method 2100 includes a step 2102 that spatially modulates first, second, and third input lights, according to the image, to generate respective first, second, and third modulated lights. The first, second, and third input lights represent light for three different respective color channels of the color image, for example as discussed above in reference to FIG. 15. Each of the first, second, and third modulated lights includes a plurality of diffraction orders. In one example of step 2102, DMDs 200(1), 200(2), and 200(3) of FIG. 15 spatially modulate respective first, second, and third input lights 206(1), 206(2), and 206(3) into respective first, second, and third modulated lights 402(1), 402(2), and 402(3). Method 2100 also includes a step 2104 that filters the first, second, and third modulated lights (generated in step 2102) into respective first, second, and third filtered lights. In an embodiment, step 2104 performs method 2002 on each of the first, second, and third modulated lights to produce the first, second, and third filtered lights. In one example of such an embodiment of step 2104, optical filter masks 412(1), 412(2), and 412(3) of digital projector 1500 filter respective first, second, and third modulated lights 402(1), 402(2), and 402(3), as Fourier transformed, into respective first, second, and third filtered lights 414(1), 414(2), and 414(3). Step 2104 includes steps 2106 and 2108 that may occur simultaneously. Step 2106 transmits at least one diffraction order of each of the first, second, and third modulated lights. Step 2108 blocks a remaining portion of the first, second, and third modulated lights. In one example of steps 2106 and 2108, optical filter masks 412(1), 412(2), and 412(3) of digital projector 1500 transmit at least one diffraction order of each of first, second, and third modulated lights 402(1), 402(2), and 402(3), as Fourier transformed, and block a remaining portion of first, second, and third modulated lights 402(1), 402(2), and 402(3). Method 2100 also includes a step 2110 that combines the first, second, and third filtered lights, generated in step 2104, to form output light. in one example of step 2110, beam combiner 1504 combines first, second, and third filtered lights 414(1), 414(2), and 414(3) into output light 1510. In an embodiment, method 2100 further includes a step 2112 that projects the output light onto a screen. In one example of step 2112, projector lens 112 projects output light 1510 onto a screen, such as screen 116.

Without departing from the scope hereof, method 2100 may be extended to process only two color channels, or more than three color channels, for example four color channels.

Figure 22:
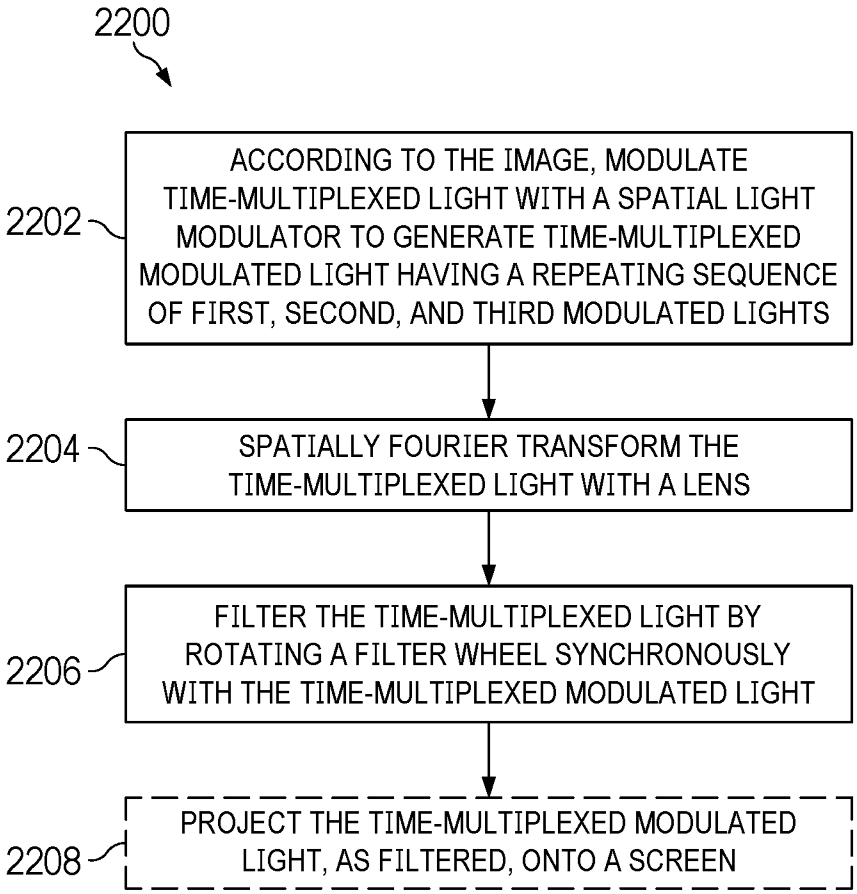
FIG. 22 shows a time-multiplexing method to generate and project a color image with increased contrast, according to an embodiment.

FIG. 22 shows a time-multiplexing method 2200 to generate and project a color image with increased contrast. Method 2200 may be performed by digital projector 1600. Method 2200 includes a step 2202 that, according to the color image to be projected, modulates time-multiplexed light with a spatial light modulator to generate a time-multiplexed modulated light having a repeating sequence of first, second, and third modulated lights. The first, second, and third modulated lights represent light for three different respective color channels of the color image, for example as discussed above in reference to FIG. 16. In one example of step 2202, DMD 200 of digital projector 1600 modulates time-multiplexed light 1601 into time-multiplexed modulated light 1602. Method 2200 also includes a step 2204 that spatially Fourier transforms the time-multiplexed modulated light (generated in step 2202) with a lens. In one example of step 2204, lens 1604 spatially Fourier transforms time-multiplexed modulated light 1602. Method 2200 further includes a step 2206 that filters the time-multiplexed modulated light, as spatially Fourier transformed by step 2204, by rotating a filter wheel synchronously with the time-multiplexed modulated light. The filter wheel includes a plurality of optical filter masks, each configured to filter a corresponding one of the first, second, and third modulated lights as spatially Fourier-transformed by the lens in step 2204. Step 2206 rotates the filter wheel to position each optical filter mask in the spatially Fourier transformed light when the time-multiplexed modulated light is the corresponding one of the first, second, and third modulated lights. In one example of step 2206, motor 1614 rotates filter wheel 1612 synchronously with time-multiplexed modulated light 1602, as discussed above in reference to FIG. 16. In another example of step 2206, motor 1614 rotates filter wheel 1612 in a stepwise manner so that each optical filter mask is stationary while filtering a corresponding modulated light. In one embodiment, method 2200 further includes a step 2208 that projects the time-multiplexed modulated light, as filtered, onto a screen. As an example of step 2208, projector lens 112 projects time-multiplexed light, as filtered by optical filter mask 1612 and optionally collimated by collimating lens 1618, onto a projector screen.

Without departing from the scope hereof, method 2200 may be extended to process only two color channels, or more than three color channels, for example four color channels.

Numerical Analyses

The following discussion is concerned with numerical analyses to study how contrast ratio of a digital projector, configured with DMD 200, depends upon various parameters, including wavelength, ON and OFF tilt angles of micromirrors 202, tolerances of ON and OFF tilt angles, geometries of transmissive region 416 of optical filter mask 412, angular and spectral diversities of input light 206, and the effective size of the illumination source generating input light 206. Digital projectors 100, 500, 1500, and 1600 may be configured according to the parameters studied in these numerical analyses.

Figure 23:
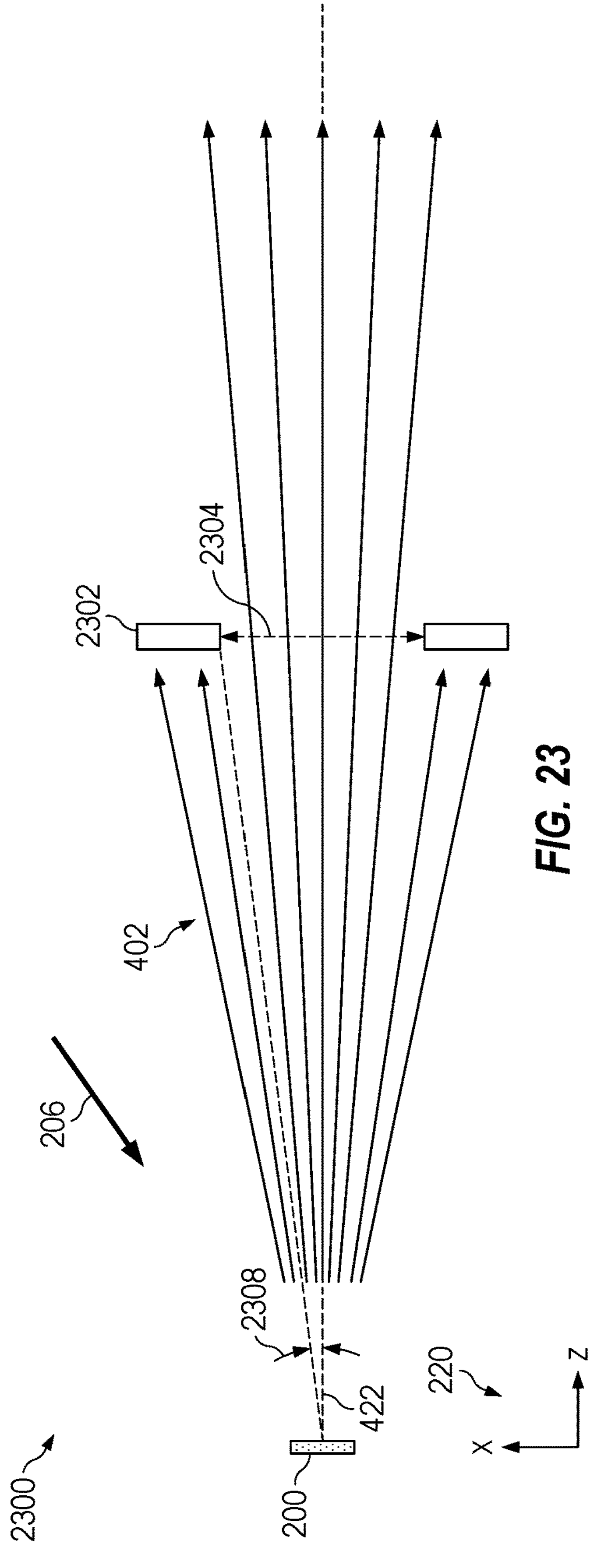
FIG. 23 is a side view of a simulated experiment.

FIG. 23 is a side view of a simulated experiment 2300 for which numerical results are presented in this section. In simulated experiment 2300, DMD 200 modulates input light 206 into modulated light 402 containing a plurality of diffraction orders. A Fraunhofer diffraction pattern of modulated light 402 is calculated, and a spatial filter 2302 is modeled by labeling each diffraction order of the Fraunhofer diffraction pattern as either transmitted or blocked by spatial filter 2302, depending on a geometry and configuration of spatial filter 2302. Spatial filter 2302 is one example of optical filter mask 412. A contrast ratio of simulated experiment 2300 is obtained by numerically integrating diffraction orders labeled as transmitted by spatial filter 2302, once when micromirrors 202 of DMD 200 are configured to be in the ON position, and again when micromirrors 202 of DMD 200 are configured to be in the OFF position. These two numerical integrations correspond to ON and OFF luminous intensities, respectively, the ratio of which defines the contrast ratio.

A Fraunhofer diffraction pattern may be calculated for simulated experiment 2300 using the Rayleigh-Sommerfeld formalism of scalar diffraction theory. This formalism features the Rayleigh-Sommerfeld integral, which expresses a complex amplitude of a diffracted electric field as an integral (e.g., sum) over spherical waves.

It is understood that the numerical analyses presented herein are not limited to DMD 200 but are readily extended to other embodiments of SLM 102, such as a reflective LCOS phase modulator, or transmissive LC phase modulator.

Figure 24:
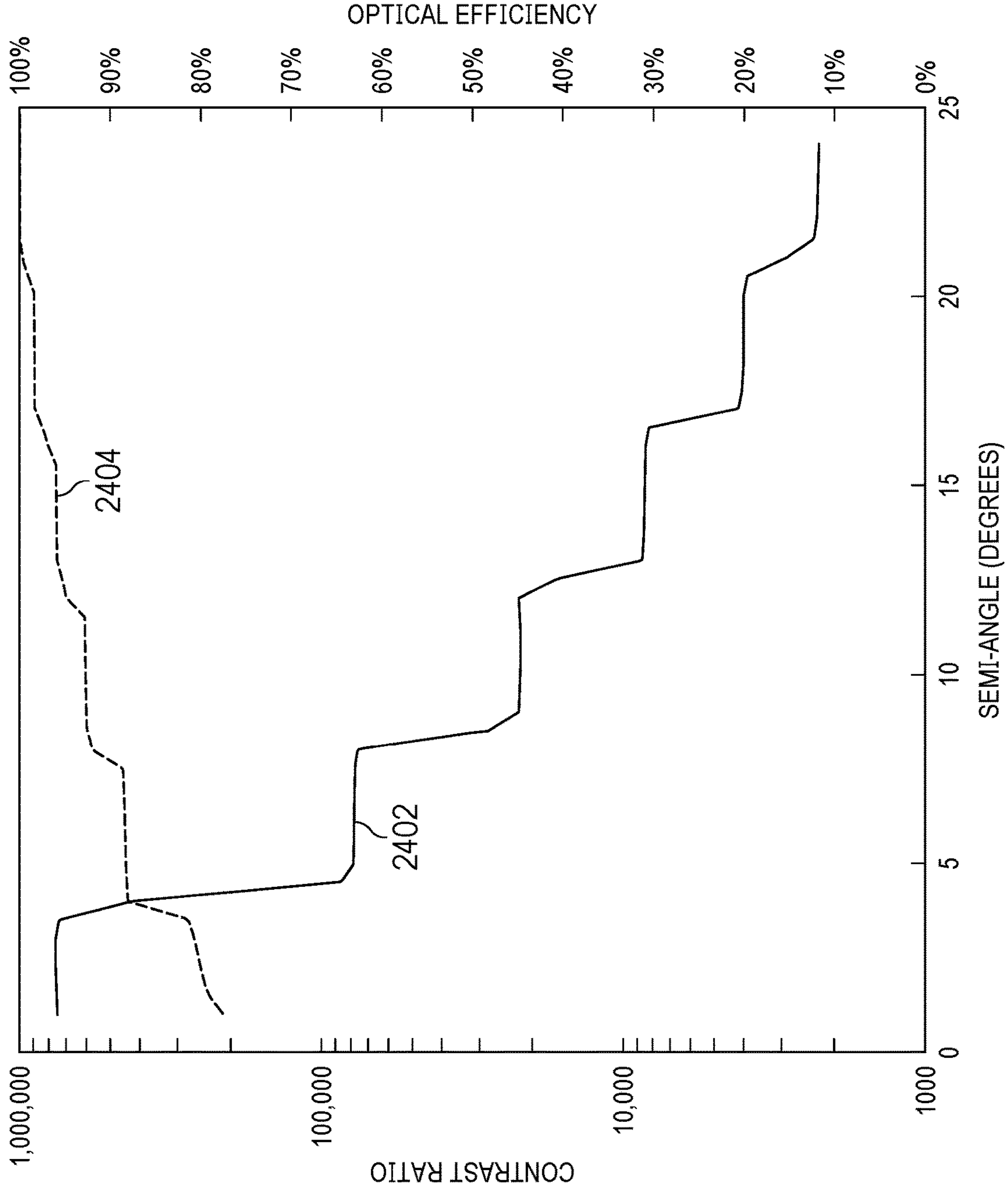
FIGS. 24-26 are plots of contrast ratio and optical efficiency versus semi-angle obtained numerically for the simulated experiment of FIG. 23.
Figure 25:
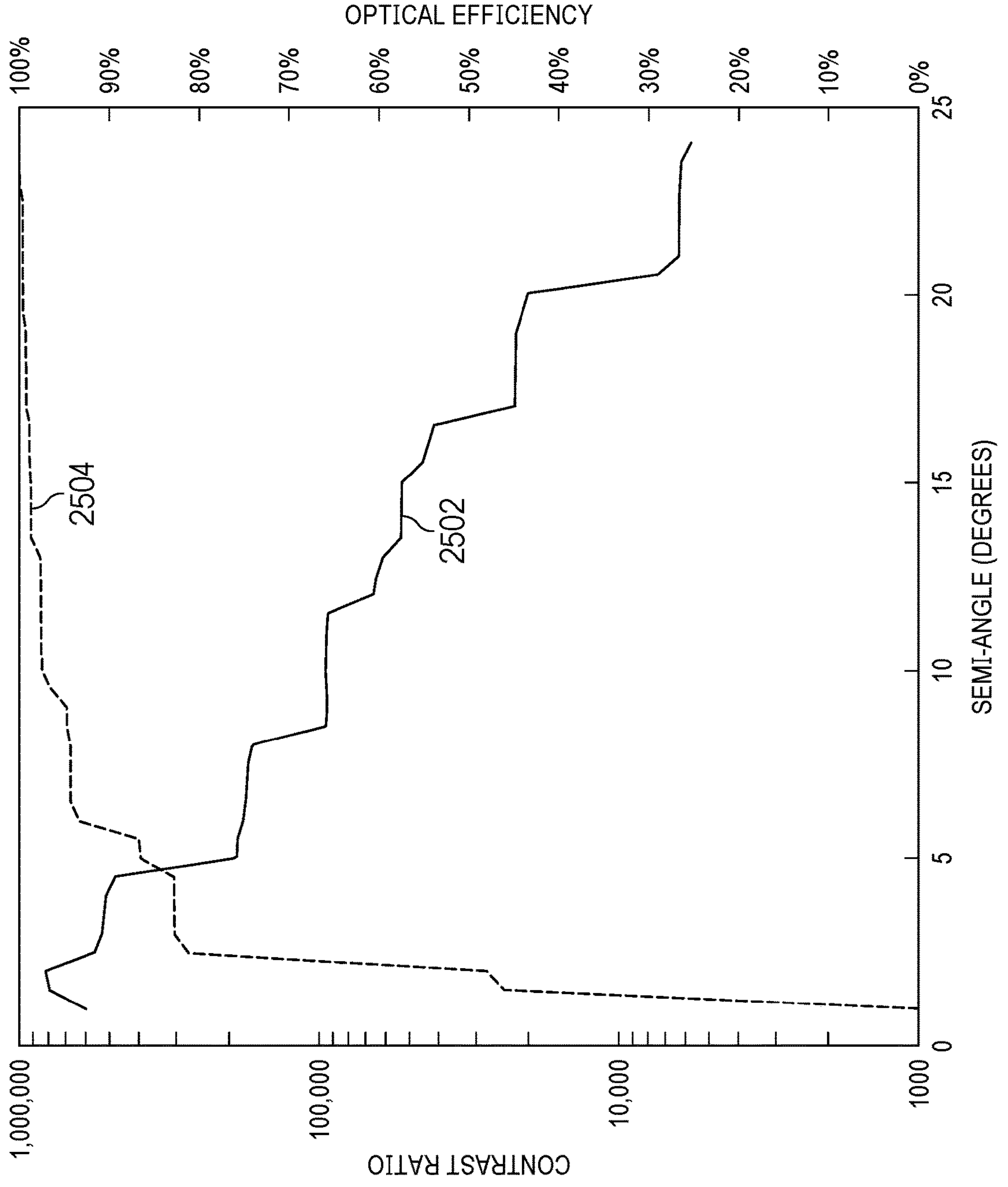
Figure 26:
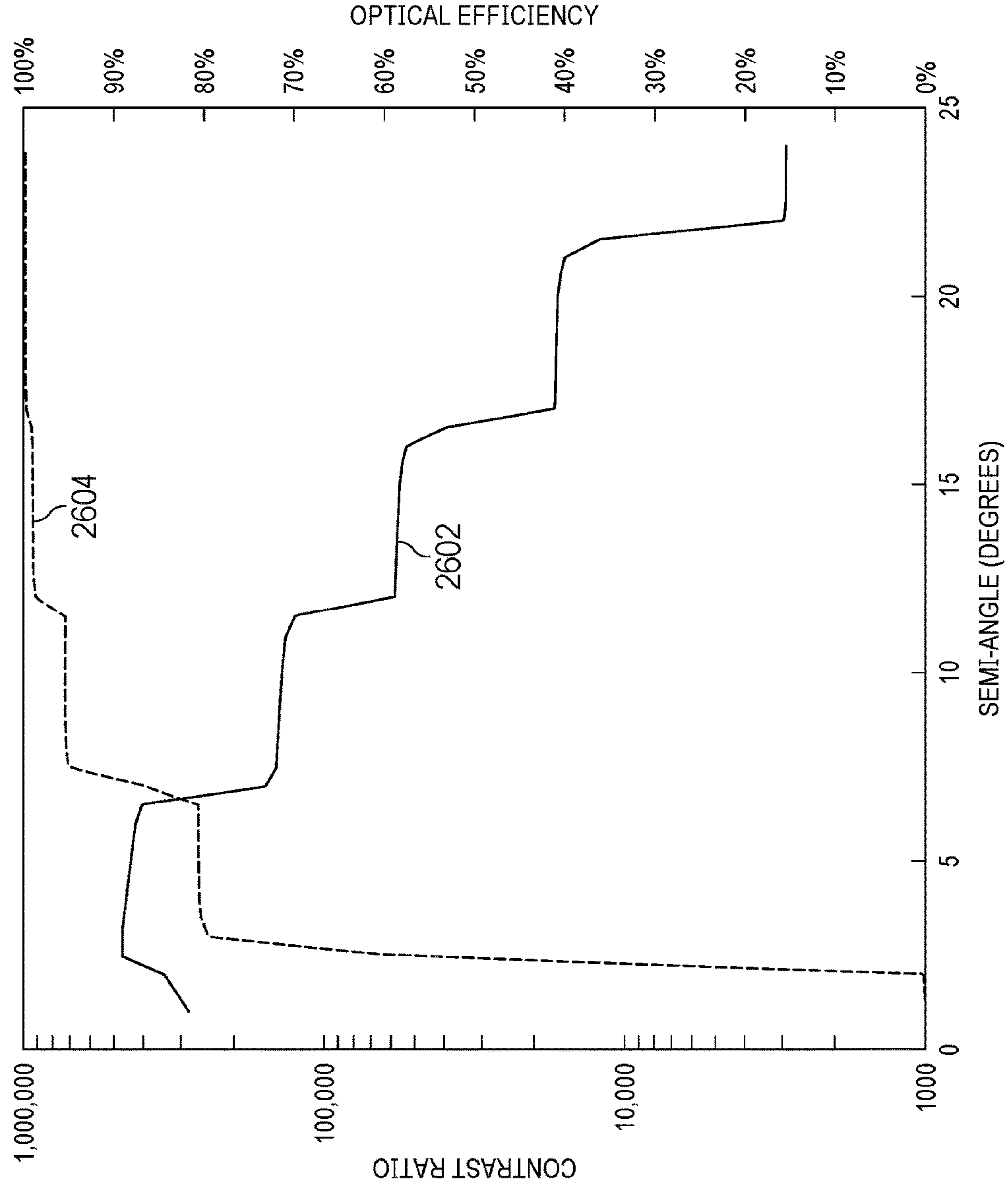

FIGS. 24-26 are plots of contrast ratio and optical efficiency versus semi-angle obtained numerically for simulated experiment 2300. To generate the results of FIGS. 24-26, spatial filter 2302 was modeled as a circular aperture centered on optical axis 422 and having an aperture diameter 2304. Spatial filter 2302 was centered on a zeroth diffraction order of modulated light 402 (e.g., first ON- and OFF-diffracted beams 504(1) and 604(1)). Circular aperture of spatial filter 2302 forms a base of a cone having an apex located at a center of a front face of DMD 200, the cone having an axis coinciding with optical axis 422. Semi-angle 2308 is defined herein as half an apex angle of the cone.

In FIGS. 24-26, wavelengths of 532 nm, 465 nm, and 617 nm, respectively, were used for light in simulated experiment 2300. For micromirrors 202 of DMD 200, nominal ON position and OFF position tilt angles of +12 degrees and −12 degrees, respectively, were used. Dimension and area fill factors of 81% and 90%, respectively, were used for DMD 200.

When semi-angle 2308 is reduced in FIG. 24, a green contrast ratio 2402 increases as a series of "steps" as diffraction orders of modulated light 402 are increasingly blocked by spatial filter 2302. The highest green contrast ratio of 757,000:1 is obtained when only the zeroth diffraction order of modulated light 402 is transmitted by spatial filter 2302. When semi-angle 2308 is increased, a green optical efficiency 2404 increases as a series of "steps" as diffraction orders are increasingly transmitted by spatial filter 2302. As most of the optical power of green modulated light is in low diffraction orders (e.g., zeroth, first, and second diffraction orders), the largest steps in green efficiency 2404 occur at small values of semi-angle 2308. At the highest green contrast ratio, green optical efficiency 2404 is approximately 80%, i.e., 80% of modulated light 402 is transmitted by spatial filter 2302.

In FIG. 25, a blue contrast ratio 2502 and blue optical efficiency 2504 behave similarly to green contrast ratio 2402 and green optical efficiency 2404, respectively. The highest blue contrast ratio of 850,000:1 is obtained when only the zeroth diffraction order of modulated light 402 is transmitted by spatial filter 2302. At the highest blue contrast ratio, blue optical efficiency 2504 drops rapidly from 80% to below 50%.

In FIG. 26, a red contrast ratio 2602 and red optical efficiency 2604 behave similarly to green and blue contrast ratios 2402, 2502 and green and blue optical efficiencies 2404, 2504, respectively. However, the highest red contrast ratio is only 450,000:1. One reason why the highest red contrast ratio is lower than the corresponding highest green and blue contrast ratios is that at the red wavelength of 617 nm, DMD 200 is illuminated far from a blaze condition. At the highest red contrast ratio, red optical efficiency 2604 is approximately 80%.

Figure 27:
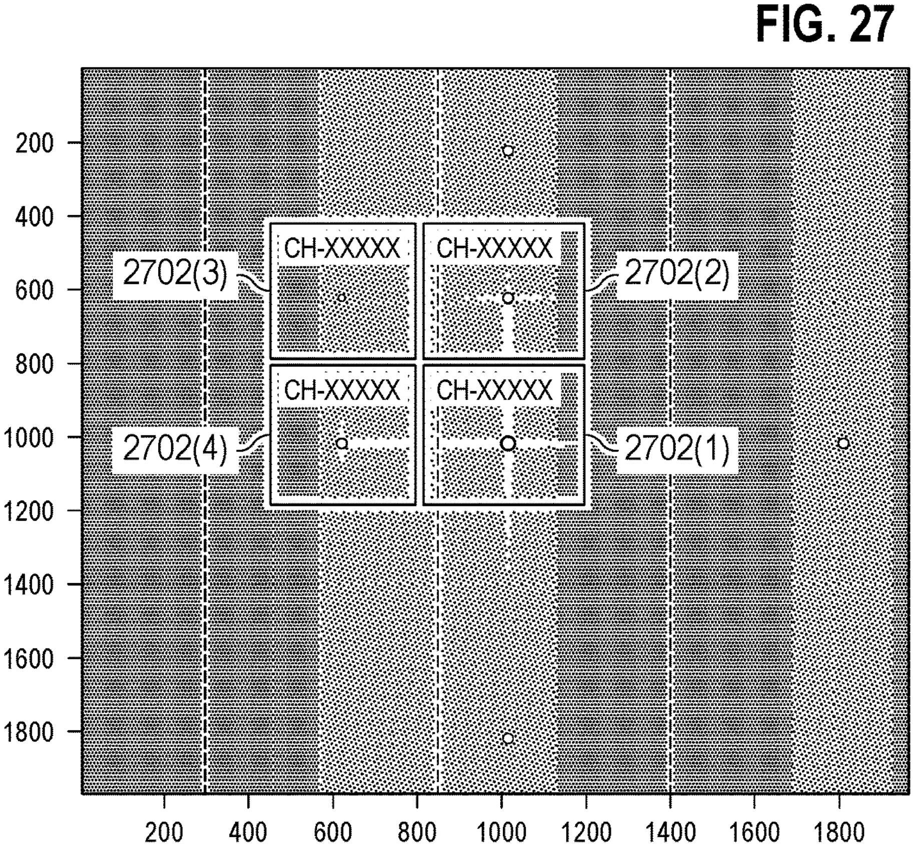
FIG. 27 is a Fraunhofer diffraction pattern for the simulated experiment of FIG. 23 when a wavelength of light is 532 nm and all the micromirrors of the DMD are in the ON position.

FIG. 27 is a Fraunhofer diffraction pattern for simulated experiment 2300 when the wavelength of light is 532 nm and all micromirrors 202 of DMD 200 are in the ON position. In FIG. 27, each of the four brightest diffraction orders is surrounded by one of boxes 2702. Box 2702(1) contains the most optical power, and corresponds to the zeroth diffraction order of modulated light 402. For each box 2702, the DOCR was calculated using box 2702 as a rectangular aperture (e.g. transmissive region 416) of spatial filter 2302. The numerically calculated DOCR is printed within each box. For example, in box 2702(1), the zeroth diffraction order of modulated light 402 has a DOCR of 758,075:1. In one embodiment, optical filter mask 412 is configured to transmit the zeroth diffraction order, and block all other diffraction orders, of modulated light 402; optical filter mask 900 is one example of optical filter mask 412 that may be used with this embodiment. In another embodiment, optical filter masks 412(1), 412(2), and 412(3) of digital projector 1500 may each be configured to transmit the zeroth diffraction order, and block all other diffraction orders, of modulated lights 402(1), 402(2), and 402(3).

Figure 28:
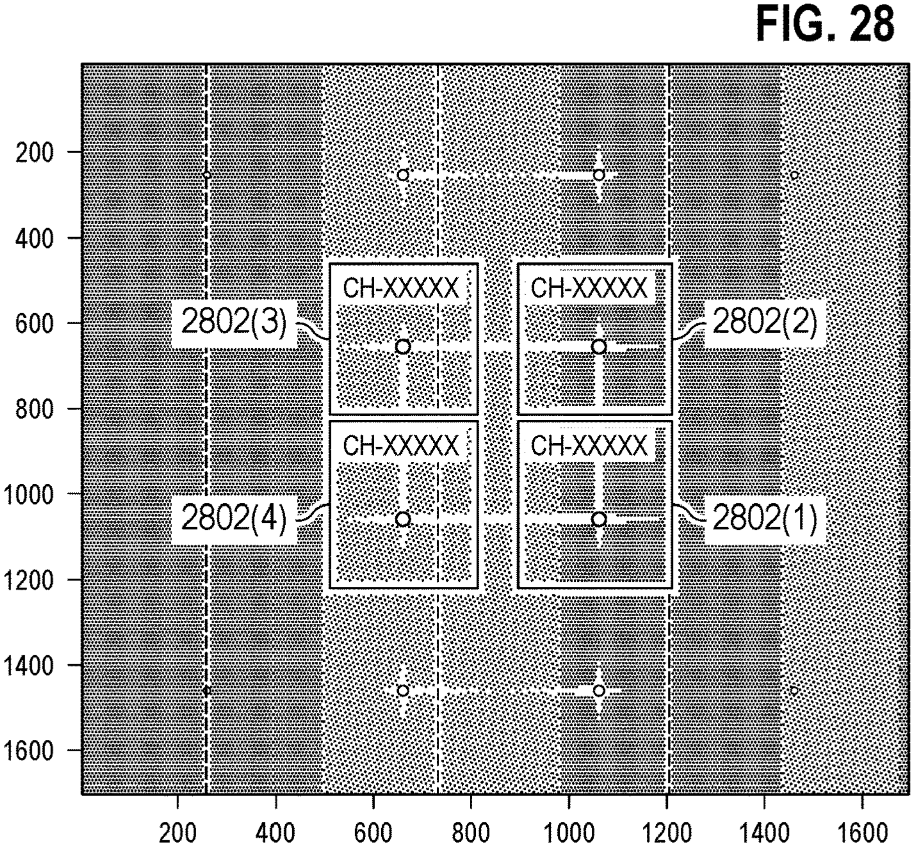
FIG. 28 is a Fraunhofer diffraction pattern for the simulated experiment of FIG. 23 when a wavelength of light is 617 nm and all the micromirrors of the DMD are in the ON position.

FIG. 28 is a Fraunhofer diffraction pattern for simulated experiment 2300 when the wavelength of light is 617 nm and all micromirrors 202 of DMD 200 are in the ON position. In FIG. 28, four diffraction orders contain most of the optical power of modulated light 402. Compared to FIG. 27, where the wavelength of 532 nm was used, the optical power is more evenly distributed among four diffraction orders because the wavelength of 617 nm is farther from the blaze condition of DMD 200. A contrast ratio as high as 852,000:1 may be obtained by forming spatial filter 2302 to only transmit the diffraction order in box 2802(1). However, by blocking diffraction orders in boxes 2802(2), 2802(3), and 2802(4), optical efficiency will be degraded significantly.

As a compromise between contrast ratio and optical efficiency, spatial filter 2302 may be configured to transmit the three diffraction orders with the highest DOCR, corresponding to boxes 2802(1), 2802(2), and 2802(4). In this example of spatial filter 2302, apertures corresponding to boxes 2802(1), 2802(2), and 2802(4) are not located symmetrically about optical axis 422. In one embodiment, optical filter 400 is configured to transmit three diffraction orders of modulated light 402, according to FIG. 28; optical filter mask 1300 is one example of optical filter mask 412 that may be used with this embodiment. In other embodiments, optical filter 412 is configured to transmit a nonzero integer number of diffraction orders of modulated light 402, up to a maximum number determined by a clear aperture of lens 404.

Figure 29:
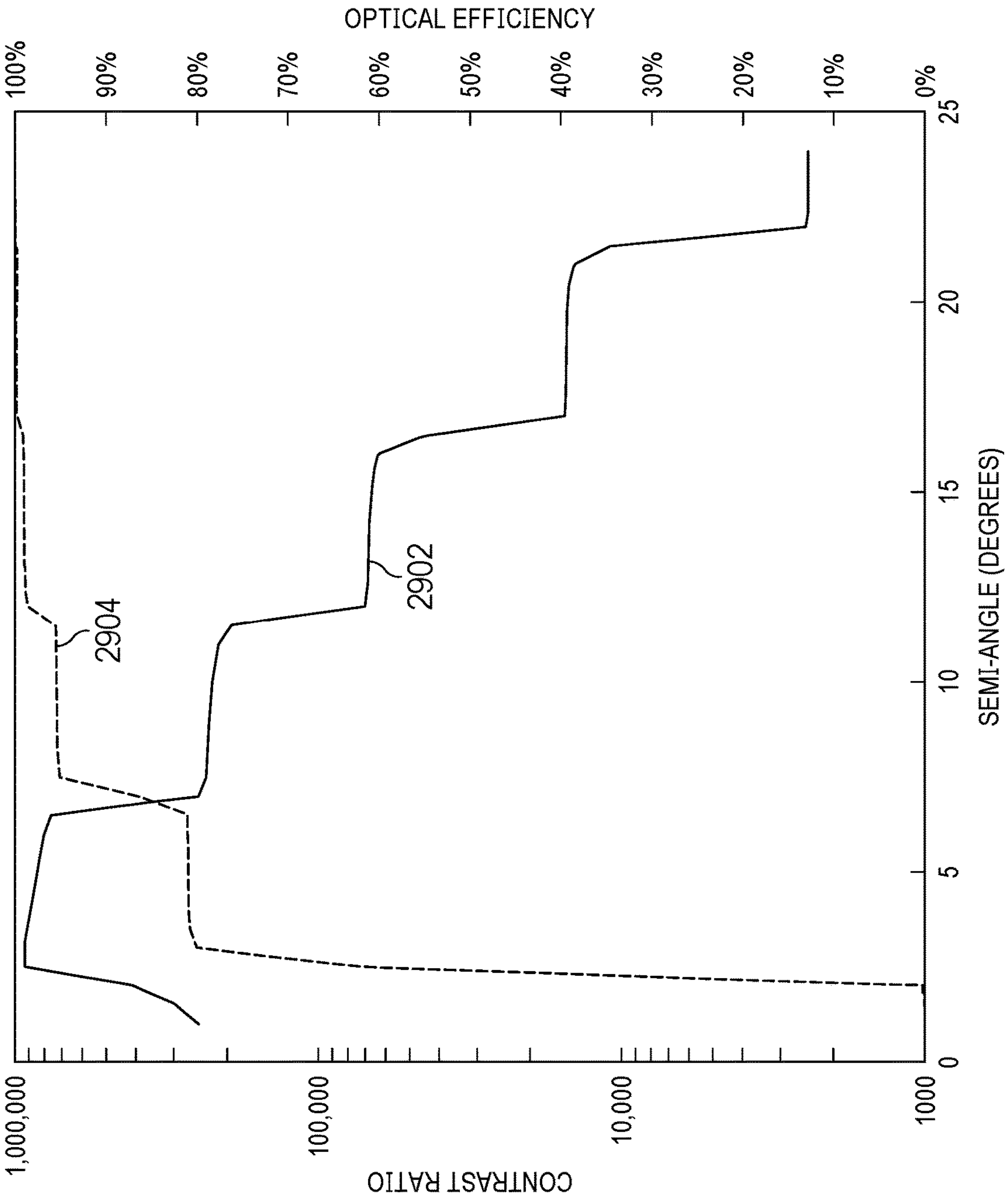
FIG. 29 is a plot of contrast ratio and optical efficiency obtained numerically for the simulated experiment of FIG. 23 operating at a wavelength of 617 nm when the ON and OFF tilt angles of the micromirrors are +12.1 degrees and −12.1 degrees, respectively.

FIG. 29 is a plot of contrast ratio 2902 and optical efficiency 2904 obtained numerically for simulated experiment 2300 operating at a wavelength of 617 nm when the ON and OFF tilt angles of micromirrors 202 are +12.1 degrees and −12.1 degrees, respectively. Contrast ratio may be sensitive to small changes in micromirror tilt angle. Compared to FIG. 26, changing tilt angles by 0.1 degrees increases the highest red contrast ratio more than a factor of 2 to almost 1,000,000:1, while red optical efficiency 2904 remains at approximately 80%. For comparison, commercial DMDs are typically specified to have a tilt angle tolerance of ±0.5 degrees.

Figure 30:
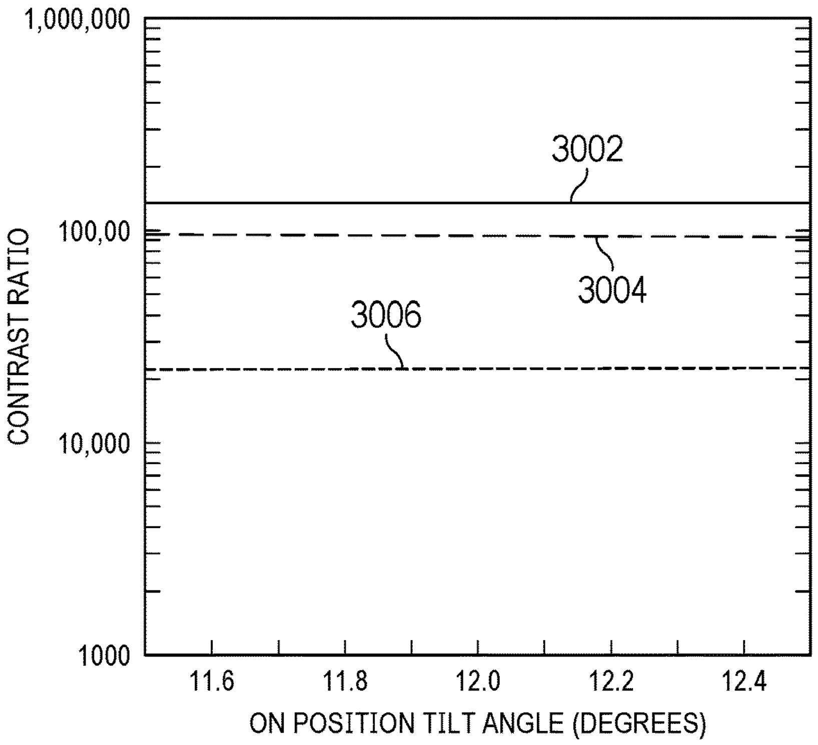
FIGS. 30 and 31 are plots of contrast ratio versus micromirror tilt angle, obtained numerically for the simulated experiment of FIG. 23
Figure 31:
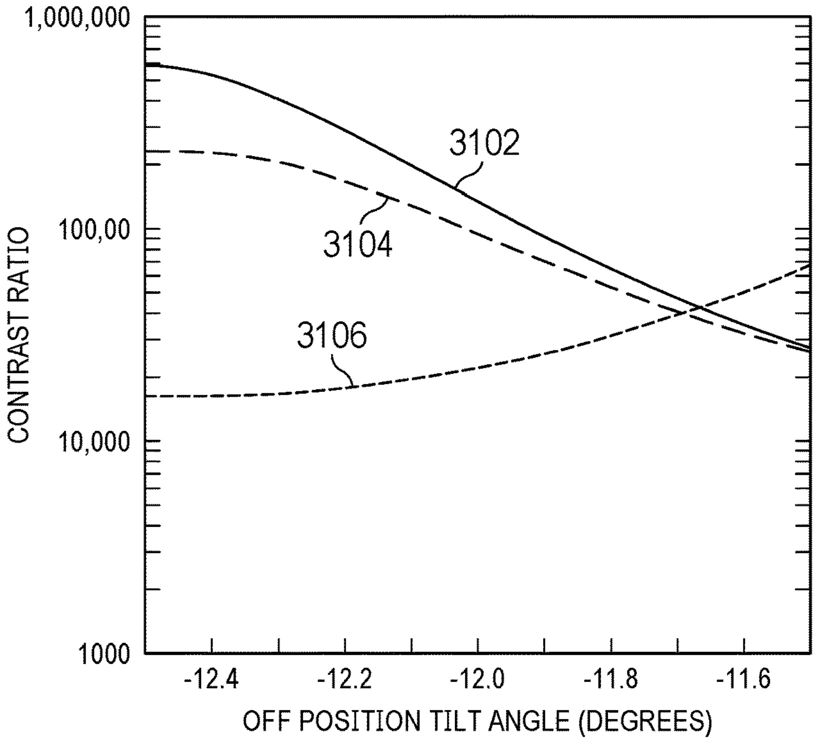

FIGS. 30 and 31 are plots of contrast ratio versus micromirror tilt angle, obtained numerically for simulated experiment 2300. In FIG. 30, the OFF position tilt angle is fixed at −12 degrees, and the ON position tilt angle is varied between 11.5 and 12.5 degrees. In FIG. 31, the ON position tilt angle is fixed at +12 degrees, and the OFF position tilt angle is varied between −12.5 and −11.5 degrees. In FIG. 30, contrast ratios 3002, 3004, and 3006 correspond to wavelengths of 617 nm, 465 nm, and 532 nm, respectively. In FIG. 31, contrast ratios 3102, 3104, and 3106 correspond to wavelengths of 617 nm, 465 nm, and 532 nm, respectively. FIGS. 30 and 31 are best viewed together in the following description.

Values of contrast ratio are generally more sensitive to variations in OFF luminous intensity than ON luminous intensity. Therefore, contrast ratio may depend more strongly on the OFF tilt angle than the ON tilt angle. As shown in FIG. 30, contrast ratios 3002, 3004, and 3006 show little variation with ON tilt angle over the tilt angle tolerance range of ±0.5 degrees. On the other hand, contrast ratios 3102, 3104, and 3106 of FIG. 31 change more strongly with OFF tilt angle over a similar angle tolerance range.

Figure 32:
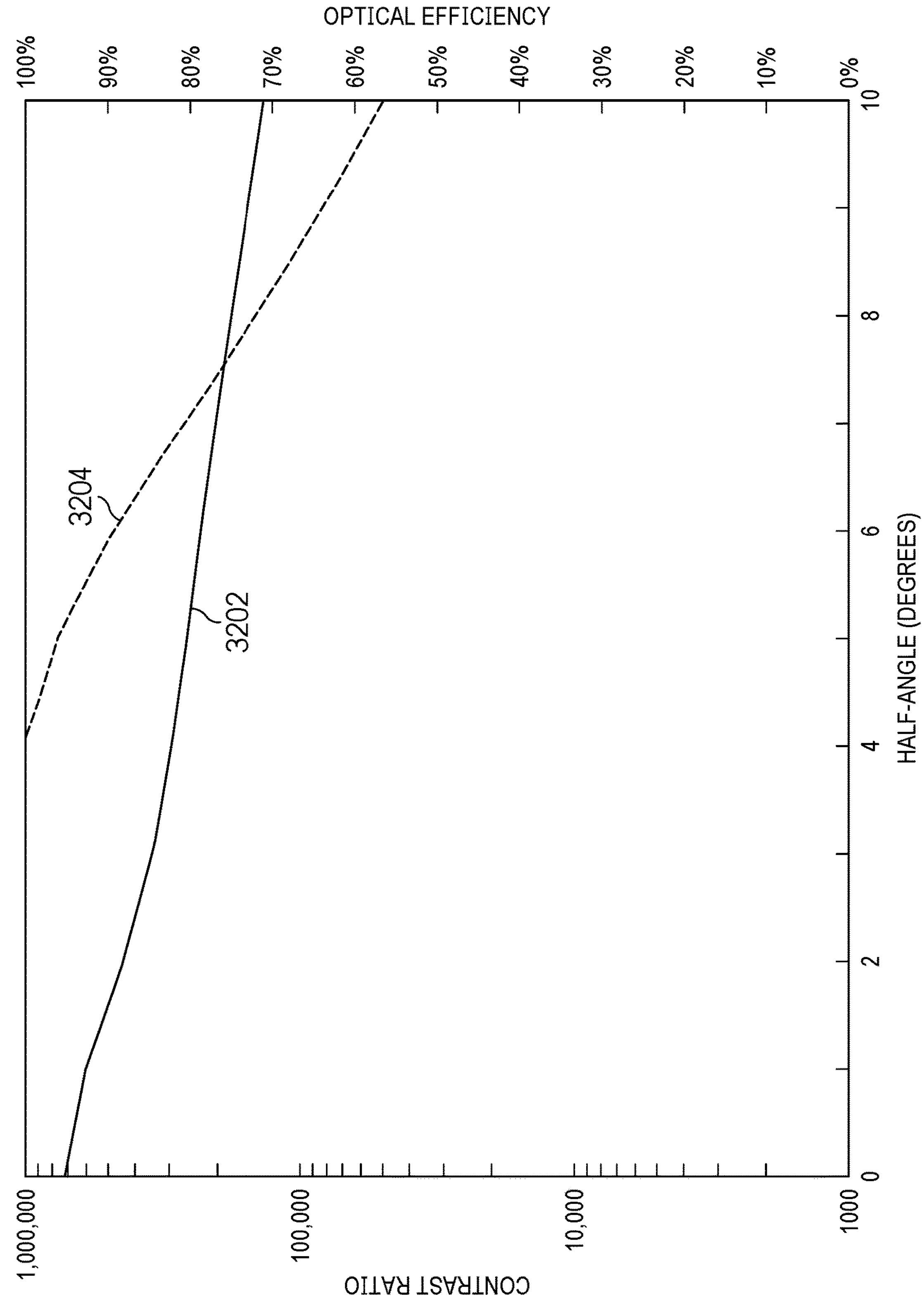
FIG. 32 is a plot of contrast ratio and optical efficiency as a function of angular diversity of the input light, obtained numerically for the simulated experiment of FIG. 23 at a wavelength of 532 nm.
Figure 33:
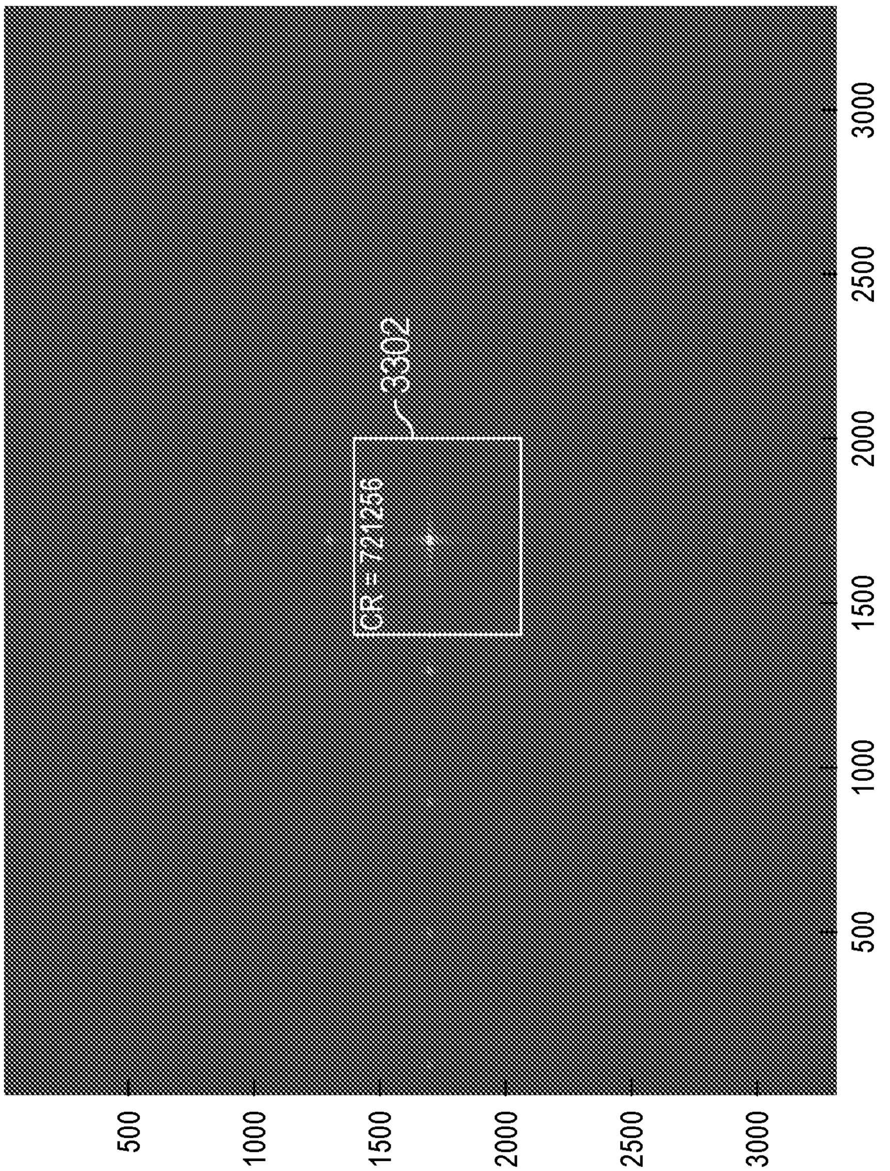
FIGS. 33 and 34 are Fraunhofer diffraction patterns of the simulated experiment of FIG. 23, showing broadening of the diffraction peaks due to the angular diversity of the input light.
Figure 34:
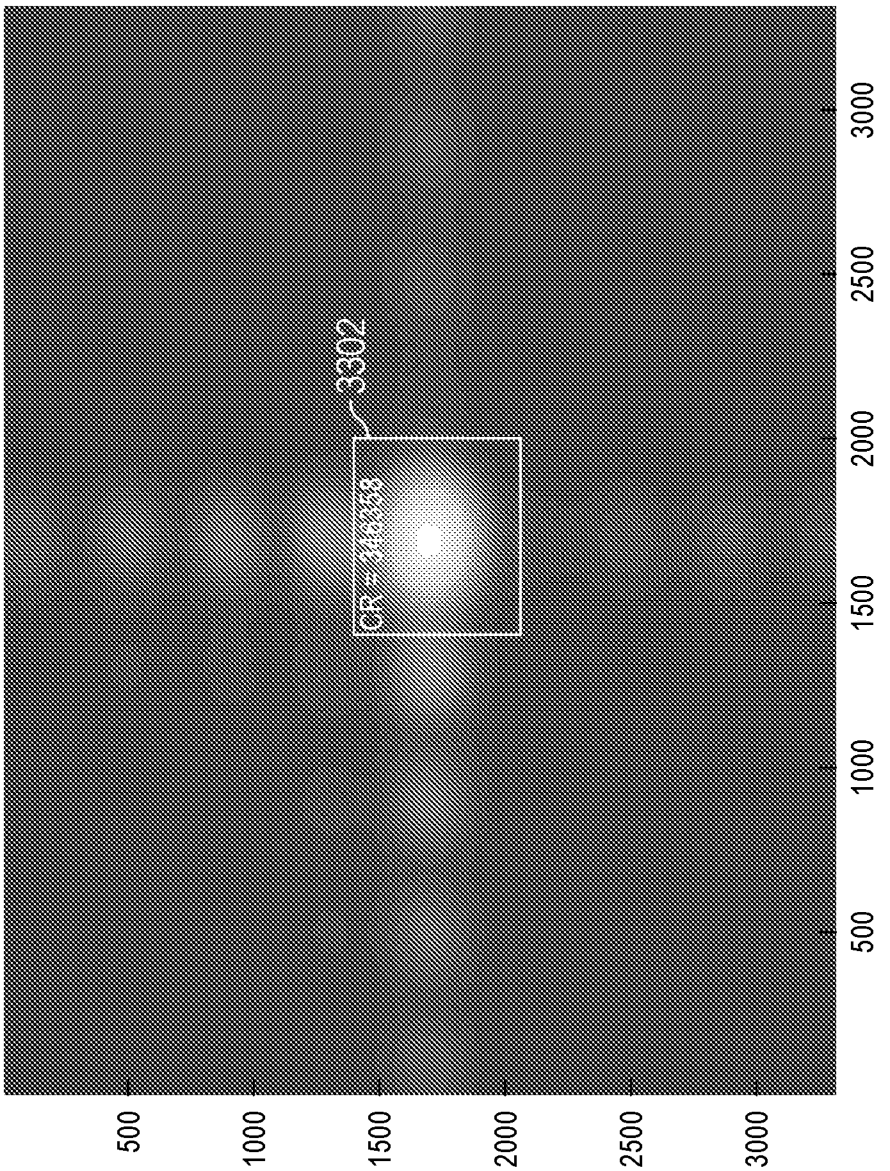

FIG. 32 is a plot of contrast ratio 3202 and optical efficiency 3204 as a function of angular diversity of input light 206, obtained numerically for simulated experiment 2300 at a wavelength of 532 nm. FIGS. 33 and 34 are Fraunhofer diffraction patterns of simulated experiment 2300, showing broadening of the diffraction peaks due to the angular diversity of the input light 206. In FIG. 33, input light 206 is a plane wave with no angular diversity. In FIG. 34, input light 206 has an 8 degree half-angle of angular diversity. To obtain data in FIG. 32, spatial filter 2302 was configured with a rectangular aperture represented by box 3302 in FIGS. 33 and 34. FIGS. 32-34 are best viewed together in the following description.

In cinema and other critical viewing environments, digital laser projection of images benefits from angular diversity and reduced coherence in the laser illumination, as this reduces the visibility of dust and other objectionable diffracting artifacts. It is also beneficial for the laser illumination to have increased bandwidth to decrease the visibility of speckle on the screen.

Increasing angular diversity and bandwidth of laser illumination may degrade the contrast ratio of optical filtering systems and methods presented herein. Specifically, at a Fourier plane, increased angular diversity and bandwidth may broaden diffraction peaks, causing their tails to blur with other tails of neighboring peaks. Such broadening of peaks may prevent individual diffraction orders from being transmitted through spatial filter 2302 without also transmitting a portion of neighboring diffraction orders intended to be blocked. As shown in FIG. 32, contrast ratio is reduced by half, from 721,000:1 to 346,000:1, as the half-angle of input light 206 is increased to 8 degrees.

Therefore, when considering angular diversity and spectral bandwidth, there is a trade-off between (1) visibility of dust and reduced speckle, and (2) contrast ratio.

It is understood that contrast degradation may result from other factors than diffraction of input light 206 by DMD 200, such as scattering of input light 206 off of the surfaces of micromirrors 202, unwanted stray light and reflections in the cinema room, optical aberrations, and/or polarization effects. However, in most digital projectors, diffraction by DMD 200 is expected to be the dominant source, or at least one of the dominant sources, of contrast degradation. The presently disclosed systems and methods are readily extended to scenarios where the contrast is degraded by other factors in addition to diffraction, such as those listed above. The presently disclosed systems and methods are capable of enhancing the contrast even in the presence of other such factors.

Optical Filter Experimental Results

The numerical analyses presented above have been verified using an experimental setup similar to that shown in FIG. 4. To demonstrate the highest contrast, the experimental setup was configured to filter a zeroth diffraction order at 532 nm. Optical filter mask 412 was configured with a circular aperture centered on optical axis 422. The diameter of the circular aperture and a lens (e.g., lens 404) were chosen to form a 2 degree semi-angle at the Fourier plane. Input light to DMD 200 was provided by a polarized 532 nm laser with $M^2$<1.1. The input light was expanded to fill the front face of DMD 200 using a Galilean beam expander formed from two doublets, which yielded diffraction-limited performance. For simplicity, no TIR prism was used to couple light to DMD 200. DMD 200 was operated at brightest (e.g., white level) and darkest (e.g., black level) outputs, and contrast was measured with a spectrometer.

Contrast ratios of two identical 4K DMDs were measured. At 532 nm and 2 degree semi-angle, the contrast ratio predicted by simulated experiment 2300 is approximately 757,000:1 (see highest green contrast ratio in FIG. 24). Contrast ratios of 254,234:1 and 277,966:1 were measured. These values are approximately a factor of three less than the predicted value; the discrepancy is attributed to stray light originating from overfill of the DMD, stray light originating from the gaps between the micromirrors of the DMD, and scattering off of the surface and edges of the micromirrors.

It has also been observed that the propagation direction of input light 206 toward DMD 200 affects the contrast ratio, as expected given the dependency of the contrast ratio on OFF tilt angle. In addition, it has been observed that the polarization of input light 106 affects the black level of DMD 200, thereby affecting the contrast ratio. For the experimental results described above, the polarization of the input light was rotated with a waveplate to maximize contrast.

Given the sensitivity of the contrast ratio on micromirror tilt angles and the propagation direction of input light 206, binning may be used to group DMDs having similar tilt angles. In one embodiment of three-color digital projector 1500, three binned DMDs having similar tilt angles are used for DMDs 200(1), 200(2), and 200(3). In another embodiment, three binned DMDs having dissimilar tilt angles (e.g., from three different bins) are used for DMDs 200(1), 200(2), and 200(3), each of the DMDs having a tilt angle selected to maximize the contrast ratio for a particular wavelength of input light 206 used with the DMD.

Optical Filter Advantages

One advantage of the optical filter systems and methods presented herein is that the contrast ratio may be increased without using additional DMDs. For example, as an alternative to the presently disclosed systems and methods, the contrast ratio may be increased by using multiple stage modulation, i.e., two or more DMDs connected in series so that OFF-diffracted beams from a first DMD are blocked by a second DMD. As a method of increasing contrast ratio, multiple stage modulation disadvantageously increases cost and complexity of a digital projector due to the second DMD and corresponding electronics. Furthermore, one type of digital projector uses three DMDs, one DMD for each of red light, green light, and blue light; using two DMDs for each color in this type of digital projector increases a total number of DMDs from three to six, further adding to cost and complexity.

Another advantage of the optical filtering systems and methods presented herein is that optically filtered projected light may reduce the appearance of Moiré patterns caused by interference between unfiltered projected light and periodic perforations of the screen onto which the projected light is projected. Specifically, optical filtering may be configured to reduce high frequency components of the projected light, thereby "smoothing" hard edges between pixels, as they appear on the screen. The smoothing reduces beating between the periodic intensity of the projected light and the periodic perforations of the screen.

Yet another advantage of the optical filtering systems and methods presented herein is that optical filtering may increase the contrast ratio of a digital projector having a tilt-and-roll pixel (TRP) DLP chip from Texas Instruments. Micromirrors of a TRP DLP chip do not tilt about an axis oriented at 45 degrees (e.g., micromirror rotation axis 208 of FIG. 2). As a result, compared to other types of DMD chips, modulated light propagates away from a TRP chip such that diffracted orders of OFF-state light (e.g., OFF diffracted beams 604 of FIG. 6) are brighter, thereby increasing the OFF luminous intensity and decreasing the contrast ratio. By decreasing the OFF luminous intensity, the optical filtering systems and methods presented herein advantageously enable TRP chips to be included with projectors for applications demanding high contrast ratio, such as projection according to the digital cinema initiatives (DCI) specification.

Example Projection Lens System

Figure 35:
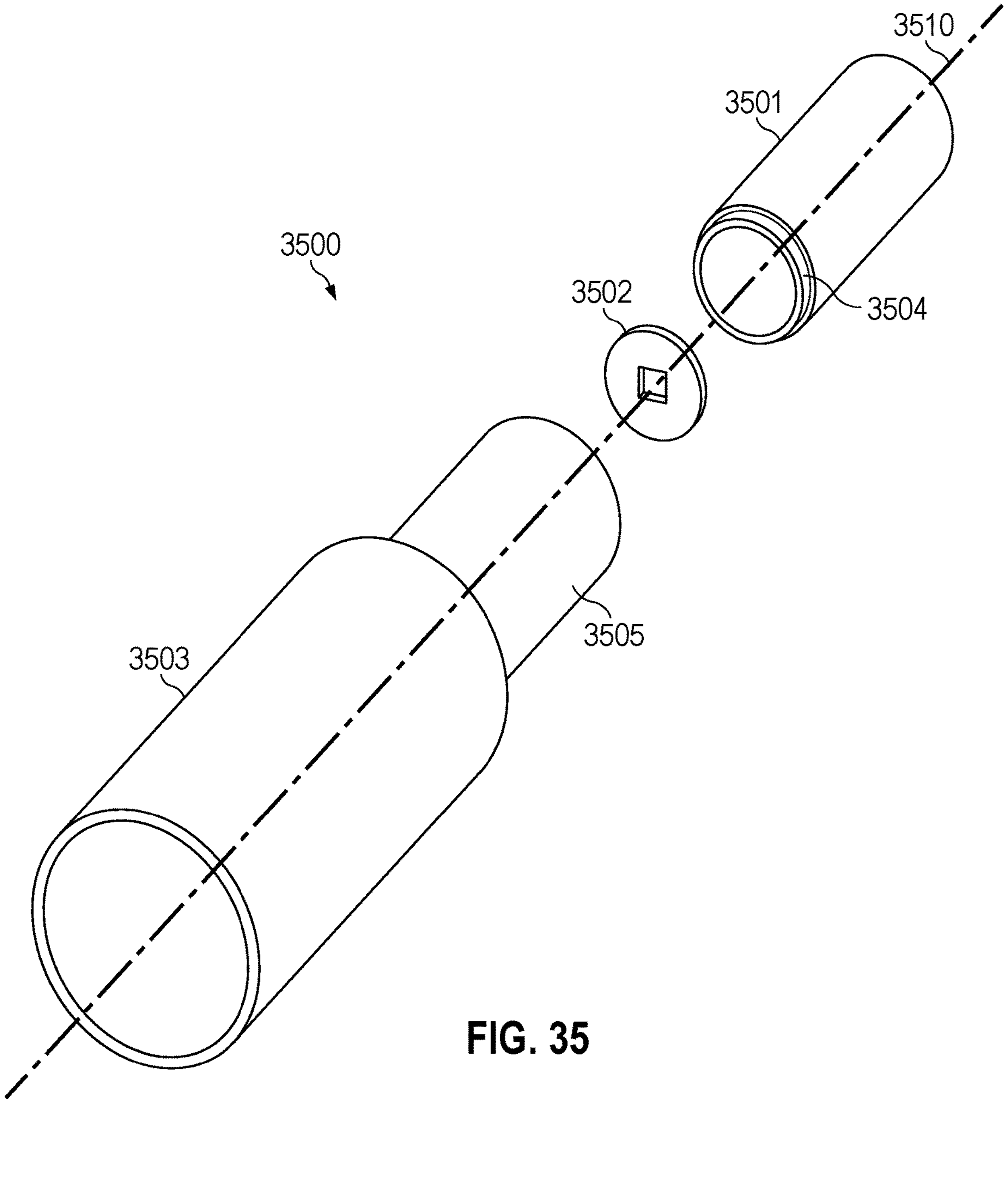
FIG. 35 illustrates an exemplary projection lens system according to various aspects of the present disclosure.

In some implementations, the optical filter is provided within a projection lens architecture. FIG. 35 is an exploded view of an exemplary projection lens system according to various aspects of the present disclosure. The projection lens system 3500 is one example of the projection lens 112 illustrated in FIG. 1. To allow access to the Fourier aperture, the projection lens system 3500 has a modular design. The projection lens system 3500 includes a Fourier part 3501 (for example, a Fourier lens assembly, lens 404) configured to form a Fourier transform of an object at an exit pupil as previously described, an aperture 3502, and a zoom part 3503 (also referred to as a zoom lens assembly). The spatial Fourier transform imposed by the Fourier part 3501 converts the propagation angle of each diffraction order of the modulated light to a corresponding spatial position on the Fourier plane. The Fourier part 3501 thereby enables selection of desired diffraction orders, and rejection of undesired diffraction orders, by spatial filtering at the Fourier plane. The spatial Fourier transform of the modulated light at the Fourier plane is equivalent to a Fraunhofer diffraction pattern of the modulated light The Fourier part 3501 includes a first attachment section 3504, which may include threads, fasteners, and the like. The zoom part 3503 includes a second attachment section 3505, which may include complementary threads, fasteners, and the like to allow for mating with the first attachment section 3504. In one example, the first attachment section 3504 includes a male threaded portion and the second attachment section 3505 includes a female threaded portion, or vice versa. In another example, the first attachment section 3504 and the second attachment section 3505 are configured for a friction fit, in which case one or more fastening elements such as screws, cams, flanges, and so on may be provided. In yet another example, the first attachment section 3504 may include one or more radial pins and the second attachment section 3505 may include a corresponding number of L-shaped slots, or vice versa, to thereby connect the Fourier part 3501 and the zoom part 3503 using a bayonet connection. By these examples, the Fourier part 3501 may be removably attached to the zoom part 3503 to provide a modular assembly as will be described in more detail below While FIG. 35 illustrates the Fourier part 3501 and the zoom part 3503 as being entirely separable, the present disclosure is not so limited. In some implementations, the Fourier part 3501 and the zoom part 3503 are only partially separable, for example by provided an access portion in one of the Fourier part 3501 and the zoom part 3503. The access portion may be a slot, a door, a window, and the like, such that an operator may access and/or swap the aperture 3502 via the access portion. In such implementations, the Fourier part 3501 and the zoom part 3503 may be bonded (e.g., via an adhesive on the first attachment section 3504 and/or the second attachment section 3505) to prevent full separation. Alternatively, the Fourier part 3501 and the zoom part 3503 may be provided with an integral housing that includes the attachment portion.

The aperture 3502 may be one example of the optical filter mask 412 illustrated in FIG. 4. The aperture 3502 is configured to block a portion of light (e.g., modulated light corresponding to one or more diffraction orders) in the projection lens system 3500. As illustrated in FIG. 35, the aperture 3502 is a square opening having sides of, for example, 6 mm in length. FIG. 35 also illustrates an optical axis 3510 of the projection lens system 3500. When assembled, the Fourier part 3501 and the zoom part 3503 are substantially coaxial with one another and with the optical axis 3510. In some implementations (for example, depending on the illumination angle), the aperture 3502 is further substantially coaxial with the optical axis 3510.

The projection lens system 3500 may include or be associated with one or more non-optical elements, including a thermal dissipation device such as a heat sink (or cooling fins), one or more adhesives (or fasteners), and so on. In some implementations, the aperture 3502 may block, and thus absorb, approximately 15% of incident light and therefore the heat sink or cooling fins may be positioned and configured so as to appropriately dissipate heat from the aperture 3502. In some implementations, the aperture 3502 is thermally isolated from other parts of the projection lens system 3500.

The Fourier part 3501 and the aperture 3502 collectively operate as a Fourier lens with a spatial filter that may also be used as a fixed throw projection lens. In other words, the Fourier part 3501 and the aperture 3502 may collectively act as the optical filter 110 or optical filter 400. The zoom part 3503 illustrated in FIG. 35 may be one of a family of zoom lens assemblies configured to attach to the Fourier part 3501, thereby to create the family of projection zoom lens systems and adapt to different theaters. In other words, the Fourier part 3501 and the aperture 3502 may be applicable to any theater setting, while the zoom part 3503 provides a specific projection light pattern tailored to a particular theater. Therefore, by selecting a particular zoom part 3503 from the family of zoom lens assemblies, and attaching the selected zoom part 3503 to the Fourier part 3501 and the aperture 3502, a projection lens system 3500 may be achieved which is adapted to the particular theater.

Both the Fourier part 3501 and the zoom part 3503 may include a plurality of individual lens elements. Exemplary configurations of lens elements for the Fourier part 3501 and the zoom part 3503 are illustrated in FIGS. 36 and 37, respectively.

Figure 36:
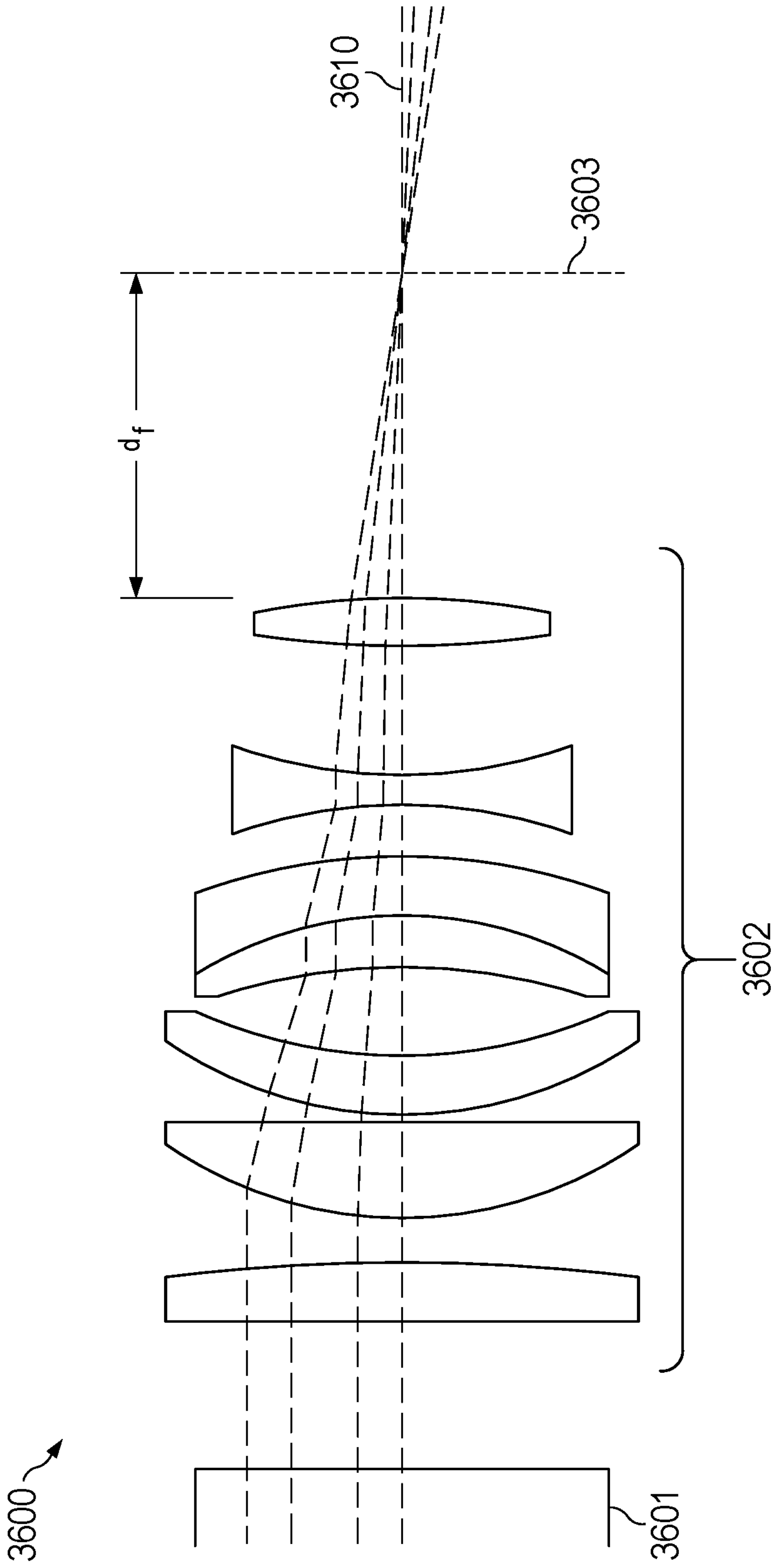
FIG. 36 illustrates an exemplary lens configuration of a portion of the exemplary projection lens system of FIG. 35.
Figure 37:
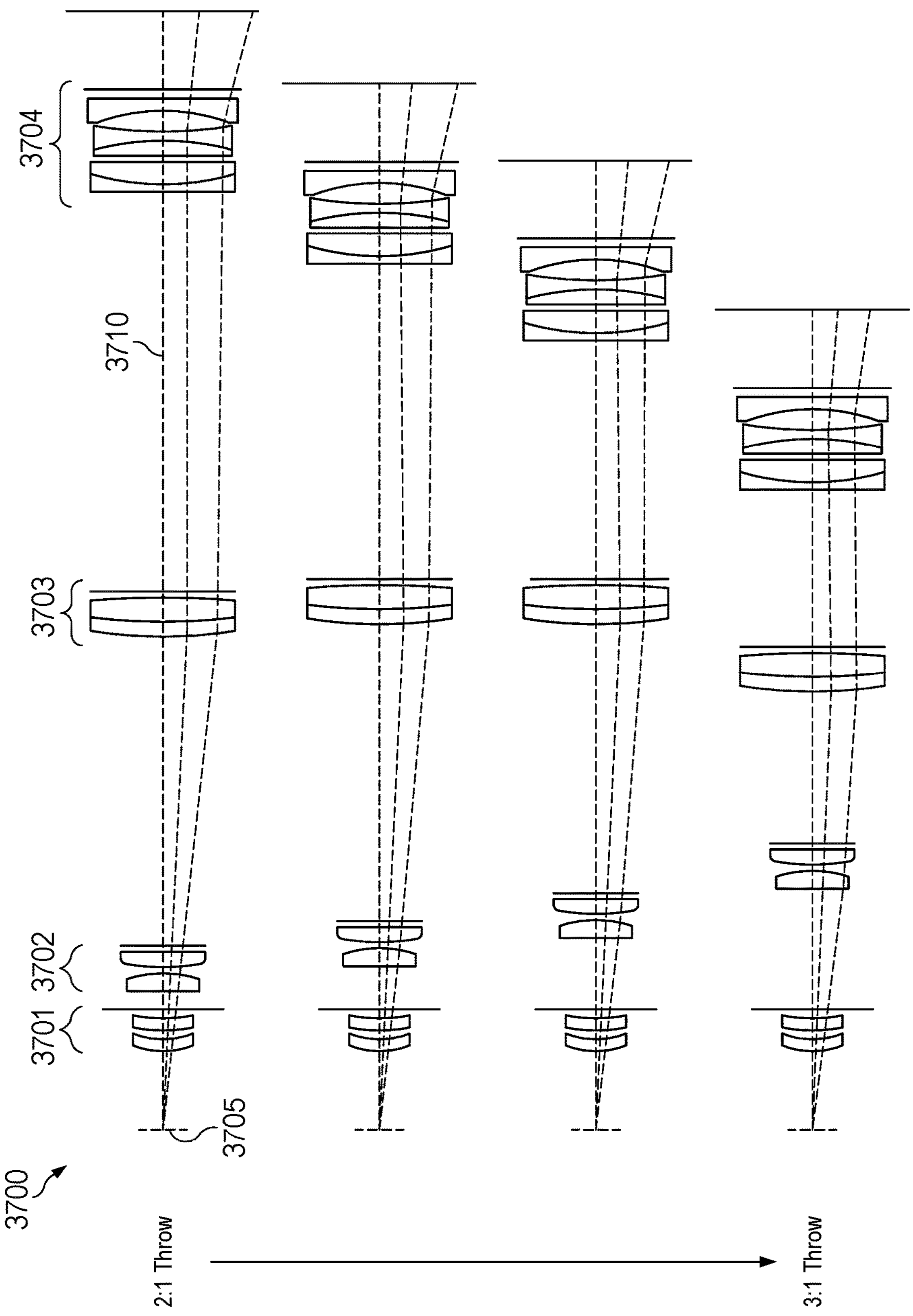
FIG. 37 illustrates an exemplary lens configuration of another portion of the exemplary projection lens system of FIG. 35.

FIG. 36 illustrates exemplary optics of an exemplary Fourier part 3600 including a prism 3601 (only a part of which is shown in FIG. 36) and a Fourier lens system 3602 including a plurality of lenses (also referred to as lens elements). A Fourier plane 3603 of the Fourier lens system 3602 is also illustrated, as are exemplary light rays 3610 to illustrate the optical behavior of the Fourier part 3600. The Fourier lens system 3602 may be contained within a housing of the Fourier part 3501 illustrated in FIG. 35. In some examples, the prism 3601 is also contained within the housing of the Fourier part 3501; however, in other examples the prism 3601 may be located optically upstream from the projection lens system 3500 and optically downstream from a modulator (such as DMD 200). The Fourier plane 3603 may approximately (e.g., within 10 mm) correspond to the location of the aperture 3502.

The individual lens elements which make up the Fourier lens system 3602 may be selected so as to create a low-distortion image at infinity, with the exit pupil at the Fourier plane 3603. Reducing the aberrations of the Fourier lens system 3602 may result in an increase in the ease of the design of the associated zoom portion or portions. The particular Fourier lens system 3602 illustrated in FIG. 36 has less than 0.1% distortion The Fourier lens system 3602 is telecentric; exhibits low wavefront error, thereby to minimize any effect on imaging of the Fourier plane 3603; exhibits low lateral color; introduces low distortion; and includes an exit pupil (approximately coincident with the Fourier plane 3603) a distance $d_f$ from the nearest optical element, thereby to mitigate small area heat loads on the nearest optical element. As illustrated, the nearest optical element is the downstream surface of the final lens included in the Fourier lens system 3602. The minimum magnitude of the distance $d_f$ to sufficiently mitigate heat loads is dependent on parameters of the Fourier lens system 3602, including the material type of the lenses in the Fourier lens system 3602 and/or of the aperture 3502 which will be located approximately at the Fourier plane 3602. A magnitude of $d_f$>12 mm may be sufficient to mitigate small area heat loads; however, in some implementations the distance $d_f$ is preferably approximately equal to (e.g., within 10% of) 40 mm The Fourier part 3600 may include other optical elements in addition to the prism 3601 and the Fourier lens system 3602. In some examples, the Fourier part 3600 may include one or more electronic crystals (e.g., a transmissive liquid crystal component that imparts deflection to light passing therethrough based on an applied voltage profile) or other deflecting elements, thereby to shift the projected image on the screen 116.

Moreover, the Fourier lens system 3602 may be usable as a projection lens if re-focused, thereby to allow for adjustments to the Fourier aperture and/or the contrast of the projected image without requiring disassembly of the entire projection lens system 3500, to facilitate calibration or defect detection, and so on.

In addition to its use as part of the projection lens system 3500, the Fourier part 3600 may have further applications as a result of its separability from the other elements in the projection lens system 3500. Such further applications may include facilitating calibration or installation of the projector 100. For example, the Fourier part 3600 may be used as a standalone optical system to test the convergence and focus of DMDs, including but not limited to the DMD 200; to provide an initial look at potential image quality issues with elements of the projector 100; to facilitate sizing and positioning of the Fourier aperture 3502; or to measure on/off contrast of the projector 100. Alternatively, a simplified fixed lens may be attached to the Fourier part 3600 for purposes of calibration, testing, defect detection, sizing and positioning, measurement, and so on.

FIG. 37 illustrates exemplary optics of an exemplary zoom part 3700 in several zoom configurations. The zoom part 3700 includes a fixed lens group 3701, a first movable lens group 3702, a second movable lens group 3703, and a fourth movable lens group 3704. A Fourier plane 3705 is also illustrated, as are exemplary light rays 3710 to illustrate the optical behavior of the zoom part 3700. The lens groups illustrated in FIG. 37 may be contained within a housing of the zoom part 3503 illustrated in FIG. 35. When the zoom part 3700 is assembled together with the Fourier part 3600, the Fourier plane 3603 and the Fourier plane 3705 may correspond to one another and may further be positioned approximately at the location of the aperture 3502.

The zoom part 3700 may include other optical elements in addition to the fixed lens group 3701, the first movable lens group 3702, the second movable lens group 3703, and the third movable lens group 3704. In some examples, the zoom part 3700 may include an electronic crystal or other deflecting elements, thereby to shift the projected image on the screen 116.

The zoom part 3700 acts in a manner similar to a telescope. That is, the object of the zoom part 3700 is assumed to be near infinity, and the image side of the zoom part 3700 is configured to create a real image at common screen distances (e.g., 10-30 m). The zoom part 3700 illustrated in FIG. 37 is configured for a range of zoom configurations depending on the particular positions of the first movable lens group 3702, the second movable lens group 3703, and the third movable lens group 3704. By appropriately moving the first movable lens group 3702, the second movable lens group 3703, and the third movable lens group 3704 the throw ratio (i.e., the distance between the zoom part 3700 and the screen 116, divided by the width of the screen 116) of the zoom part 3700 may be changed. In the particular example illustrated in FIG. 37, the zoom part 3700 is configured to provide a range of zoom configurations from a 2:1 throw ratio (top configuration) to a 3:1 throw ratio (bottom configuration) with an exemplary DMD. However, in practical implementations, the range of zoom configurations is not so limited. In some examples, the throw ratio may be between 1.2:1 and 4:1, inclusive.

In some implementations, the zoom part 3700 is not configured for a range of zoom configurations but is instead provided with a fixed throw ratio. In such implementations, the first movable lens group 3702, the second movable lens group 3703, and the third movable lens group 3704 of FIG. 37 may be replaced with corresponding fixed lens groups. For example, to provide a zoom part 3700 with a fixed throw ratio of 2:1, the first movable lens group 3702, the second movable lens group 3703, and the third movable lens group 3704 of the top configuration in FIG. 37 may be replaced with a second fixed lens group, a third fixed lens group, and a fourth fixed lens group, respectively. The fixed throw ratio may be between 1.2:1 and 4:1, inclusive. The zoom part 3700 may still be referred to as a "zoom" part regardless of whether it includes movable lens groups to thereby provide a range of throw ratios or only fixed lens groups to thereby provide a fixed throw ratio.

Because the Fourier lens system 3602 creates an image of the DMD (e.g., the DMD 200) at infinity (if placed such), the zoom part 3700 operates as a zoom telescope. Moreover, the particular design of the lenses and lens groups in the zoom part 3700 may be independent of the particular design of the Fourier lens system 3602. The complexity of the zoom lens assembly is related to the degree of aberration correction effected. In some aspects of the present disclosure, the performance of the complete projection lens system 3500 meets Digital Cinema Initiatives (DCI) image specifications; for example, the DCI Digital Cinema System Specification (DCSS) Version 1.3 or newer.

Figure 38:
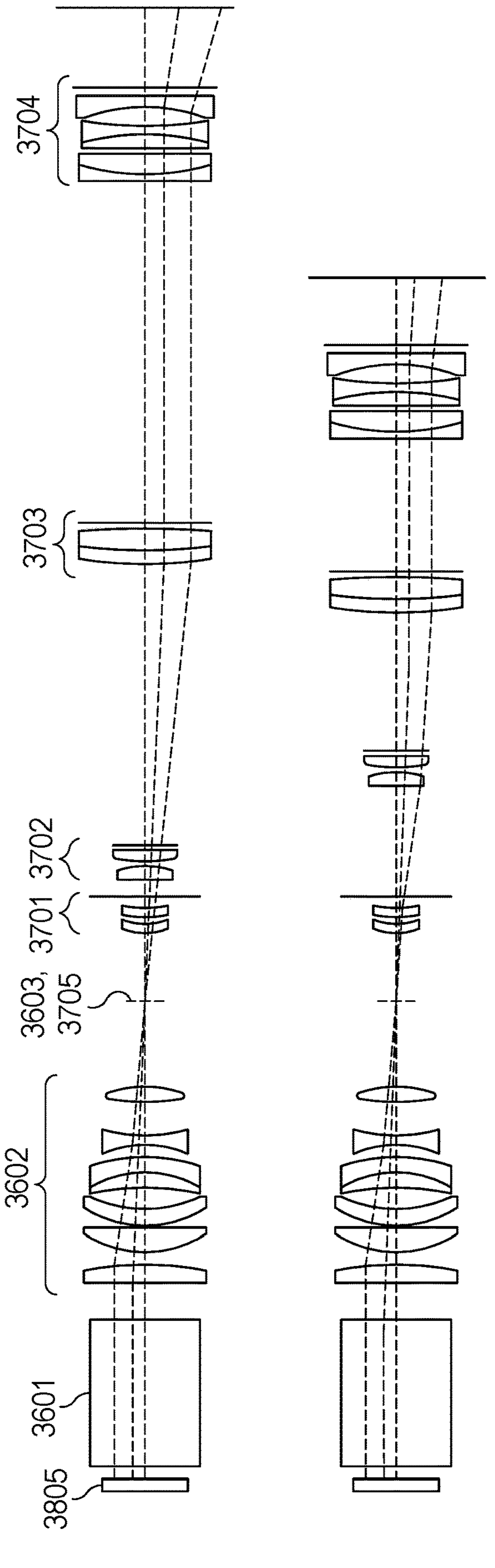
FIG. 38 illustrates an exemplary assembled lens configuration of the exemplary projection lens system of FIG. 35.

The Fourier part 3600 and the zoom part 3700 may be combined to achieve a complete lens system. FIG. 38 illustrates an exemplary assembled lens configuration according to such a combination. In FIG. 38, elements having the same reference numerals as described previously are indicated using the same reference numerals, and a detailed description thereof is not repeated here. FIG. 38 illustrates the assembled lens configuration where the zoom part 3700 is in a 2:1 throw ratio configuration (top, corresponding to the top of FIG. 38) and where the zoom part 3700 is in a 3:1 throw ratio configuration (bottom, corresponding to the bottom of FIG. 38).

The Fourier part 3600 and the zoom part 3700 are assembled such that the Fourier plane 3603 of the Fourier part 3600 and the Fourier plane 3705 of the zoom part 3700 are coplanar. Because the two parts are joined in collimated or substantially collimated optical space, the tolerance requirements to mate the two parts are loosened. For example, even in the event of a misalignment of the optical axes of the Fourier part 3600 and the zoom part 3700 (e.g., where one of the parts is shifted in a direction perpendicular to the optical axis) such that the aperture spot is displaced from the optical axis, there is likely to be no noticeable loss of image quality despite a potential shift of the projected image on the screen 116. In some examples, the Fourier part 3600 and the zoom part 3700 are considered to be substantially coaxial if the optical axes of the Fourier part 3600 and the zoom part 3700 are parallel and within 1 mm of each other.

Prism Projection Systems

Figure 39:
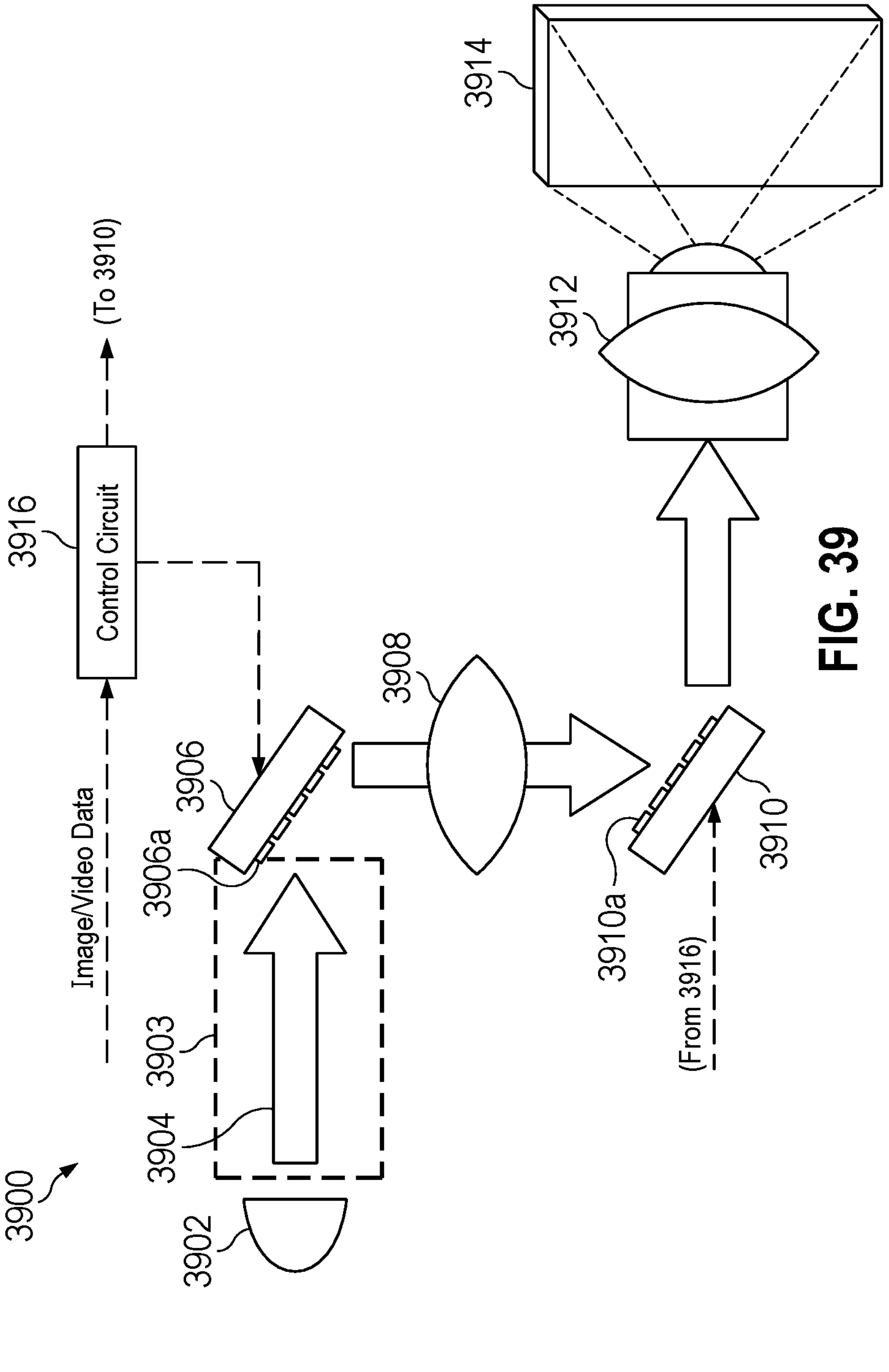
FIG. 39 illustrates an example projection system.

The optical filter 110 of FIG. 1 may be implemented within various light projector systems. FIG. 39 illustrates one possible embodiment of an image projector display system 3900. The projector display system 3900 may be a dual/multi-modulator projector system 3900. The projector display system 3900 employs a light source 3902 that supplies the projector display system 3900 with a desired illumination such that a final projected image is sufficiently bright for the intended viewers of the projected image. Light source 3902 may comprise any suitable light source possible, such as a xenon lamp, laser(s), light emitting devices (LEDs), coherent light source, partially coherent light sources, or the like.

In some embodiments, light source 3902 projects a light 3904 that illuminates a first modulator 3906. The first modulator 3906 may, in turn, illuminate a second modulator 3910, via a set of optical components 3908. Light from second modulator 3910 may be projected by a projection lens 3912 (or other suitable optical components) to form a final projected image upon a screen 3914. The projection lens 3912 may be, for example, the projection lens system 3500. First modulator 3906 and second modulator 3910 may be controlled by a controller 3916, which may receive input image and/or video data. The controller 3916 may perform certain image processing algorithms, gamut mapping algorithms, or other suitable processing upon the input image/video data, and output control/data signals to the first modulator 3906 and the second modulator 3910 in order to achieve a desired final projected image. Additionally, in some projector systems, the light source 3902 may be modulated in order to achieve additional control of the image quality of the final projected image.

Light recycling module 3903 is depicted in FIG. 39 as a dotted box that may be placed in the light path from the light source 3902 to the first modulator 3906. It will be appreciated that light recycling may be inserted into the projector display system 3900 at various points in the projector display system 3900. For example, light recycling may be placed between the first modulator 3906 and the second modulator 3910. In addition, light recycling may be placed at more than one point in the optical path of the display system. While such embodiments may be more expensive due to an increase in the number of components, that increase may be balanced off against the energy cost savings as a result of multiple points of light recycling.

While the embodiment of FIG. 39 is presented in the context of a dual, multi-modulation projection system, it should be appreciated that the techniques and methods of the present application will find application in single modulation, or other dual, multi-modulation display systems. For example, a dual modulation display system comprising a backlight, a first modulator (e.g., LCD or the like), and a second modulator (e.g., LCD or the like) may employ suitable blurring optical components and image processing methods and techniques to affect the performance and efficiencies discussed herein in the context of the projection systems.

It may also be appreciated that, even though FIG. 39 depicts a two-stage or dual modulator display system, the methods and techniques of the present application may also find application in a display system with only one modulator or a display system with three or more modulator (multi-modulator) display systems.

In at least some embodiments, the disclosure provides a way to simplify a multi-chip (e.g., 3-chip) projection system with reduced size and cost. In some embodiments, the multi-chip projection system may use separate illumination assemblies for each color channel, allowing for independent control of illumination angle. The disclosed technology may be used along with the projection systems disclosed in, e.g., U.S. patent application Ser. No. 17/043,734, U.S. patent application Ser. No. 17/439,786, U.S. patent application Ser. No. 17/280,009, PCT Patent Application PCT/US2021/028827, PCT Patent Application PCT/US2020/063169, the full disclosures of which are hereby incorporated herein by reference in their entireties for all purposes.

Figure 40:
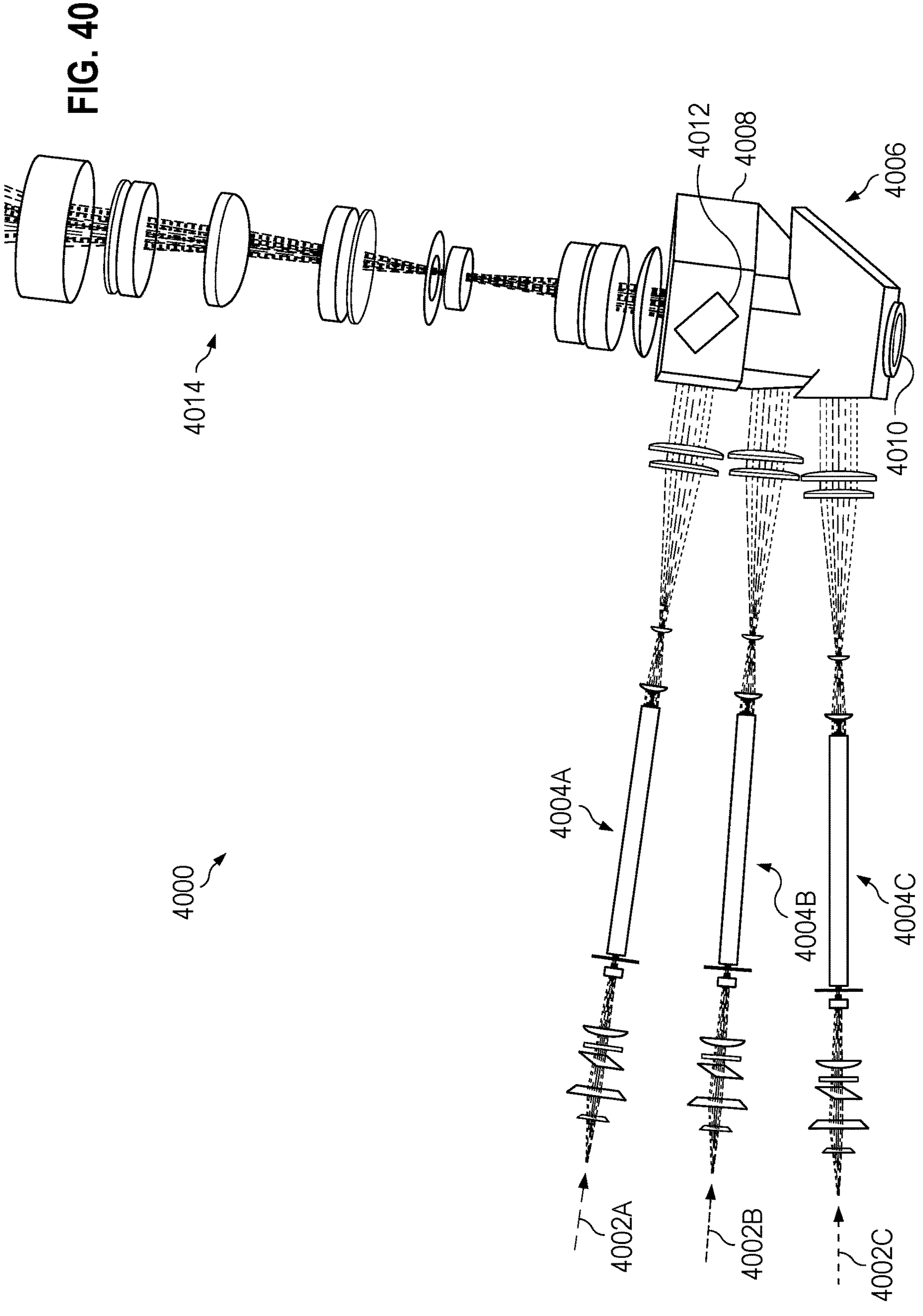
FIG. 40 illustrates an example projection system including a nine-piece prism system and multiple illumination assemblies.

FIG. 40 illustrates an example projection system 4000 including a nine-piece prism system and multiple illumination assemblies. The projection system 4000 includes several independent color illumination assemblies 4004 that respectively receive a fiber input 4002 for each color prism. For example, the projection system includes a first fiber input 4002A associated with red light that is provided to a first illumination assembly 4004A. A second fiber input 4002B is associated with blue light that is provided to a second illumination assembly 4004B. A third fiber input 4002C is associated with green light that is provided to a third illumination assembly 4004C. The color beam output from each illumination assembly 4004 is fed into a modulator 4006. The modulator 4006 includes a nine-piece prism 4008 and at least one reflector device 4010. The reflector device 4010 may function similarly to the SLM 102, as previously described. The nine-piece prism 4008 relays each color beam received from each illumination assembly 4004 into projection optics 4014 (e.g., a projection lens). In some embodiments, each color beam is separately modulated by a respective reflector device 4010 prior to combination. The modulated color beams are then combined into the output provided to the projection optics 4014. A controller 4012 may be coupled to reflector devices 4010 to control modulation of each color beam. The nine-piece prism 4008 may be, for example, the High-9 prism disclosed in U.S. patent application Ser. No. 15/540,946, the full disclosure of which is hereby incorporated herein by reference in its entirety for all purposes.

In some embodiments, each illumination assembly 4004 includes an integrating rod (e.g., an integrating tube, an integrating box) that receives light from the respective fiber input 4002. The integrating rod may comprise a substantially reflective surface in its interior, so that light that is incident on its surface is reflected until the light exits. Once the light exits the integrating rod, the illumination assembly 4004 may include a set of optical elements, such as lenses, filters, and/or polarizers that optically act on the light before the light is delivered to the modulator 4006.

Additionally, in some embodiments, a white light 3-chip TIR prism (e.g., 5 or 6 pieces) may be used along with a single illumination assembly. This is made possible by modulator conditions and performance requirements that lead to the ability to use a single illumination angle that is common across the color channels.

Figure 41:
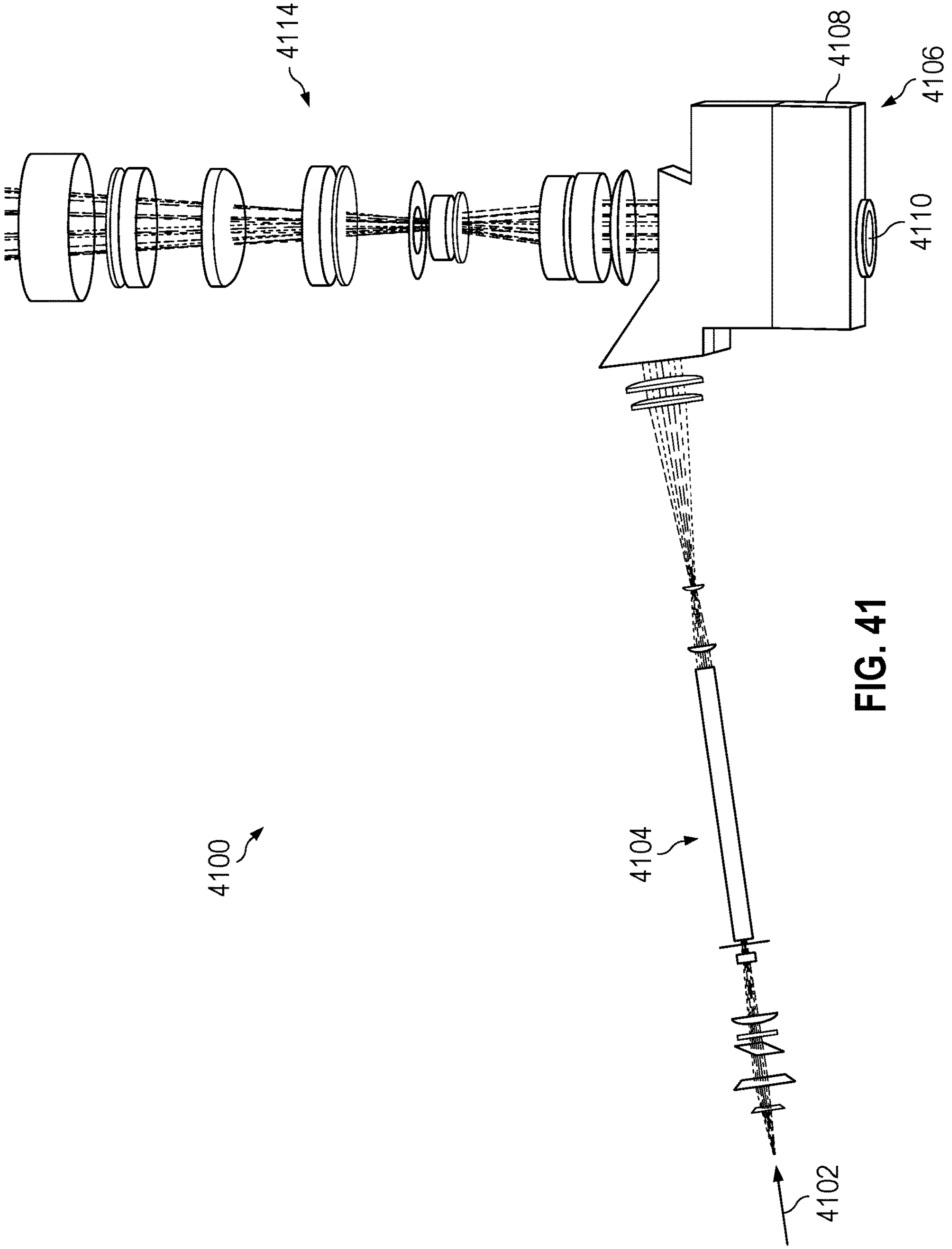
FIG. 41 illustrates an example projection system including a white light prism system and a single illumination assembly.

FIG. 41 illustrates an example projection system 4100 including a single illumination assembly 4104. The illumination assembly 4104 receives white light from a white light fiber 4102 and feeds the white light into a modulator 4106. The modulator 4106 includes a white light prism 4108 and at least one reflector device 4110. While traditional white light prisms include three pieces, the white light prism 4108 includes additional prism pieces. For example, a spectral filter, such as a yellow notch filter, may be provided in the white light prism 4108. Additional pieces may function as a TIR prism. In some embodiments, the modulator 4106 may include three reflector devices (e.g., 3-chip) for modulating the received white light. The white light prism 4108 splits the white light into several color beams (e.g., three color channels), one color beam for each reflector device 4110. A controller may be coupled to each reflector device 4110 to control modulation of each color beam. The reflector devices 4110 then modulate their respective color beam before combining the modulated color beams. In other embodiments, the reflector device 4110 may modulate the white light directly. In both embodiments, the modulator 4106 then relays the output beam into projection optics 4114 of the projection system 4100. In some embodiments, the projection optics 4114 are included in a projection lens, as previously described. In other embodiments, a portion or section of the projection optics 4114 are included in the projection lens.

In some embodiments, the illumination assembly 4104 includes an integrating rod (e.g., an integrating tube, an integrating box) that receives light from the white light fiber 4102. The integrating rod may comprise a substantially reflective surface in its interior, so that light that is incident on its surface is reflected until the light exits. Once the light exits the integrating rod, the illumination assembly 4104 may include a set of optical elements, such as lenses, filters, and/or polarizers that optically act on the light before the light is delivered to the modulator 4106.

Prisms

Figure 42:
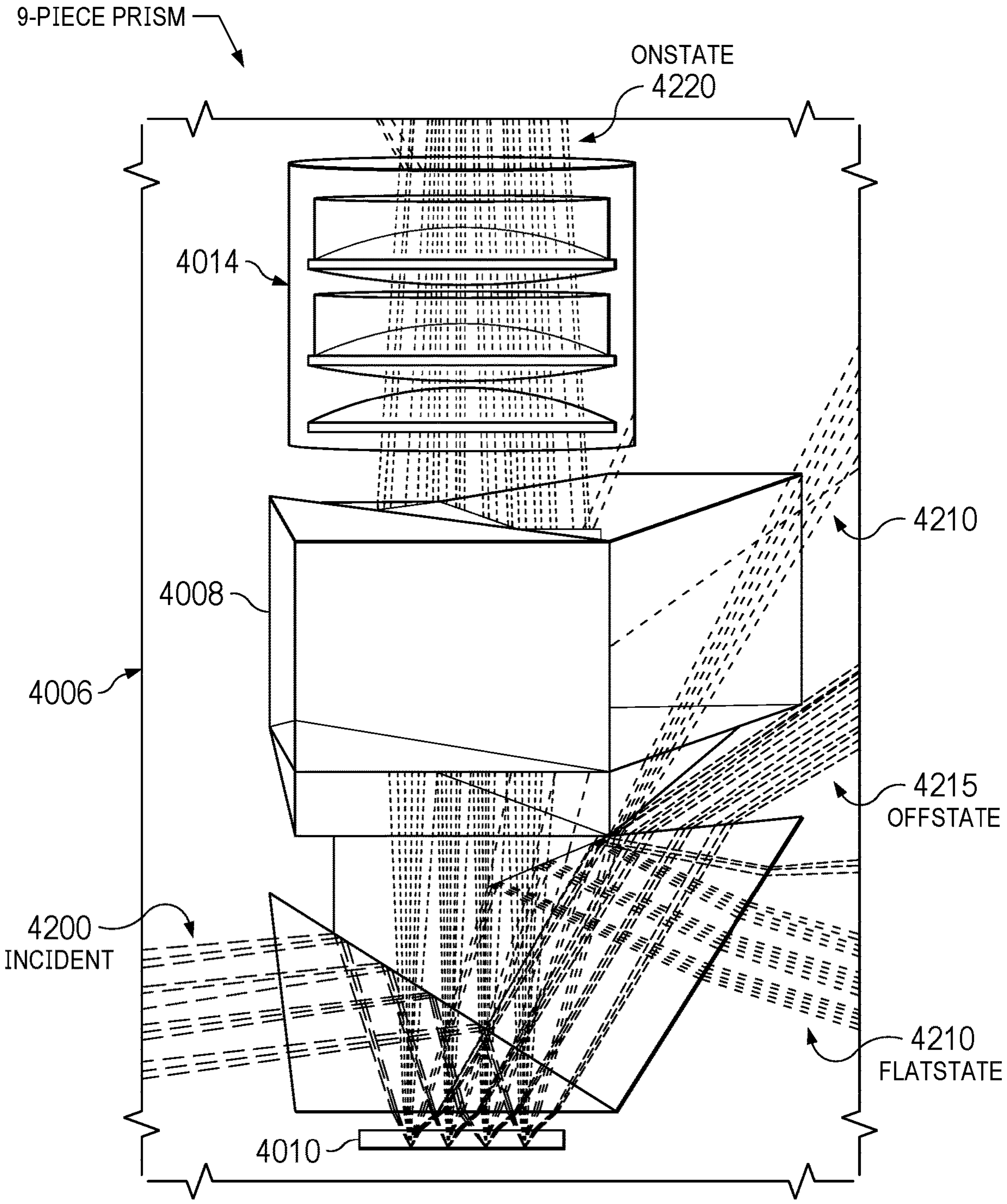
FIG. 42 illustrates an example nine-piece prism for separate color channel inputs.

As stated previously, the projection system 4000 of FIG. 40 provides color beam output from each illumination assembly 4004 to a modulator 4006. FIG. 42 illustrates the modulator 4006 for a single color channel input. The modulator 4006 receives input light 4200 (e.g., incident light, single channel color light) from an illumination assembly 4004 for a single color channel. The input light 4200 may be received, for example, by the nine-piece prism 4006. A reflector device 4010 modulates the input light 4200. The reflector device 4010 may comprise a Digital Micromirror Device (DMD) array of reflectors (e.g., mirrors), a Micro-Electro-Mechanical System (MEMS) array, a Liquid Crystal on Silicon (LCOS) modulator—or any other suitable set of reflectors possible that may reflect light in at least two or more paths.

The reflector device 4010 may reflect the input light 4200 in an ON state, an OFF state, or a FLAT state. When the reflector device 4010 is set to the ON state, reflected ON light beam 4220 may be transmitted through projection optics 4014 to provide light for further modulation and/or projection. In some embodiments, when in the ON state, mirrors of the reflector device 4010 are set to between approximately 11 degrees to 13 degrees. When the reflector device 4010 is set to the OFF state, reflected OFF light beam 4215 may be directed to a light dump (not shown) to be absorbed and/or disposed of, so as not to affect the dynamic range of the display. When the reflector device 4010 is set to the FLAT state, reflected FLAT light beam 4210 is directed away from an operative downstream light path which might include further modulation and/or projection. In general, when in the FLAT state, the reflector device 4010 and/or the projection system 4000 overall may not be in use.

Figure 43:
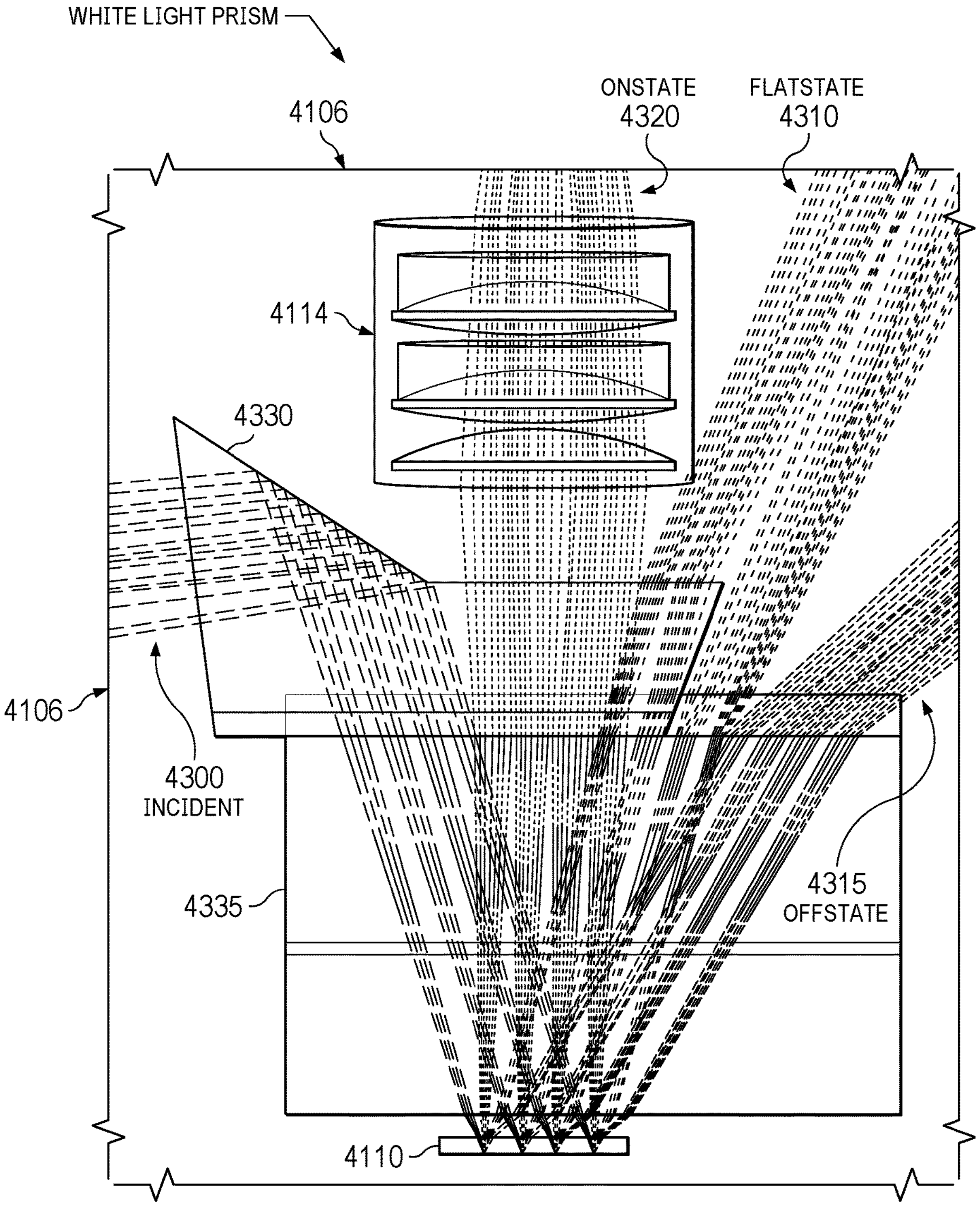
FIG. 43 illustrates an example white light prism with a total internal reflection prism for white light input.

As previously stated, the projection system 4100 of FIG. 41 provides white light from a single illumination assembly 4104 to a modulator 4106. FIG. 43 illustrates the modulator 4106 according to one embodiment. The modulator 4106 receives input light 4300 (e.g., incident light, white light) from the illumination assembly 4104. The input light 4300 may be received, for example, by the white light prism 4108. In the example of FIG. 41, the modulator 4106 includes a first prism segment 4330 and a second prism segment 4335. The first prism segment 4330 may be a Total Internally Reflected (TIR) prism at the interface of the second prism segment 4335. The first prism segment 4330 and the second prism segment 4335 collectively form the white light prism 4108 (shown in FIG. 41). The reflector device 4110 modulates the input light 4300. The reflector device 4110 may comprise a Digital Micromirror Device (DMD) array of reflectors (e.g., mirrors), or a Micro-Electro-Mechanical System (MEMS) array—or any other suitable set of reflectors possible that may reflect light in at least two or more paths.

The reflector device 4110 may reflect the input beam 4300 in an ON state, an OFF state, or a FLAT state. When the reflector device 4110 is set to the ON state, reflected ON light beam 4320 may be transmitted through projection optics 4114 to provide light for further modulation and/or projection. In some embodiments, when in the ON state, mirrors of the reflector device 4110 are set to between approximately 11 degrees to 13 degrees. When the reflector device 4110 is set to the OFF state, reflected OFF light beam 4315 may be directed to a light dump (not shown) to be absorbed and/or disposed of, so as not to affect the dynamic range of the display. When the reflector device 4110 is set to the FLAT state, reflected FLAT light beam 4310 is directed away from an operative downstream light path which might include further modulation and/or projection. In general, when in the FLAT state, the reflector device 4110 and/or the projection system 4100 overall may not be in use.

In some embodiments, the first prism segment 4330 and the second prism segment 4335 separate the input light 4300 into several color channels (e.g., a red color channel, a green color channel, a blue color channel). The color channels are each provided to a color channel pathway in the white light prism 4108. In such embodiments, the modulator 4106 includes a reflector device 4110 for each color channel, such that each color channel is separately modulated. The first prism segment 4330 and the second prism segment 4335 may then recombine each color channel into the reflected ON light beam 4320. In other embodiments, each color channel is recombined optically downstream from the modulator 4106. For example, a beam combiner (not shown) optically downstream from the modulator 4106 may recombine each color channel. Each color channel may have an equal illumination angle, such as approximately between 24 degrees and 28 degrees. Additionally, each reflector device 4110 may include its own color light dump for its respective color channel.

Figure 44:
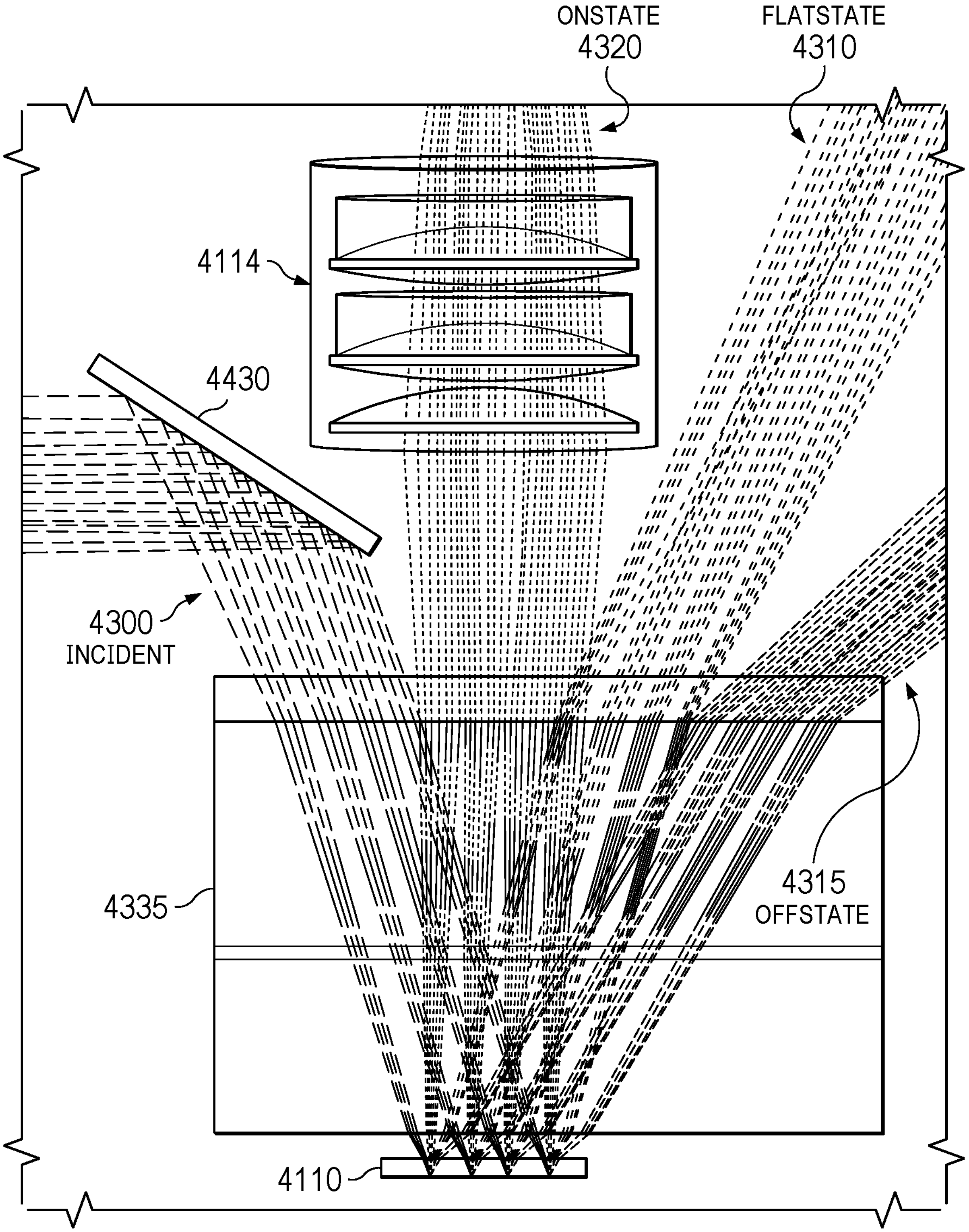
FIG. 44 illustrates an example white light prism without a total internal reflection prism.

FIG. 44 illustrates the modulator 4106 according to another embodiment. Specifically, rather than having a first prism segment 4330 (e.g., the TIR prism) that receives the input beam 4300, the modulator 4106 of FIG. 44 includes a fold mirror 4430 that reflects the input light 4300 towards the second prism segment 4335.

Table 1 provides transmission efficiencies for the modulators of FIGS. 42, 43, and 44 for a green channel illumination path. In Table 1, the illumination path transmission for the white light prism 4108 with the TIR prism (as shown in FIG. 43) and the white light prism 4108 without the TIR prism (as shown in FIG. 44) is equal because the fold mirror 4430 has approximately the same efficiency as the first prism segment 4330 (e.g., the TIR prism).

TABLE 1

Transmission Efficiencies

| | 9-Piece Prism | White Light Prism with TIR | White Light Prism without TIR |
|---|---|---|---|
| Illumination Path | 99.1% | 94.8% | 94.8% |
| Projection Path | 93.1% | 93.4% | 95.7% |
| Total Transmission | 92.3% | 88.5% | 90.7% |
| Relative Efficiency | 1 | 0.959 | 0.983 |

Figure 45:
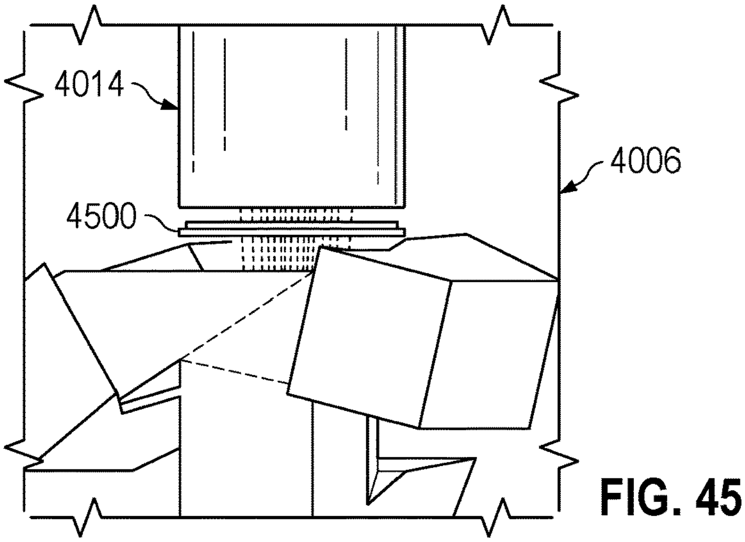
FIG. 45 illustrates an example wobulator used in conjunction with the example prisms of FIG. 41.
Figure 46A:
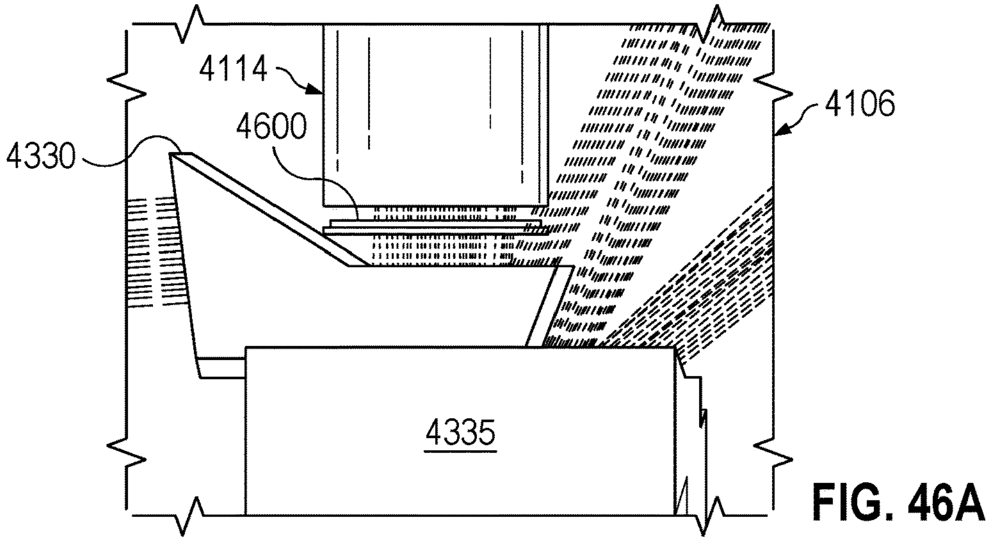
FIGS. 46A-46B illustrate an example wobulator used in conjunction with the example prisms of FIGS. 41 and 42.
Figure 46B:
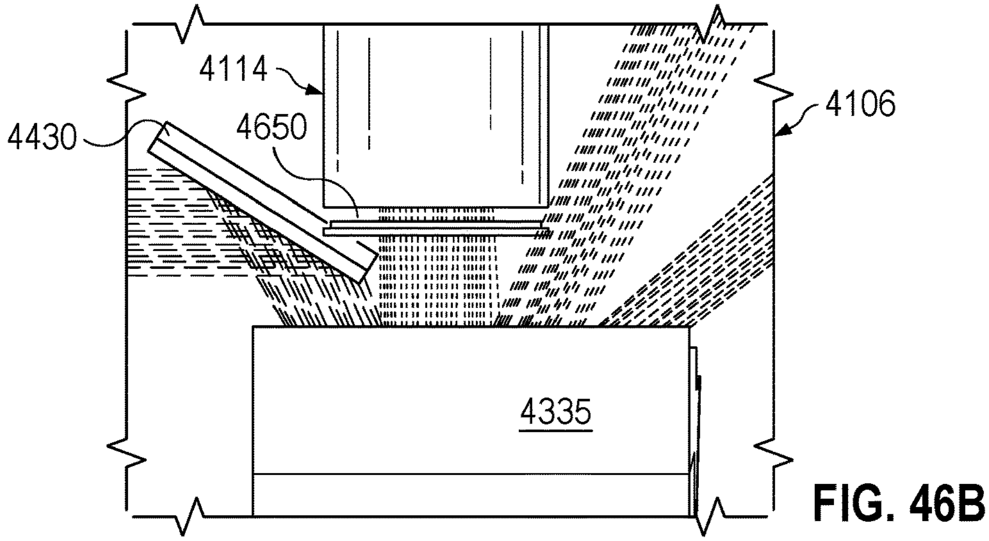

In some embodiments, a wobulator may be used in conjunction with the nine-piece prism 4008 or the white light prism 4108. For example, FIG. 45 illustrates an example wobulator 4500 disposed optically between the modulator 4006 and the projection optics 4014. The wobulator 4500 upscales the output of the modulator 4006 (for example, upscaling from 2K to 4K resolution). FIG. 46A illustrates an example wobulator 4600 disposed optically between the first prism segment 4330 (see FIG. 43) of the modulator 4106 and the projection optics 4114. FIG. 46B illustrates an example wobulator 4650 disposed optically between the second prism segment 4335 (see FIG. 43) and the projection optics 4114. In some embodiments, the wobulator 4650 is coupled with or otherwise makes contact with the fold mirror 4430.

In some embodiments, an optical filter (such as the optical filter 110 or the Fourier part 3501) is included in the projection optics 4114 (e.g., the projection lens). In other embodiments, the optical filter is disposed optically between the modulator 4106 and the projection optics 4114.

In some instances, the optical filter may be a reflective filter. For example, light that is not passed through the optical filter may be directed to a light dump (not shown). In other examples, the optical filter refracts or scatters light such that the light is directed away from downstream optics, preventing certain diffraction orders from being projected on the screen 3914. In some embodiments, rather than being a Fourier filter, the optical filter may be a filter that filters light without a Fourier plane, such as a lens having a F-number.

Figure 47:
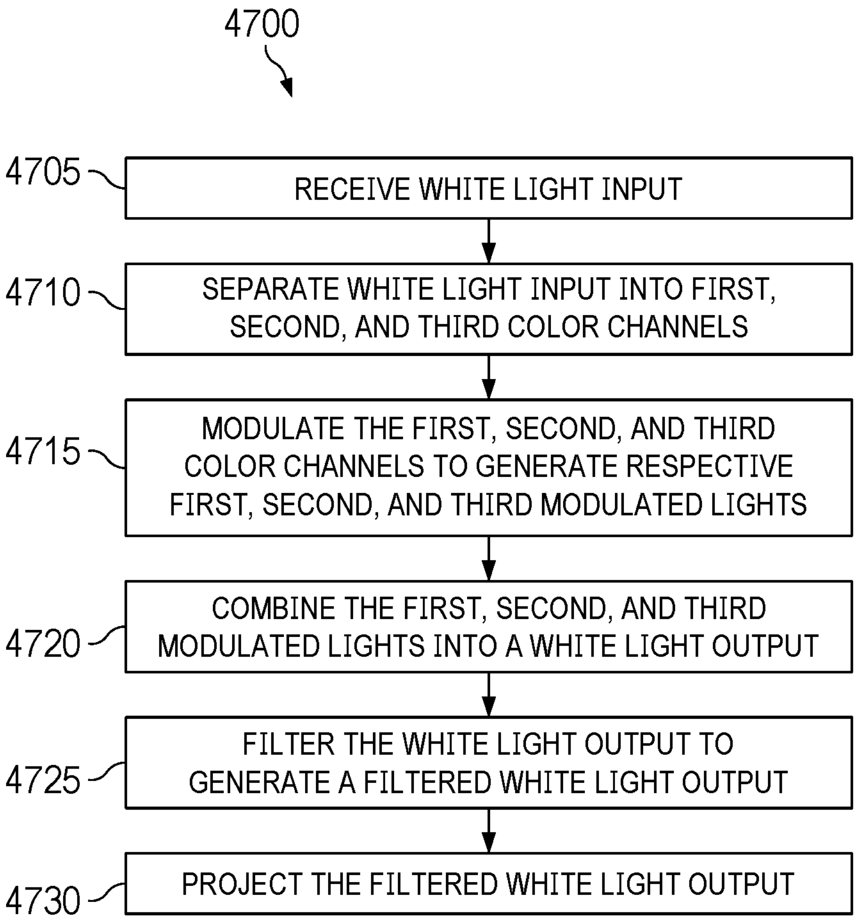
FIG. 47 illustrates a method of using white light illumination within the projection system of FIG. 41.

FIG. 47 shows a method 4700 for projecting an image with the projection system 4100. At block 4705, the method 4700 includes receiving, with the modulator 4106, a white light input. For example, the white light prism 4108 receives white light from the illumination assembly 4104. At block 4710, the method 4700 includes separating the white light input into first, second, and third color channels. For example, the white light prism 4108 separates the input light 4300 into a first color channel (for example, red), a second color channel (for example, green), and a third color channel (for example, blue).

At block 4715, the method 4700 includes modulating the first, second, and third color channels to generate respective first, second, and third modulated lights. For example, the first color channel, the second color channel, and the third color channel are each modulated by a respective reflective device 4110. At block 4720, the method 4700 includes combining the first, second, and third color channels into a white light output. For example, after modulation, the white light prism 4108 combines the first modulated color channel, the second modulated color channel, and the third modulated color channel into a single white light output.

At block 4725, the method 4700 includes filtering the white light output to generate a filtered white light output. For example, the optical filter 110 included in the projection lens spatially Fourier transforms the white light output, as previously described. At block 4730, the method 4700 includes projecting the filtered white light output onto a screen, such as screen 3914.

Illumination angles within the projection systems 4000, 4100 may be controlled based on diffraction orders filtered by the optical filter (for example, the optical filter 110). For example, in the projection system 4100, the output of the white light fiber 4102 may have an illumination angle chosen based on the diffractive configuration of the optical filter. Additionally, the tilt angles of the reflective devices 4110 may be selected to ensure the angle of light and/or selected diffractive orders are filtered by the optical filter.

Systems, methods, and devices in accordance with the present disclosure may take any one or more of the following configurations.

(1) A projection system using white light illumination, comprising: an illumination assembly configured to receive a white light input; a prism configured to separate the white light input into separate color light inputs, redirect the color light inputs to respective modulators, and combine modulated color light inputs from the respective modulators into a white light output; an optical filter configured to spatially Fourier transform the white light output to generate a filtered white light output; and a projection lens assembly configured to project the filtered white light output.

(2) The projection system according to (1), wherein the color light inputs include a red light, a green light, and a blue light, and wherein the respective modulators includes a first modulator configured to modulate the red light, a second modulator configured to modulate the green light, and a third modulator configured to modulate the blue light.

(3) The projection system according to any one of (1) to (2), wherein the optical filter includes a lens configured to focus the white light output onto a Fourier plane, wherein the Fourier plane coincides with a focal plane of the lens.

(4) The projection system according to any one of (1) to (3), further comprising: a wobulator disposed optically between the at least one of the plurality of modulators and the projection lens assembly.

(5) The projection system according to any one of (1) to (4), wherein the optical filter is configured to block one or more diffraction orders of the white light output.

(6) The projection system according to any one of (1) to (5), wherein the optical filter is integrated within the projection lens assembly.

(7) The projection system according to any one of (1) to (6), wherein the prism includes a Total Internal Reflection (TIR) prism segment configured to separate the white light into the color light inputs.

(8) The projection system according to any one of (1) to (7), further comprising: a fold mirror configured to direct the white light input to the prism.

(9) The projection system according to any one of (1) to (8), wherein each of the color light inputs have the same illumination angle.

(10) The projection system according to any one of (1) to (9), wherein a broadband anti-reflection coating is applied to the prism.

(11) The projection system according to any one of (1) to (10), wherein, when a first modulator of the respective modulators is in an OFF state, the respective color light input modulated by the first modulator is directed towards a light dump.

(12) The projection system according to any one of (1) to (11), wherein each of the respective modulators is one selected from the group consisting of a digital micromirror device, a micro-electro-mechanical system array, and a liquid crystal on silicon array.

(13) A method for modulating white light in a projector system, the method comprising: receiving, with a prism assembly, a white light input; separating, with the prism assembly, the white light into a plurality of separate color light inputs, each color light input provided to a separate prism path at an illumination angle; modulating each color light input with a color light modulator in each separate prism path; combining, within the prism assembly, each modulated color light input to a white light output; providing the white light output to a projection lens assembly; filtering the white light output within the projection lens assembly; and projecting the filtered white light output.

(14) The method according to (13), wherein the color light inputs include a red light, a green light, and a blue light, and wherein modulating each color light input with a color light modulator in each separate prism path includes: modulating the red light with a first color light modulator; modulating the green light with a second color light modulator; and modulating the blue light with a third color light modulator.

(15) The method according to any one of (13) to (14), further comprising: focusing, with a lens included in the projection lens assembly, the white light output onto a Fourier plane, wherein the Fourier plane coincides with a focal plane of the lens.

(16) The method according to any one of (13) to (15), wherein filtering the white light output within the projection lens assembly includes blocking one or more diffraction orders of the white light output.

(17) A projection system using white light illumination, comprising: a prism configured to separate white light into a plurality of color channels, redirect the color channels to respective modulators, and combine modulated color channels from the respective modulators into a white light output; and a projection lens assembly configured to project the white light output, the projection lens assembly including an optical filter configured to spatially Fourier transform the white light output.

(18) The projection system according to (17), wherein the plurality of color channels includes a red color channel, a green color channel, and a blue color channel, and wherein the respective modulators includes a first modulator configured to modulate the red color channel, a second modulator configured to modulate the green color channel, and a third modulator configured to modulate the blue color channel.

(19) The projection system according to any one of (17) to (18), wherein the prism includes a Total Internal Reflection (TIR) prism segment configured to separate the white light into the plurality of color channels.

(20) The projection system according to any one of (17) to (19), wherein each of the color channels have the same illumination angle.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as “a,” “the,” “said,” etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments incorporate more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A projection system using white light illumination, comprising:

an illumination assembly configured to receive a white light input;

a prism configured to separate the white light input into separate color light inputs, redirect the color light inputs to respective modulators, and combine modulated color light inputs from the respective modulators into a white light output;

an optical filter configured to spatially Fourier transform the white light output to generate a filtered white light output; and a projection lens assembly configured to project the filtered white light output, wherein the optical filter is integrated within the projection lens assembly, wherein the projection lens assembly further includes a zoom part, and the optical filter comprises a Fourier part and an aperture, and wherein the zoom part and the Fourier part are assembled in the projection lens assembly such that the Fourier plane of the Fourier part and the Fourier plane of the zoom part are coplanar.

2. The projection system according to claim 1, wherein the color light inputs include a red light, a green light, and a blue light, and wherein the respective modulators include a first modulator configured to modulate the red light, a second modulator configured to modulate the green light, and a third modulator configured to modulate the blue light.

3. The projection system according to claim 1, wherein the Fourier part includes a lens configured to focus the white light output onto the Fourier plane, wherein the Fourier plane coincides with a focal plane of the lens.

4. The projection system according to claim 1, further comprising: a wobulator disposed optically between the at least one of the plurality of modulators and the projection lens assembly.

5. The projection system according to claim 1, wherein the optical filter is configured to block one or more diffraction orders of the white light output.

6. The projection system according to claim 1, wherein the prism includes a Total Internal Reflection (TIR) prism segment configured to separate the white light into the color light inputs.

7. The projection system according to claim 1, wherein each of the color light inputs have the same illumination angle.

8. The projection system according to claim 1, wherein a broadband anti-reflection coating is applied to the prism.

9. The projection system according to claim 1, wherein, when a first modulator of the plurality of modulators is in an OFF state, the respective color light input modulated by the first modulator is directed towards a light dump.

10. The projection system according to claim 1, further comprising:

a fold mirror configured to direct the white light input to the prism.

11. The projection system according to claim 1, wherein each of the respective modulators is one selected from the group consisting of a digital micromirror device, a micro-electro-mechanical system array, and a liquid crystal on silicon array.

12. A method for using white light in a projector system, the method comprising:

receiving, with a prism assembly, a white light input;

separating, with the prism assembly, the white light into a plurality of separate color light inputs, each color light input provided to a separate prism path at an illumination angle;

modulating each color light input with a color light modulator in each separate prism path;

combining, within the prism assembly, each modulated color light input to a white light output;

providing the white light output to a projection lens assembly;

filtering the white light output within the projection lens assembly with an optical filter configured to spatially Fourier transform the white light output; and projecting the filtered white light output, wherein the projection lens assembly further includes a zoom part, and the optical filter comprises a Fourier part and an aperture, and wherein the zoom part and the Fourier part are assembled in the projection lens assembly such that the Fourier plane of the Fourier part and the Fourier plane of the zoom part are coplanar.

13. The method according to claim 12, wherein the color light inputs include a red light, a green light, and a blue light, and wherein modulating each color light input with a color light modulator in each separate prism path includes: modulating the red light with a first color light modulator; modulating the green light with a second color light modulator; and modulating the blue light with a third color light modulator.

14. The method according to claim 12, further comprising:

focusing, with a lens included in the Fourier part, the white light output onto the Fourier plane, wherein the Fourier plane coincides with a focal plane of the lens.

15. The method according to claim 12, wherein filtering the white light output within the projection lens assembly includes blocking one or more diffraction orders of the white light output.

16. A projection system using white light illumination, comprising:

a prism configured to separate white light into a plurality of color channels, redirect the color channels to respective modulators, and combine modulated color channels from the respective modulators into a white light output; and a projection lens assembly configured to project the white light output, the projection lens assembly including an optical filter integrated within the projection lens assembly configured to spatially Fourier transform the white light output, wherein the projection lens assembly further includes a zoom part, and the optical filter comprises a Fourier part and an aperture, and wherein the zoom part and the Fourier part are assembled in the projection lens assembly such that the Fourier plane of the Fourier part and the Fourier plane of the zoom part are coplanar.

17. The projection system according to claim 16, wherein the plurality of color channels includes a red color channel, a green color channel, and a blue color channel, and wherein the respective modulators include a first modulator configured to modulate the red color channel, a second modulator configured to modulate the green color channel, and a third modulator configured to modulate the blue color channel.

18. The projection system according to claim 16, wherein the prism includes a Total Internal Reflection (TIR) prism segment configured to separate the white light into the plurality of color channels.

19. The projection system according to claim 16, wherein each of the color channels have the same illumination angle.

* * * * *